US010216177B2

(12) United States Patent
Gildert et al.

(10) Patent No.: US 10,216,177 B2
(45) Date of Patent: Feb. 26, 2019

(54) FACILITATING DEVICE CONTROL

(71) Applicant: KINDRED SYSTEMS INC., Vancouver (CA)

(72) Inventors: Suzanne Gildert, Burnaby (CA); George Samuel Rose, Vancouver (CA); Graham William Taylor, Guelph (CA); James Bergstra, Toronto (CA)

(73) Assignee: Kindred Systems Inc., San Francisco, CA (US)

( * ) Notice: Subject to any disclaimer, the term of this patent is extended or adjusted under 35 U.S.C. 154(b) by 0 days.

(21) Appl. No.: 15/051,180

(22) Filed: Feb. 23, 2016

(65) Prior Publication Data

US 2016/0243701 A1 Aug. 25, 2016

Related U.S. Application Data

(60) Provisional application No. 62/158,467, filed on May 7, 2015.

(30) Foreign Application Priority Data

Feb. 23, 2015 (CA) ..................... 2882968

(51) Int. Cl.
*G05B 19/42* (2006.01)
(52) U.S. Cl.
CPC .... *G05B 19/42* (2013.01); *G05B 2219/36184* (2013.01); *G05B 2219/36442* (2013.01); *Y10S 901/01* (2013.01)
(58) Field of Classification Search
CPC .......... G05B 2219/40155; G05B 19/42; G05B 2219/36184; G05B 2219/36442;
(Continued)

(56) References Cited

U.S. PATENT DOCUMENTS 2,846,084 A   8/1958   Goertz et al.
7,593,546 B2 *   9/2009   Jouppi ................... H04N 7/144
                                                                            348/211.12
(Continued)

OTHER PUBLICATIONS

Crandall, J.W. et al. "Characterizing Efficiency of Human Robot Interaction: A Case Study of Shared-Control teleoperation," Preprint from Computer Science Department, Brigham Young University, Provo, UT, 2002, 11 pages.
(Continued)

*Primary Examiner* — Bao Long T Nguyen

(57) ABSTRACT

A method of deriving autonomous control information involves receiving one or more sets of associated environment sensor information and device control instructions. Each set of associated environment sensor information and device control instructions includes environment sensor information representing an environment associated with an operator controllable device and associated device control instructions configured to cause the operator controllable device to simulate at least one action taken by at least one operator experiencing a representation of the environment generated from the environment sensor information. The method also involves deriving autonomous control information from the one or more sets of associated environment sensor information and device control instructions, the autonomous control information configured to facilitate generating autonomous device control signals from autonomous environment sensor information representing an environment associated with an autonomous device, the autonomous device control signals configured to cause the autonomous device to take at least one autonomous action.

28 Claims, 64 Drawing Sheets

(58) Field of Classification Search
CPC .... G05B 19/41885; G05B 2219/40414; G05B 2219/40311; G05B 2219/40323; G05B 2219/40123; G05B 2219/40154; G05B 2219/40131; G05B 2219/40119; B25J 9/1689; Y10S 901/01
USPC .......... 700/259, 250, 257, 258; 718/568.25; 901/1
See application file for complete search history.

(56) References Cited

U.S. PATENT DOCUMENTS

| | | | |
|---|---|---|---|
| 8,704,832 | B2 | 4/2014 | Taylor et al. |
| 8,725,273 | B2* | 5/2014 | Lenser ................ G05D 1/0038 700/1 |
| 9,052,710 | B1* | 6/2015 | Farwell ................ G05B 19/423 |
| 9,056,396 | B1* | 6/2015 | Linnell ................ G05B 19/427 |
| 9,880,553 | B1* | 1/2018 | Hoffmann ........... G05D 1/0038 |
| 2002/0133264 | A1* | 9/2002 | Maiteh ............... G05B 19/4097 700/182 |
| 2004/0172380 | A1* | 9/2004 | Zhang ..................... A47J 27/62 |
| 2009/0089700 | A1* | 4/2009 | Gu ................... G05B 19/41885 715/771 |
| 2009/0276105 | A1* | 11/2009 | Lacaze ................ G05D 1/0044 701/2 |
| 2010/0152899 | A1* | 6/2010 | Chang ..................... B25J 9/162 700/262 |
| 2010/0234857 | A1* | 9/2010 | Itkowitz ............... G09B 23/285 606/130 |
| 2011/0288684 | A1* | 11/2011 | Farlow .................. B25J 11/009 700/264 |
| 2012/0197439 | A1* | 8/2012 | Wang ..................... B25J 9/1689 700/259 |
| 2013/0079905 | A1* | 3/2013 | Saen ..................... B25J 9/1671 700/83 |
| 2013/0173089 | A1* | 7/2013 | Bernstein ............... A63H 30/04 701/2 |
| 2013/0211592 | A1* | 8/2013 | Kim ......................... B25J 3/00 700/258 |
| 2013/0211594 | A1* | 8/2013 | Stephens, Jr. .......... B25J 9/1689 700/259 |
| 2013/0218340 | A1* | 8/2013 | Hager .................... B25J 9/1671 700/257 |
| 2013/0343640 | A1* | 12/2013 | Buehler ................. B25J 9/0087 382/155 |
| 2014/0094968 | A1* | 4/2014 | Taylor .................... B25J 13/006 700/257 |
| 2015/0057801 | A1* | 2/2015 | Stephens, Jr. .......... B25J 9/1689 700/259 |
| 2015/0151431 | A1* | 6/2015 | Suyama ................. B25J 9/1671 700/264 |
| 2015/0290795 | A1* | 10/2015 | Oleynik ................. G05B 19/42 700/257 |
| 2015/0290801 | A1* | 10/2015 | Kuwahara ............. B25J 9/1671 700/250 |
| 2016/0318185 | A1* | 11/2016 | Savarimuthu .......... B25J 9/1689 |

OTHER PUBLICATIONS

Dragan, Anca D. et al., "Teleoperation with Intelligent and Customizable Interfaces," *Journal of Human-Robot Interaction*, vol. 2, No. 2, Jun. 2013, pp. 33-57.

Espiau, Bernard et al., "A New Approach to Visual Servoing in Robotics," *IEEE Transactions on Robotics and Automation*, vol. 8, No. 3, Jun. 1992, pp. 313-326.

Hokayem, Peter F. et al., "Bilateral Teleoperation: An Historical Survey," Preprint from University of Illinois at Urbana-Champaign, Coordinated Science Laboratory, Urbana, IL, USA, Feb. 15, 2005, 35 pages.

Inaba, Masayuki, "Remote-Brained Robots, Joint Conference on Artificial Intelligence," *IJCAI* Aug. 1997, Nagoya, Japan, vol. 2, pp. 1593-1606.

Labonté, Daniel et al., "Comparative Analysis of 3D Robot Teleoperation Interfaces with Novice Users," *IEEE Transactions on Systems, Man, and Cybernetics*, Part B: Cybernetics, vol. 40, Issue 5, Oct. 2010, 13 pages.

Lenz, Ian et al., "Deep Learning for Detecting Robotic Grasps," Preprint: arXiv:1301.3592, version 6, dated Aug. 21, 2014. Retrieved from the internet at URL: https://arxiv.ora/pdf/1301.3592.pdf, 17 pages.

Numenta, Inc., "Hierarchical Temporal Memory including HTM Cotical Learning Algorithms" Whitepaper, Ver. 0.2.1, published Sep. 12, 2011, Numenta, Inc., 791 Middlefield Road Redwood City, CA 94063, 68 pages.

Oboe, Roberto et al., "A Design and Control Environment for Internet-Based Telerobotics," *The International Journal of Robotics Research*, vol. 17, Issue 4, Apr. 1, 1998, 26 pages.

Sheridan, Thomas B., "Teleoperation, telerobotics and telepresence: A progress report," *Control Engineering Practice*, vol. 3, No. 2, Feb. 1995, pp. 205-214.

Srivastava, Nitish, et al. "Multimodal Learning with Deep Boltzmann Machines" *Journal of Machine Learning Research*, Jan. 2014, vol. 15, Issue 1, pp. 2949-2980.

Taylor, Graham William, "Composable, distributed-state models for high-dimensional time series" Ph.D. Thesis, University of Toronto, Canada, Issue date: Mar. 3, 2010. Retrieved from the internet at: http://hdl.handle.net/1807/19238, 155 pages.

* cited by examiner

Device Environment Frame Record    350

| | | |
|---|---|---|
| 352 → | Left Image | 🍵 |
| 354 → | Right Image | 🍵 |
| 356 → | Left Audio | ∿ |
| 358 → | Right Audio | ∿ |
| 360 → | Motor 1 Position | 0 |
| 362 → | Motor 2 Position | 0 |
| 364 → | Motor 3 Position | 0 |
| 366 → | Motor 4 Position | 0 |
| 368 → | Motor 5 Position | 0 |
| 370 → | Motor 6 Position | 0 |
| 372 → | Time | 20141125120000000 |

FIG. 6

Device Control Instructions Frame Record 500

| | |
|---|---|
| 502 → Speaker | |
| 504 → Motor 1 | 0.10 |
| 506 → Motor 2 | 0.10 |
| 508 → Motor 3 | 0.10 |
| 510 → Motor 4 | 0.20 |
| 512 → Motor 5 | 0.10 |
| 514 → Motor 6 | 0.15 |
| 516 → Time | 2014112512000001 |

```
                                                    2550
                                                    ↙

2551 → a left image field                           1024x576,
```

2601 → a right image field                          1024x576,
```

2651 → a left audio field                           48kHz,
2652 → a right audio field                          48kHz,
```

2701 → A Left wrist motor position field              0.53,
2702 → A Right wrist motor position field             0.41,
2703 → A Left elbow motor position field              0.67,
2704 → A Right elbow motor position field             0.90,
2705 → A Left shoulder pitch motor position field     0.21,
2706 → A Right shoulder pitch motor position field    0.35,
2707 → A Left shoulder roll motor position field      0.64,
2708 → A Right shoulder roll motor position field     0.87,
2709 → A Left shoulder yaw motor position field       0.37,
2710 → A Right shoulder yaw position field            0.55,
2711 → A Torso pitch motor position field             0.32,
2712 → A Head yaw motor position field                0.12,
2713 → A Head pitch motor position field              0.17,
2714 → A Left wrist motor velocity field              0.53,
2715 → A Right wrist motor velocity field             0.41,
2716 → A Left elbow motor velocity field              0.67,
2717 → A Right elbow motor velocity field             0.90,
2718 → A Left shoulder pitch motor velocity field     0.21,
2719 → A Right shoulder pitch motor velocity field    0.35,
2720 → A Left shoulder roll motor velocity field      0.64,
2721 → A Right shoulder roll motor velocity field     0.87,
2722 → A Left shoulder yaw motor velocity field       0.37,
2723 → A Right shoulder yaw motor velocity field      0.55,
2724 → A Torso pitch motor velocity field             0.32,
2725 → A Head yaw motor velocity field                0.12,
2726 → A Head pitch motor velocity field              0.17,

```
2751 → a Left first finger motor position field    0.53,
2752 → a Right first finger motor position field   0.41,
2753 → a Left second finget motor position field   0.67,
2754 → a Right second finget motor position field  0.90,
2755 → a Left third finger motor position field    0.21,
2756 → a Right third finger motor position field   0.35,
2757 → a Left first finger motor velocity field    0.53,
2758 → a Right first finger motor velocity field   0.41,
2759 → a Left second finger motor velocity field   0.67,
2760 → a Right second finger motor velocity field  0.90,
2761 → a Left third finger motor velocity field    0.21,
2762 → a Right third finger motor velocity field   0.35,
```

```
2801 → a right first finger haptic signal field    0.34,
2802 → a right second finger haptic signal field   0.85,
2803 → a right third finger haptic signal field    0.26,
2804 → a left first finger haptic signal field     0.46,
2805 → a left second finger haptic signal field    0.68,
2806 → a left third finger haptic signal field     0.70,
```

2851 → an operator audio field                                              48kHz

2901 → an IMU x-axis field                                                  0.23,
2902 → an IMU y-axis field                                                  0.45,
2903 → an IMU z-axis field                                                  0.23,

2951 → a left haptic glove servo position field          0.12,
2952 → a right haptic glove servo position field         0.57,
2953 → a left elbow motor position field                 0.78,
2954 → a right elbow motor position field                0.46,
2955 → a left shoulder pitch motor position field        0.57,
2956 → a right shoulder pitch motor position field       0.56,
2957 → a left shoulder roll motor position field         0.28,
2958 → a right shoulder roll motor position field        0.11,
2959 → a left haptic glove servo velocity field          0.12,
2960 → a right haptic glove servo velocity field         0.57,
2961 → a left elbow motor velocity field                 0.78,
2962 → a right elbow motor velocity field                0.46,
2963 → a left shoulder pitch motor velocity field        0.57,
2964 → a right shoulder pitch motor velocity field       0.56,
2965 → a left shoulder roll motor velocity field         0.28,
2966 → a right shoulder roll motor velocity field        0.11,

3001 → a left wrist potentiometer field                            0.34,
3002 → a right wrist potentiometer field                           0.68,
3003 → a left shoulder yaw potentiometer field                     0.12,
3004 → a right should yaw potentiometer field                      0.12,
```

3051 → a first pedal potentiometer field                           0.34,
3052 → a second pedal potentiometer field                          0.68,
3053 → a third pedal potentiometer field                           0.12,
```

| | | | |
|---|---|---|---|
| 1851 → | A | wrist motor position field | 0.53, |
| 1852 → | A | elbow motor position field | 0.67, |
| 1853 → | A | shoulder pitch motor position field | 0.21, |
| 1854 → | A | shoulder roll motor position field | 0.64, |
| 1855 → | A | shoulder yaw motor position field | 0.37, |
| 1856 → | a | first finger motor position field | 0.53, |
| 1857 → | a | second finger motor position field | 0.67, |
| 1858 → | a | third finger motor position field | 0.21, |
| 1859 → | A | wrist motor velocity field | 0.53, |
| 1860 → | A | elbow motor velocity field | 0.67, |
| 1861 → | A | shoulder pitch motor velocity field | 0.21, |
| 1862 → | A | shoulder roll motor velocity field | 0.64, |
| 1863 → | A | shoulder yaw motor velocity field | 0.37, |
| 1864 → | a | first finger motor velocity field | 0.53, |
| 1865 → | a | second finger motor velocity field | 0.67, |
| 1866 → | a | third finger motor velocity field | 0.21, |
| 1870 → | a | first finger haptic signal field | 0.46, |
| 1871 → | a | second finger haptic signal field | 0.68, |
| 1872 → | a | third finger haptic signal field | 0.70, |

| | | | |
|---|---|---|---|
| 1876 → | a | haptic glove servo position field | 0.12, |
| 1877 → | a | elbow motor position field | 0.78, |
| 1878 → | a | shoulder pitch motor position field | 0.57, |
| 1879 → | a | shoulder roll motor position field | 0.54 |
| 1880 → | a | haptic glove servo velocity field | 0.12, |
| 1881 → | a | elbow motor velocity field | 0.78, |
| 1882 → | a | shoulder pitch motor velocity field | 0.57, |
| 1883 → | a | shoulder roll motor velocity field | 0.54 |
| 1884 → | A | wrist potentiometer field | 0.34 |
| 1885 → | a | shoulder yaw potentiometer field | 0.12 |

FIG. 67

```
1901 → A  wrist motor position field              0.53,
1902 → A  elbow motor position field              0.67,
1903 → A  shoulder pitch motor position field     0.21,
1904 → A  shoulder roll motor position field      0.64,
1905 → A  shoulder yaw motor position field       0.37,
1906 → a  first finger motor position field       0.53,
1907 → a  second finger motor position field      0.67,
1908 → a  third finger motor position field       0.21,
1909 → A  wrist motor velocity field              0.53,
1910 → A  elbow motor velocity field              0.67,
1911 → A  shoulder pitch motor velocity field     0.21,
1912 → A  shoulder roll motor velocity field      0.64,
1913 → A  shoulder yaw motor velocity field       0.37,
1914 → a  first finger motor velocity field       0.53,
1915 → a  second finger motor velocity field      0.67,
1916 → a  third finger motor velocity field       0.21,
```

```
3201 → A left tread motor position field          0.34
3202 → a right tread motor position field         0.68
3203 → a left tread motor velocity field          0.12
3204 → a right read motor velocity field          0.12
```

FACILITATING DEVICE CONTROL

CROSS REFERENCE TO RELATED APPLICATIONS

This application claims the benefit of U.S. Provisional Application No. 62/158,467 entitled "FACILITATING DEVICE CONTROL", filed on May 7, 2015, which is hereby incorporated by reference herein in its entirety. This application claims priority to Canadian Patent Application No. 2,882,968, entitled "FACILITATING GENERATION OF AUTONOMOUS CONTROL INFORMATION" filed Feb. 23, 2015, which is hereby incorporated by reference herein in its entirety.

BACKGROUND

1. Field of Invention

This invention relates to control of devices, and more particularly to facilitating device control using information related to analogous control of a device.

2. Description of Related Art

Robotic systems include robotic-related devices that may be operated by an operator such as via remote control or that may operate autonomously without control of an operator. The robotic-related devices may be specifically designed to carry out particular tasks that historically have been performed by human beings. However, such robotic-related devices usually do not execute tasks using the same actions and the same movements as human beings or do not do so well. Moreover, although a wealth of information included in human brains for performing various human executable tasks is available, robotic-related devices used to execute these tasks have historically not utilized this information or not made good use of it.

In addition, operator interfaces used with such devices may not be configured to sense applicable movements of the operator.

Autonomous devices may be programmed to execute certain tasks automatically. However programming a device to react to the multitude of environments that it may experience can require a lot of time, effort and intelligence from the programmer. In various cases, it can be challenging or very difficult to adequately program a device to autonomously react to its environment.

SUMMARY

An illustrative embodiment describes a method of deriving autonomous control information. The method involves receiving one or more sets of associated environment sensor information and device control instructions. Each set of associated environment sensor information and device control instructions includes environment sensor information representing an environment associated with an operator controllable device and associated device control instructions configured to cause the operator controllable device to simulate at least one action taken by at least one operator experiencing a representation of the environment generated from the environment sensor information. The method also involves deriving autonomous control information from the one or more sets of associated environment sensor information and device control instructions, the autonomous control information configured to facilitate generating autonomous device control signals from autonomous environment sensor information representing an environment associated with an autonomous device, the autonomous device control signals configured to cause the autonomous device to take at least one autonomous action.

Another illustrative embodiment describes a computer-readable medium having stored thereon codes which, when executed by at least one processor, cause the at least one processor to perform the above method.

Another illustrative embodiment describes a computer-readable medium having stored thereon codes which, when executed by at least one processor, cause the at least one processor to receive one or more sets of associated environment sensor information and device control instructions, wherein each set of associated environment sensor information and device control instructions includes: environment sensor information representing an environment associated with an operator controllable device, and associated device control instructions configured to cause the operator controllable device to simulate at least one action taken by at least one operator experiencing a representation of the environment generated from the environment sensor information. The codes also cause the at least one processor to derive autonomous control information from the one or more sets of associated environment sensor information and device control instructions, said autonomous control information configured to facilitate generating autonomous device control signals from autonomous environment sensor information representing an environment associated with an autonomous device, said autonomous device control signals configured to cause the autonomous device to take at least one autonomous action.

Another illustrative embodiment describes a system for deriving autonomous control information. The system includes means for receiving one or more sets of associated environment sensor information and device control instructions. Each set of associated environment sensor information and device control instructions includes environment sensor information representing an environment associated with an operator controllable device and associated device control instructions configured to cause the operator controllable device to simulate at least one action taken by at least one operator experiencing a representation of the environment generated from the environment sensor information. The system also includes means for deriving autonomous control information from the one or more sets of associated environment sensor information and device control instructions, the autonomous control information configured to facilitate generating autonomous device control signals from autonomous environment sensor information representing an environment associated with an autonomous device, the autonomous device control signals configured to cause the autonomous device to take at least one autonomous action.

Another illustrative embodiment describes a system for deriving autonomous control information. The system includes at least one processor configured to receive one or more sets of associated environment sensor information and device control instructions. Each set of associated environment sensor information and device control instructions includes environment sensor information representing an environment associated with an operator controllable device and associated device control instructions configured to cause the operator controllable device to simulate at least one action taken by at least one operator experiencing a representation of the environment generated from the environment sensor information. The at least one processor is also configured to derive autonomous control information from the one or more sets of associated environment sensor information and device control instructions, the autonomous control information configured to facilitate generating autonomous device control signals from autonomous environment sensor information representing an environment associated with an autonomous device, the autonomous device control signals configured to cause the autonomous device to take at least one autonomous action.

Another illustrative embodiment describes an apparatus for sensing rotation of a first body part relative to a second body part. The apparatus includes a first rotator configured to be coupled to the first body part to translate first body part rotation of the first body part relative to the second body part into first rotator rotation of the first rotator relative to the second body part, wherein said first rotator rotation has a rotation axis generally corresponding to a rotation axis of the first body part rotation. The apparatus also includes a second rotator having a rotation translator coupled to the first rotator and configured to rotate in response to the rotation of the first rotator about a rotation translator axis offset from the first rotator axis and a sensor coupled to the rotation translator and configured to be coupled to the second body part, said sensor being configured to sense the rotation of the rotation translator and produce at least one signal representing the rotation of the rotation translator.

Another illustrative embodiment describes a method of operation in a robotic system including an operator controllable device and a processor in communication with the operator controllable device. The method involves receiving, by the processor, environment sensor information that represents an environment associated with the operator controllable device, causing, by the processor, the display of a representation of the environment to a human operator, and receiving, by the processor, device control instructions which when executed by the operator controllable device, cause the operator controllable device to simulate at least one action taken by the human operator in response to the representation of the environment. The method also involves deriving, by the processor from the environment sensor information and the device control instructions, autonomous control instructions, which, when executed by the operator controllable device, cause the operator controllable device to take at least one autonomous action, and producing, by the processor, at least one signal that represents the autonomous control instructions.

Another illustrative embodiment describes a robotic system, including at least one processor, an operator controllable device in communication with the at least one processor and within an environment, and an operator interface in communication with the at least one processor and the operator controllable device. The robotic system also includes environmental sensors in communication with the at least one processor and at least one non-transitory computer-readable storage medium in communication with the at least one processor and which stores processor-executable instructions thereon. When executed, the processor-executable instructions cause the at least one processor to receive environment sensor information, from the environmental sensors, that represents the environment associated with the operator controllable device, and cause the display of a representation of the environment to a human operator at the operator interface. When executed, the processor-executable instructions also cause the at least one processor to receive device control instructions which when executed by the operator controllable device, cause the operator controllable device to simulate at least one action taken by the human operator in response to the representation of the environment, and derive, from the environment sensor information and the device control instructions, autonomous control instructions, which, when executed by the operator controllable device, cause the operator controllable device to take at least one autonomous action.

Another illustrative embodiment describes a method of operation in a robotic system including a processor, an operator controllable device in communication with the processor, an operator interface in communication with the operator controllable device and the processor, and an analyzer in communication with the processor. The method involves receiving, by the processor, environment sensor information that represents an environment associated with the operator controllable device, and sending, by the processor, environment sensor information to the operator interface. The method also involves receiving, by the processor from the operator interface, device control instructions which when executed by the operator controllable device, cause the operator controllable device to simulate at least one action taken by a human operator after the human operator has been presented with a representation of the environment sensor information, sending, by the processor to the analyzer, the environment sensor information and the device control instructions, and receiving, by the processor from the analyzer, a signal that represents autonomous control instructions, which, when executed by the operator controllable device, cause the operator controllable device to perform at least one action.

Another illustrative embodiment describes a method of operation in a robotic system including a processor and a robotic device in communication with the processor. The method involves receiving, by the processor, autonomous device control information which represents at least one action previously performed by at least one operator, and receiving, by the processor, environment sensor information, including a first set of environment sensor information, that represents an environment associated with the robotic device. The method also involves deriving, by the processor, autonomous device control instructions from the autonomous device control information and the first set of environment sensor information. The autonomous device control instructions, when executed by the processor, cause the robotic device to perform at least one autonomous action. The method also involves producing, by the processor from the autonomous device control instructions, autonomous control signals that direct the robotic device to perform the at least one autonomous action.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention,

FIG. 6 is a representation of an exemplary device environment frame record used in the system shown in FIG. 1;

FIG. 21 is a representation of an exemplary operator controllable device left video stream frame record in accordance with one embodiment;

FIG. 22 is a representation of an exemplary operator controllable device right video stream frame record in accordance with one embodiment;

FIG. 23 is a representation of an exemplary operator controllable device audio stream frame record in accordance with one embodiment;

FIG. 24 is a representation of an exemplary operator controllable device arm and torso stream frame records in accordance with one embodiment;

FIG. 25 is a representation of an exemplary operator controllable device hand stream frame record used in accordance with one embodiment;

FIG. 26 is a representation of an exemplary operator controllable device pressure sensor stream frame record in accordance with one embodiment;

FIG. 27 is a representation of an exemplary operator interface audio stream frame record in accordance with one embodiment;

FIG. 28 is a representation of an exemplary operator interface head orientation stream frame record in accordance with one embodiment;

FIG. 29 is a representation of an exemplary operator interface arm and torso stream frame record in accordance with one embodiment;

FIG. 30 is a representation of an exemplary operator interface wrist and shoulder yaw stream frame record in accordance with one embodiment;

FIG. 31 is a representation of an exemplary operator interface pedal stream frame record in accordance with one embodiment;

FIG. 66 is a representation of an exemplary operator controllable device arm environment frame record in accordance with one embodiment;

FIG. 67 is a representation of an exemplary operator interface arm sensor frame record in accordance with one embodiment;

FIG. 68 is a representation of an exemplary device arm control instruction in accordance with one embodiment;

FIG. 69 is a representation of an exemplary operator controllable device tread stream frame record in accordance with one embodiment;

DETAILED DESCRIPTION

In various embodiments, there are provided devices that include sensors, actuators and/or output systems that are directly analogous or analogous to the perception and/or actuation or output systems of an operator. In the case where an operator is human, for example, directly analogous devices may include grippers that generally represent or are analogous to human hands, cameras in the visible spectrum that generally represent or are analogous to human eyes, microphones that generally represent or are analogous to human ears, touch sensors that generally represent or are analogous to human touch, and/or speakers that generally represent or are analogous to human vocal apparatus.

In various embodiments, data obtained from analogous control of a device by at least one operator can be used to train machine learning algorithms to generally learn to imitate the actions of the operator. This data may comprise perception and actuation or output data. Generally an operator observes representations of the perception data—for example, video, audio or haptic feedback data representing an environment of a robotic system or apparatus—and then acts, conditioned by this perception data. These actions may cause actuation or output systems or devices to take action. In various embodiments, the data obtained from analogous control of a robotic system by an operator may be multi-modal and time dependent.

Figure 1:
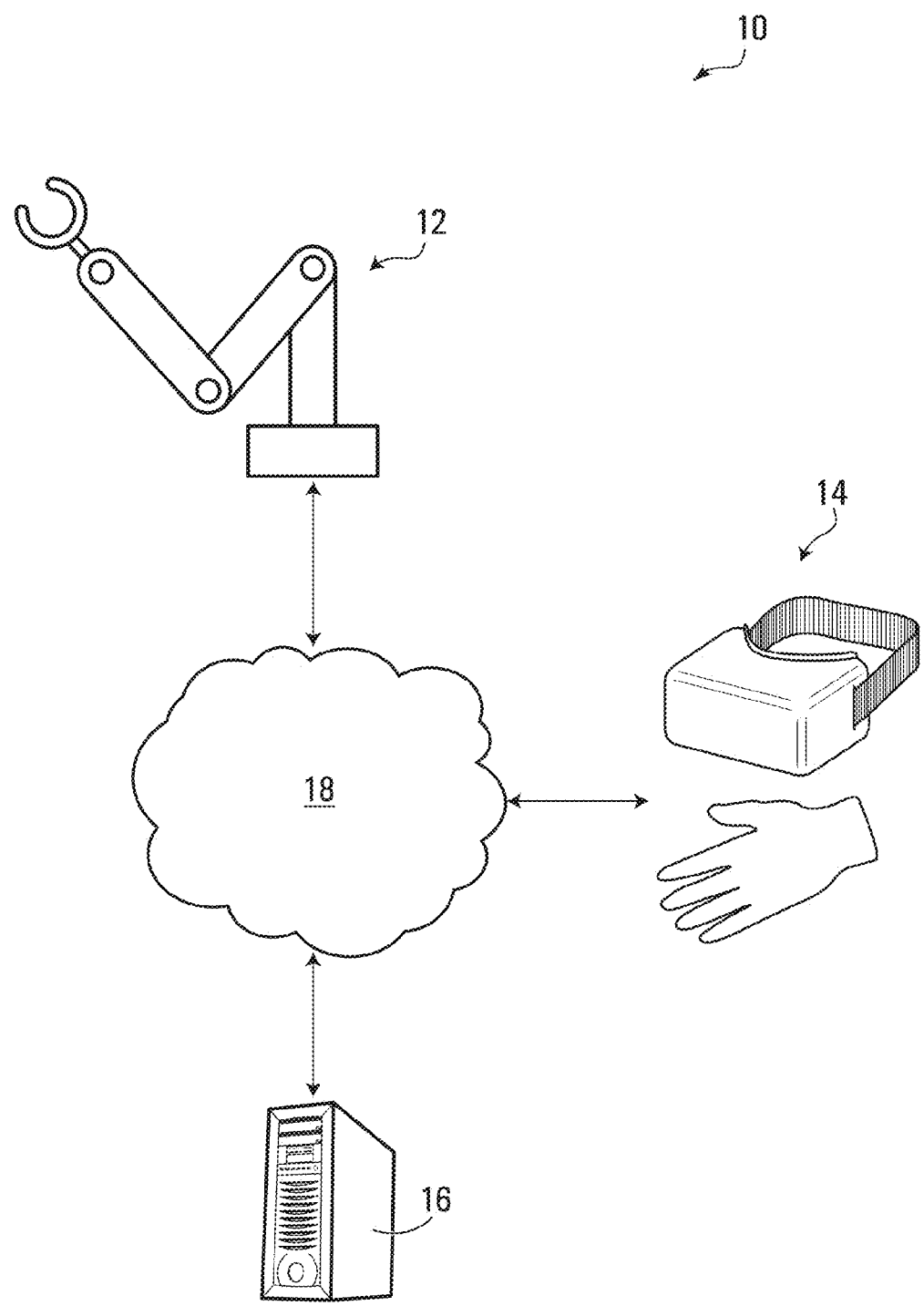
FIG. 1 is a schematic view of a system for facilitating device control in accordance with various embodiments of the invention.

Referring to FIG. 1, according to one embodiment of the invention, there is provided a system 10 for deriving autonomous control information. In the embodiment shown, the system 10 includes an operator controllable device 12, an operator interface 14, and an analyzer 16. The operator controllable device 12, the operator interface 14, and the analyzer 16 may be in communication with one another. In various embodiments, the operator controllable device 12, the operator interface 14, and the analyzer 16 may be in communication with one another through a network 18, which may be a wired or wireless network or combination of subnetworks.

In FIG. 1, the operator controllable device 12 and the operator interface 14 are shown as symbols having features which are shown for exemplary purposes only. In various embodiments, the operator controllable device 12 and the operator interface may include fewer, additional or alternative features compared to those shown in FIG. 1, for example, as illustrated below.

Referring to FIG. 1, in various embodiments, an operator may use the operator interface 14 to facilitate direct analogous or analogous control of the operator controllable device 12 to cause the operator controllable device 12 to perform a task. In various embodiments, the task may be one that the operator is familiar with performing without use of the operator controllable device 12. In various embodiments where the operator is a human being, the task may be an activity commonly done by a human being, such as, by way of example only, the task of picking up a cup of coffee or another object, item or thing.

In various embodiments, the operator controllable device 12 may include sensors, which are configured to sense or detect an environment of the operator controllable device 12 or aspect of that environment and to produce environment sensor information representing the environment or aspects of that environment. The operator controllable device 12 may be directed to send the environment sensor information to the operator interface 14 and to the analyzer 16, such as, for example, over the network 18.

The operator interface 14 may be directed to receive the environment sensor information and to derive operator interface control signals from the first environment sensor information. The operator interface control signals may be configured to cause the operator interface 14 to simulate the environment of the operator controllable device 12 or aspects of that environment for an operator interacting with the operator interface 14.

The operator interacting with the operator interface 14 may take action in response to the interface simulating the operator controllable device environment, and the operator interface 14 may include sensors for detecting the action taken by the operator. The operator interface 14 may be directed to receive operator interface sensor information via the sensors of the operator interface 14 representing at least one action taken by the operator in response to the operator interface simulating the operator controllable device environment. In various embodiments, the operator controllable device 12 may be remote or separated from the operator interface 14 such that for an operator to take action the operator must perceive a simulation or representation of one or more aspects of environment of the operator controllable device 12. For example, operator interface 14 may be visually separated from, but in communication with, operator controllable device 12.

In various embodiments, the operator interface 14 may be directed to derive device control instructions from the operator interface sensor information. The operator interface 14 may be directed to send the device control instructions to the operator controllable device 12 to cause the operator controllable device to simulate or replicate the at least one action taken by the operator. The operator interface 14 may also be directed to send the device control instructions to the analyzer 16.

Thus, in various embodiments, the system 10 is configured to facilitate the operator interface 14 simulating an environment of the operator controllable device 12 for an operator and the operator controllable device simulating actions taken by the operator in response to experiencing the simulated environment.

As discussed above, in various embodiments, environment sensor information representing an environment associated with the operator controllable device and associated device control instructions may be sent to the analyzer 16 where the environment sensor information and associated device control instructions are associated with performance of a task by the operator controllable device 12, the environment sensor information and associated device control instructions may act as a set of associated environment sensor information and device control instructions. In various embodiments, the set of associated environment sensor information and device control instructions may act as a representation of a task performed by the operator controllable device 12.

In various embodiments, one or more operators may cause the operator controllable device 12 to perform a task a plurality of times and thus the analyzer 16 may be directed to receive and process a plurality of sets of associated environment sensor information and device control instructions. The analyzer 16 may be directed to derive or generate autonomous control information from the sets of associated environment sensor information and/or device control instructions. Accordingly, the environment sensor information and/or device control instructions may serve as training data that may be processed by the analyzer 16 to derive or generate autonomous control information which may be used to derive or generate device control instructions. In various embodiments, the environment sensor information and/or device control instructions may be stored in at least one tangible storage media as one or more traces, sequences, or pluralities of observation-action tuples. In various embodiments, the autonomous control information may be generated by an analyzer and may represent an artificial intelligence model, or a learning model, such as, for example, a deep learning model, configured to facilitate generating device control instructions given particular environment sensor information. The device control instructions generated using the autonomous control information may be used to cause an autonomous device to take at least one autonomous action.

In various embodiments, the operator controllable device 12 (e.g. a robot or robotic device or subsystem) may execute code to act as an autonomous device. The operator controllable device 12 acting as an autonomous device may be directed to receive environment sensor information representing an environment or a portion thereof in which the device 12 is situated and to use the autonomous control information generated by the analyzer 16 to generate control instructions which represent a prediction of a selected action based on the received environment sensor information. The operator controllable device 12 acting as an autonomous device may then be directed to take action based on the generated device control instructions.

In some embodiments, the operator controllable device 12 may be configured to send the environment sensor information to the analyzer 16 and the analyzer 16 may be configured to use the autonomous control information to generate control instructions and send the control instructions to the operator controllable device 12, which may take action based on the device control instructions received from the analyzer 16.

In various embodiments, the system 10 may facilitate the operator controllable device 12 to act autonomously and react based on an artificial intelligence ("AI") or learning model (implemented as a set of programmable codes) to its own environment wherein the actions of the operator controllable device 12 are learned by the AI model using data generated by way of the analogous operator control of the operator controllable device 12 in a training environment. The training environment may be the same as the production or run-time environment.

Processor Circuit—Operator Controllable Device

Figure 2:
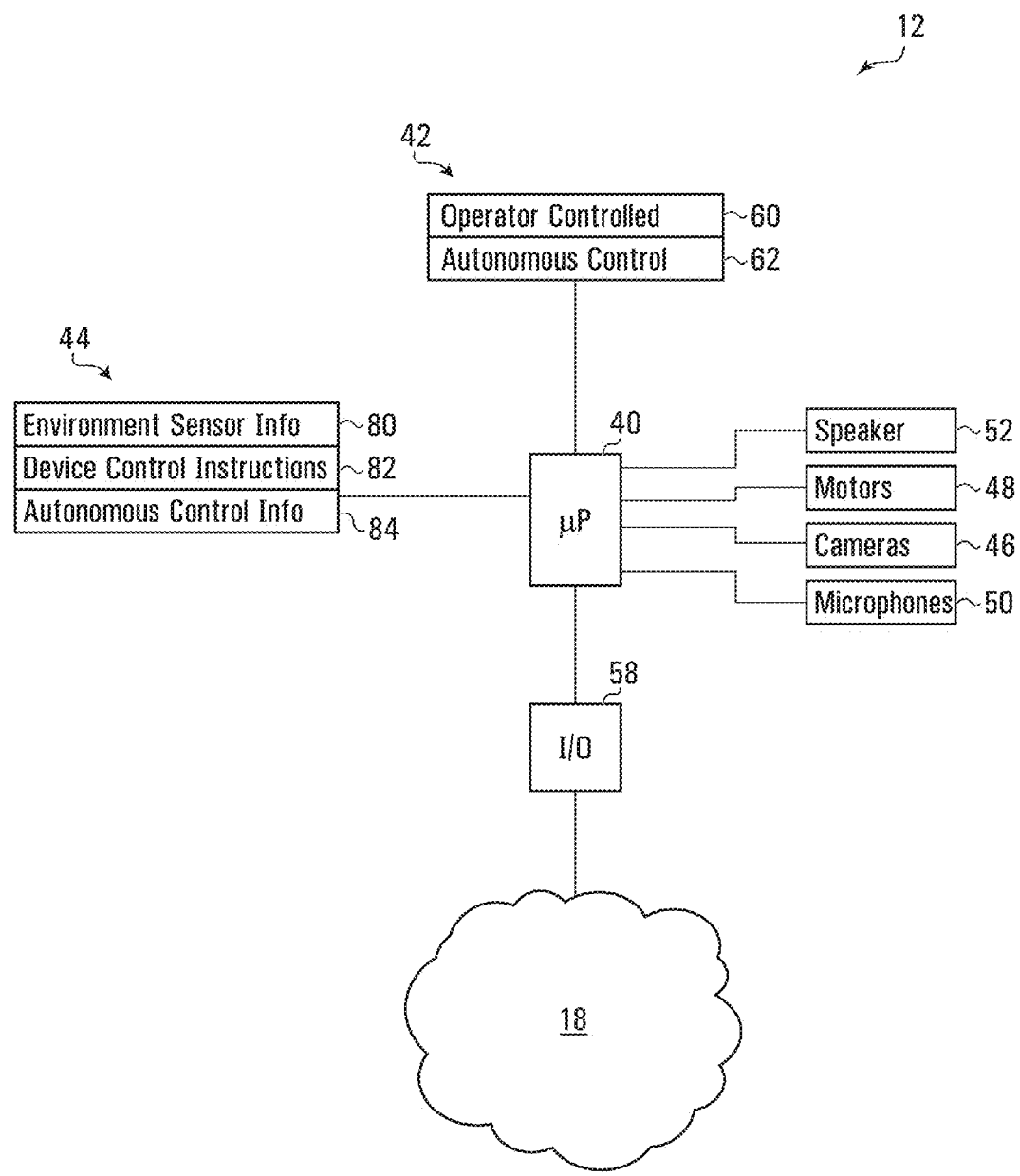
FIG. 2 is a schematic view of a processor circuit for implementing an operator controllable device shown in FIG. 1.

Referring to FIG. 2, a schematic view of a processor circuit for implementing the operator controllable device 12 shown in FIG. 1 according to one embodiment is shown. The operator controllable device 12 includes a device processor 40, a program memory 42, a variable memory 44, cameras 46, motors 48, microphones 50, a speaker 52 and an input/output ("I/O") interface 58, all of which are in communication with the device processor 40. The I/O interface 58 may include a network interface having a network interface card with an input/output for connecting to the network 18, and through which communications may be conducted with devices connected to the network 18, such as the operator interface 14 and the analyzer 16 shown in FIG. 1.

Referring to FIG. 2, in various embodiments, program codes for directing the device processor 40 to carry out various functions are stored in the program memory 42, which may be implemented as a read only memory (ROM), random access memory (RAM), a hard disk drive (HDD), a network drive, flash memory, any other form of computer-readable memory or storage medium, and/or a combination thereof.

In various embodiments, the program memory 42 includes a block of codes 60 for directing the operator controllable device 12 to effect operator controlled functions and a block of codes 62 for directing the operator controllable device 12 to effect autonomous control functions.

In this specification, it may be stated that certain encoded entities such as applications perform certain functions. Whenever an application or encoded entity is described as taking an action, it will be understood that a processor (e.g. the device processor 40) directed or caused the action by way of execution of programmable codes or processor readable instructions defining or forming part of the application.

The variable memory 44 includes a plurality of storage locations including location 80 for storing environment sensor information and location 82 for storing device control instructions. In some embodiments, the variable memory includes location 84 for storing autonomous control information.

In various embodiments, the variable memory 44 may be implemented as RAM, a hard drive, a network drive, flash memory, a memory stick or card, any other form of computer-readable storage medium or a combination thereof.

In various embodiments, the operator controllable device 12 may be controllable by a human operator via the operator interface 14 (for example, as shown in FIG. 1). In such embodiments, the sensors and actuator and/or output devices of the operator controllable device 12 (i.e., the cameras 46, motors 48, microphones 50, and speaker 52) may be positioned and oriented to sense and react to an environment of the operator controllable device 12 in an analogous way to a human being.

In various embodiments, the cameras 46, other imagers, may act analogously to an operator's eyes and include first and second cameras spaced apart to provide binocular vision information. In various embodiments, the operator controllable device 12 may include a mechanical neck controllable by one or more of the motors 48 that may act analogously to an operator's neck. The motors 48 may include first and second servomotors which act as neck servomotors for controlling the mechanical neck, which is connected to the cameras 46 such that movement of the neck servomotors moves a target area or orientation of the cameras 46.

In various embodiments, the microphones 50 may act analogously to an operator's ears and may include two microphones positioned and oriented compared to the cameras 46, generally analogously to how ears are positioned and oriented compared to eyes on a human being. The speaker 52 may act analogously to an operator's vocal apparatus (i.e., for providing speech communication capabilities) and may be positioned and oriented compared to the cameras 46 and the microphones 50 analogously to how a mouth is positioned and oriented compared to eyes and ears of a human being.

In various embodiments, the operator controllable device 12 may include a mechanical arm including a mechanical shoulder with two degrees of freedom and an elbow with one degree of freedom and a gripper or end effector. The mechanical shoulder, elbow, and gripper may be controllable by one or more of the motors 48 to cause the mechanical arm and gripper to act analogously to an operator's arm and hand. In various embodiments, the motors 48 may include third and fourth servomotors acting as shoulder servomotors for controlling a mechanical shoulder of the mechanical arm, a fifth servomotor acting as an elbow servomotor for controlling an elbow of the mechanical arm, and a sixth servomotor acting as a gripper servomotor for controlling a gripper attached to the end of the mechanical arm.

Processor Circuit—Operator Interface

Figure 3:
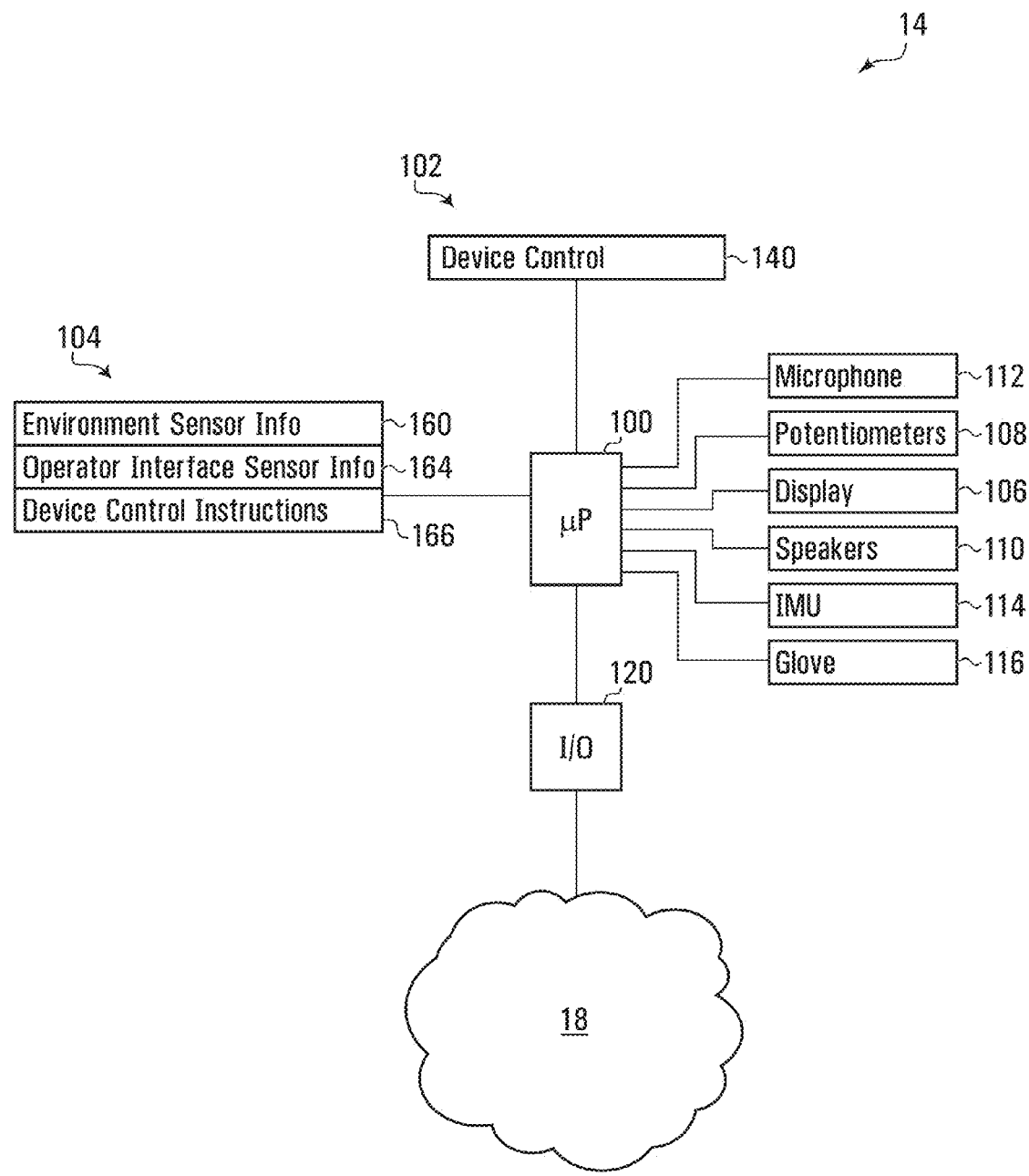
FIG. 3 is a schematic view of a processor circuit for implementing an operator interface shown in FIG. 1.

Referring to FIG. 3, a schematic view of a processor circuit for implementing the operator interface 14 shown in FIG. 1 according to one embodiment is shown. The operator interface 14 includes an operator interface processor 100, a program memory 102, a variable memory 104, displays 106, potentiometers 108, speakers 110, a microphone 112, an inertial measurement unit ("IMU") 114, a haptic glove or manipulator interface 116 and an input/output ("I/O") interface 120, all of which are in communication with the operator interface processor 100.

In various embodiments, an operator interface generally similar to the operator interface 14 shown in FIG. 3 may include additional or alternative motors, sensors, and/or output devices, such as, for example, as described in further detail with reference to FIGS. 15-18 below. In some embodiments, for example, the operator interface may include input mechanisms such as, a motion capture system, or a computer interface input for a web version of the interface involving a keyboard, mouse, joystick, or gaming style inputs that may, in various embodiments, utilize game controllers.

In various embodiments, the program memory 102, variable memory 104, and I/O interface 120 may be implemented, for example, as described for the program memory 42, variable memory 44, and I/O interface 58 of the operator controllable device 12 shown in FIG. 2.

In various embodiments, the program memory 102 includes a block of codes 140 for directing the operator interface 14 to effect device control functions.

The variable memory 104 includes a plurality of storage locations including location 160 for storing device environment sensor information, location 164 for storing operator interface sensor information, and location 166 for storing device control instructions.

In various embodiments, the operator interface 14 may be configured to be interacted with by a human operator. In such embodiments, the sensors and actuator and/or output devices of the operator interface 14 (i.e., the displays 106, potentiometers 108, microphone 112, and speakers 110) may be configured to be interacted with by a human operator such that the operator is able to experience and react to a representation or simulation of an environment sensed by the operator controllable device 12 shown in FIG. 2.

In various embodiments, operator interface 14 may include a virtual reality headset, such as, for example an Oculus Rift™, configured to be worn by the operator. The virtual reality headset may include left and right displays, which may act as the displays 106, for displaying left and right images to left and right eyes of an operator. The virtual reality headset may include the IMU 114, which may be configured to be mounted on the operator's head and sense position and orientation of the operator's head.

The operator interface 14 may include an operator wearable arm and shoulder mount to which the potentiometers 108 are connected. The potentiometers may include first and second potentiometers for measuring a shoulder position of the operator and a third potentiometer for measuring an elbow position of the operator.

The operator interface 14 may include headphones which may act as the speakers 110 and include left and right speakers. The microphone 112 may be mounted to the headphones and configured to sense speech from a vocal apparatus of the operator. The haptic glove 116 may be configured to sense movement and orientation of a hand of the operator.

Processor Circuit—Analyzer

Figure 4:
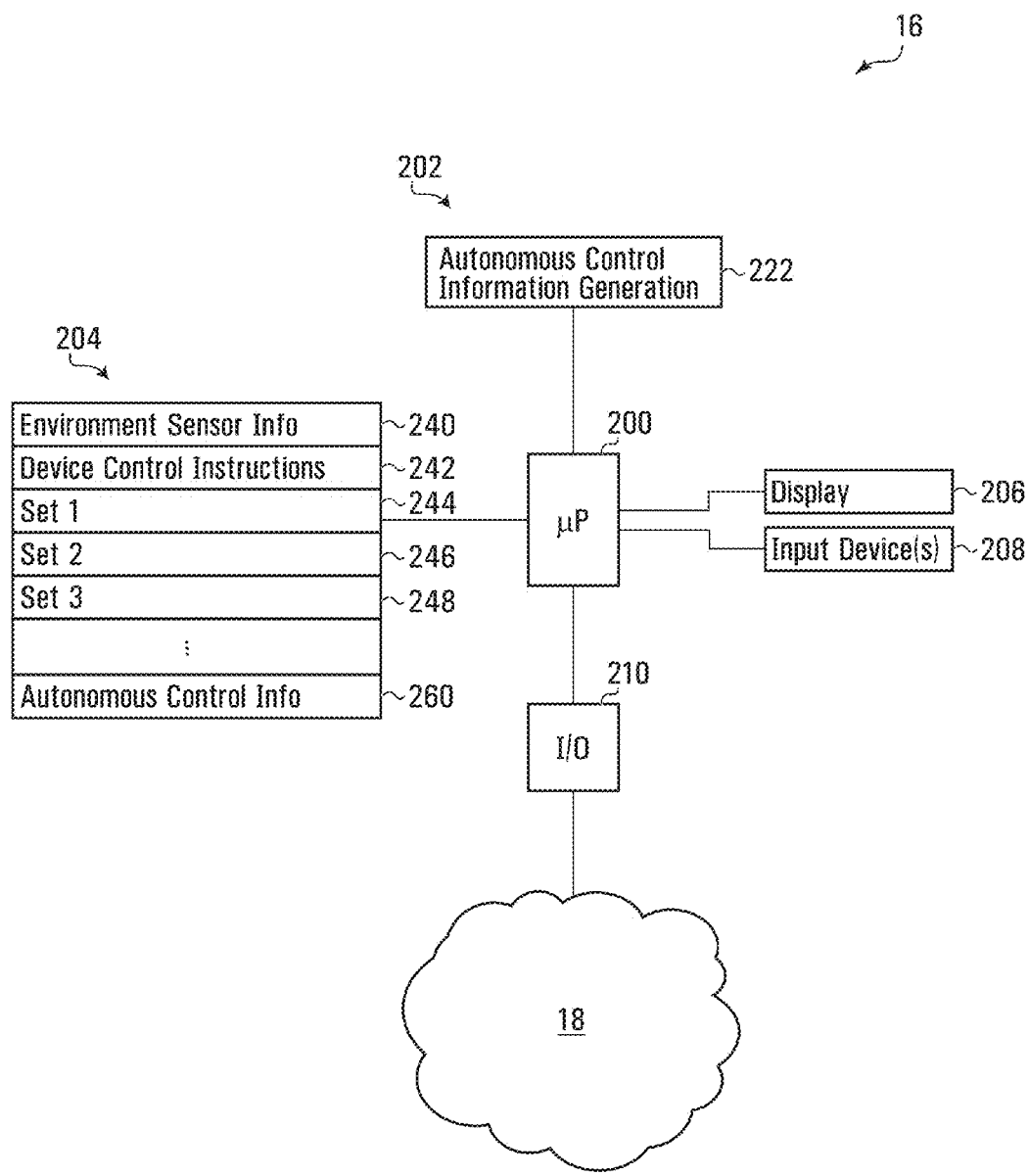
FIG. 4 is a schematic view of a processor circuit for implementing an analyzer shown in FIG. 1.

Referring to FIG. 4, a schematic view of a processor circuit for implementing the analyzer 16 shown in FIG. 1 according to one embodiment is shown. The analyzer 16 includes an analyzer processor 200, a program memory 202, a variable memory 204, a display 206, one or more input devices 208, and an input/output ("I/O") interface 210, all of which are in communication with the analyzer processor 200.

In various embodiments, the program memory 202, variable memory 204, and I/O interface 210 may be implemented, for example, as described for the program memory 42, variable memory 44, and I/O interface 58 of the operator controllable device 12 shown in FIG. 2. The one or more input devices 208 may include a pointing device such as a cursor or mouse and/or a text input device such as a keyboard.

In various embodiments, the program memory 202 includes a block of codes 222 for directing the analyzer 16 to effect autonomous control information generation functions.

The variable memory 204 includes a plurality of storage locations including location 240 for storing environment sensor information, location 242 for storing device control instructions and locations 244, 246, and 248 for storing sets of associated environment sensor information and device control instructions. The variable memory 204 also includes location 260 for storing autonomous control information.

In various embodiments, any or all of the operator controllable device 12, the operator interface 14, and the analyzer 16 shown in FIG. 1 may each be implemented using one or more processor circuits each including one or more processors, for example. In various embodiments, any or all of the operator controllable device 12, the operator interface 14, and the analyzer 16 shown in FIG. 1 may also or alternatively be implemented in whole, or in part, in the cloud, connected to the network 18 and/or as a GPU bank, for example.

Facilitating Device Control

As discussed above, in various embodiments, the operator controllable device 12 shown in FIG. 1 may be controlled by an operator using the operator interface 14 to facilitate device control.

Figure 5:
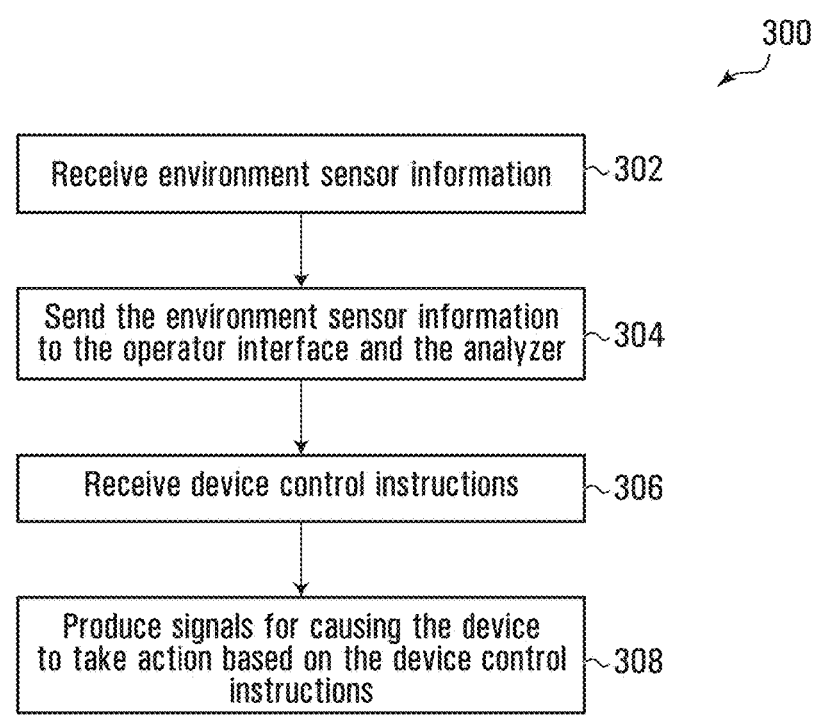
FIG. 5 is a flowchart depicting blocks of code for directing the operator controllable device shown in FIG. 2 to facilitate device control.

Referring to FIG. 5, a flowchart 300 is generally shown depicting blocks of code for directing the device processor 40 shown in FIG. 2 to facilitate operator controlled functions. The flowchart 300 may be encoded in the block of codes 60 shown in FIG. 2 for directing the device processor 40 to effect operator controlled functions.

Referring to FIG. 5, the flowchart 300 begins with block 302 which directs the device processor 40 shown in FIG. 2 to receive environment sensor information representing an environment of the operator controllable device 12 or aspects of that environment. In various embodiments, block 302 may direct the device processor 40 to store a representation of the received environment sensor information in the location 80 of the variable memory 44 shown in FIG. 2.

In various embodiments, block 302 of FIG. 5 may direct the device processor 40 of FIG. 2 to store the representation of the environment sensor information as one or more device environment frame records, with each frame record associated with a time. In various embodiments, the frame records may be sampled at a frame rate, which in some embodiments may be, for example, 30 frames per second such that the representation of the environment sensor information may include 30 frame records for every second (or in other embodiments, in fewer or greater frames per second).

FIG. 6 depicts an exemplary device environment frame record 350 used to store and organize environment sensor information collected by the operator controllable device 12 or components thereof from the environment in which the operator controllable device 12 is situated in accordance with one embodiment. The device environment frame record 350 includes a left image field 352, a right image field 354, a left audio field 356, a right audio field 358, a first motor position field 360, a second motor position field 362, a third motor position field 364, a fourth motor position field 366, a fifth motor position field 368, a sixth motor position field 370, and a time field 372. In some embodiments, separate frame records may be used for any subset of information included in the frame record 350 shown in FIG. 6.

In various embodiments, block 302 shown in FIG. 5 may direct the device processor 40 to query the cameras 46 shown in FIG. 2 and receive image information from the cameras 46. As discussed above, the cameras 46 may include left and right cameras and thus the image information may include left and right image information. In various embodiments, each of the left and the right image information may include a representation of one or more images which may, for example be 640×480 pixel RGB images. In other embodiments, greater or lesser resolutions may be used. For example, in some embodiments, the images may each have a resolution of between about 640×480 and 1920×1080. In some embodiments, the images may have a resolution of 1024×576, for example. Block 302 may direct the device processor 40 to store the left and right image information in the left and right image fields 352 and 354 of the device environment frame record 350 shown in FIG. 6.

In various embodiments, the environment of the operator controllable device 12 may include an object (by way of example only, a coffee cup), and the left and right image fields 352 and 354 of the device environment frame record 350 may store image information representing two different views of the object.

In various embodiments, block 302 shown in FIG. 5 may direct the device processor 40 to query the microphones 50 shown in FIG. 2 and receive audio information from the microphones 50. As discussed above, the microphones 50 may include left and right microphones and thus the audio information may include left audio information and right audio information. In various embodiments, the audio information may be sampled at the frame rate of 30 frames per second, for example. The microphones 50 may capture audio signals at or about 22 kHz and so, in various embodiments, each of the left and right audio information may include approximately 733 subsamples. Block 302 may direct the device processor 40 to store representations of the left and right audio information in the left and right audio fields 356 and 358 of the device environment frame record 350 shown in FIG. 6.

In various embodiments, the environment of the operator controllable device 12 collected may include a contextual sound wave communication, such as a person asking "How is the coffee?", and the left and right audio fields 356 and 358 of the device environment frame record 350 may store audio information representing the sound wave communication sensed from the microphones 50.

In various embodiments, block 302 shown in FIG. 5 may direct the device processor 40 to query the motors 48 shown in FIG. 2 and receive position information from the motors 48. As discussed above, the motors 48 may include two neck servomotors (one yaw neck servomotor and one pitch neck servo motor), one gripper servomotor, one elbow servomotor, and two shoulder servomotors, and each of the servomotors may be configured to sense an angle representing an angle or position of the motor. In various embodiments, block 302 may direct the device processor 40 to receive a value for each of the servomotors included in the motors 48, the value representing a position of the particular servomotor.

Block 302 may direct the device processor 40 to store the values representing the positions of the servomotors in the motor position fields 360, 362, 364, 366, 368, and 370 of the device environment frame record 350. In various embodiments, the motor position fields 360, 362, 364, 366, 368, and 370 may act as a position vector defining a position associated with the operator controllable device 12. In the embodiment shown, each of the values is a decimal number between 0 and 1, where 0 may represent a home position for the motor, 0.5 representing a mid-point rotation and 1 representing a maximal rotation. The mid-point rotation may be 180 degrees and the maximal rotation may be 360 degrees, for example. The effective range or maximal rotation of the motors in various embodiments may be different from 360 degrees as in the example above. In such a case the normalized 0-1 values would simply be normalized with respect to the effective range of the motor in question. In general, motors on embodiments of the operator controllable device may be explicitly limited to a maximal degree of rotation, whether this was done to simulate the range of the analogous human limb, or for an alternate reason. For example, Dynamixel Motors have an effective range of 300 degrees. In some embodiments, each joint on a device may be explicitly limited to have a particular range, generally less than the maximum allowable by the motor (e.g., for Dynamixel motors, 300 degrees).

Block 302 shown in FIG. 5 may also direct the device processor 40 shown in FIG. 2 to store a representation of a time, at which the information stored in the fields 352-370 of the device environment frame record 350 was sampled, in the time field 372. In the embodiment shown in FIG. 6, the format of the representation stored in the time field 372 represents a time and date where the time is accurate to a hundredth of a second although other degrees of accuracy may be used in various embodiments.

Referring to FIG. 5, block 304 then directs the device processor 40 to send the environment sensor information to the operator interface 14 and/or the analyzer 16. In various embodiments, block 304 may direct the device processor 40 to retrieve the representation of the environment sensor information from the location 80 of the variable memory 44 and send the representation to the operator interface 14 and the analyzer 16 via the I/O interface 58 and the network 18, for example.

In some embodiments, block 304 may direct the device processor 40 to execute block 304 periodically to send representations of new environment sensor information at an environment refresh rate which may, in some embodiments differ from the frame rate. For example, in various embodiments, block 304 may direct the device processor 40 to send representations of new environment sensor information to the operator interface 14 and the analyzer 16 at 10 times per second and thus, where block 302 directs the device processor 40 to sample 30 device environment frame records per second, block 304 may direct the device processor 40 to send to the operator interface 14 and the analyzer 16, three device environment frame records at a time, ten times per second.

Figure 7:
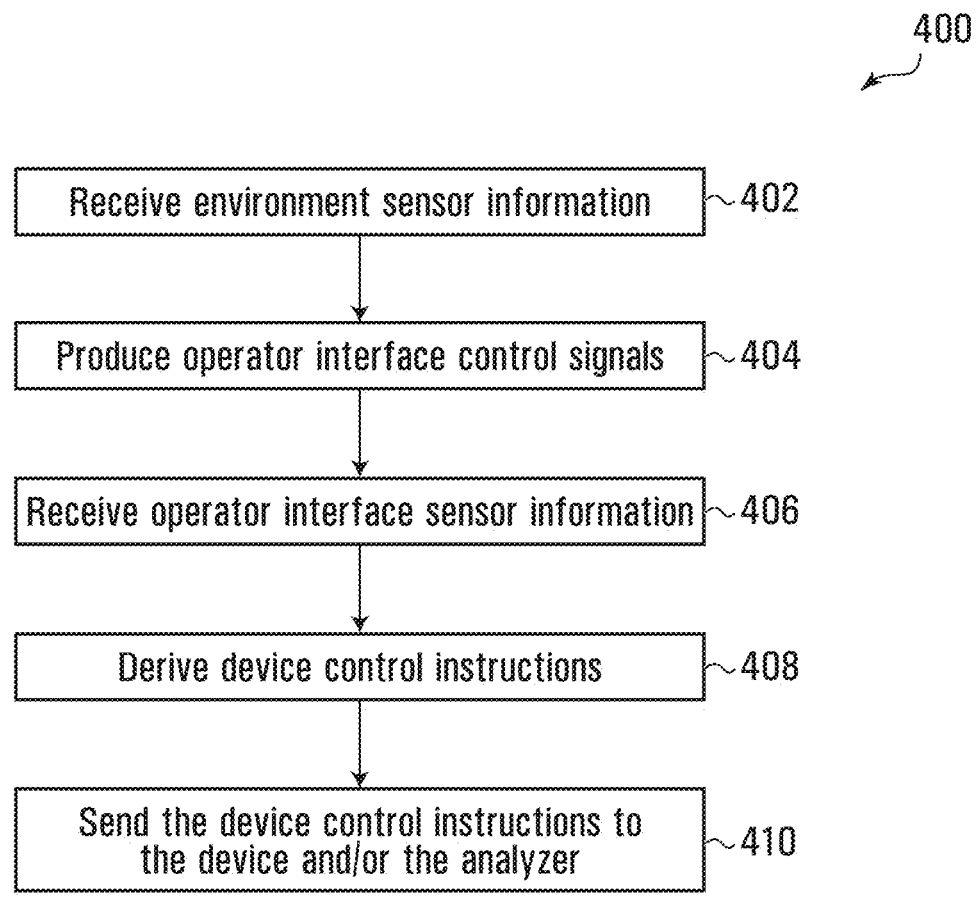
FIG. 7 is a flowchart depicting blocks of code for directing the operator interface shown in FIG. 3 to facilitate device control.

Referring now to FIG. 7, there is shown a flowchart 400 which may be carried out concurrently with flowchart 300. Flowchart 400 depicts blocks of code for directing the operator interface 14 shown in FIG. 3 to facilitate device control. Flowchart 400 may be encoded in the block of codes 140 shown in FIG. 3 for directing the operator interface processor 100 to effect device control functions.

Referring to FIG. 7, the flowchart begins with block 402 which, in various embodiments may be executed after block 304 shown in FIG. 5 has been executed. Block 402 directs the operator interface processor 100 shown in FIG. 3 to receive environment sensor information. In various embodiments, block 402 may direct the operator interface processor 100 to receive representations of environment sensor information that were sent by the device processor 40 at block 304 shown in the flowchart 300. Block 402 may direct the operator interface processor 100 to receive the representations of the environment sensor information via the network 18 and the I/O interface 120, for example. In various embodiments, block 402 may direct the operator interface processor 100 to store the representations of the environment sensor information in the location 160 of the variable memory 104 shown in FIG. 3.

Block 404 directs the operator interface processor 100 to produce operator interface control signals derived from the environment sensor information. In various embodiments, the operator interface control signals may be configured to cause the operator interface 14 to simulate the environment represented by the environment sensor information, for an operator interacting with the operator interface 14. In such embodiments, this may allow for the simulation and feedback to the operator via the operator interface 14 of some or more of the environmental conditions in which the operator controllable device 12 is situated as such environmental conditions are captured by the environmental sensor information communicated to the operator interface 14 from the operator controllable device 12.

In various embodiments, block 404 directs the operator interface processor 100 to retrieve the representations of the environment sensor information stored in the location 160 and to produce signals based on the representations.

As discussed above, left and right displays of a virtual reality headset, which may be worn by the operator, may act as the displays 106. In various embodiments, for example, where a device environment frame record such as the device environment frame record 350 shown in FIG. 6 has been stored in the location 160 of the variable memory 104 shown in FIG. 3, block 404 may direct the operator interface processor 100 to produce signals for causing one or more images represented by the image information stored in the left image field 352 to be displayed by the left display of the virtual reality headset and block 404 may direct the operator interface processor 100 to produce signals for causing one or more images represented by the image information stored in the right image field 354 to be displayed by the right display of the virtual reality headset. Accordingly, in various embodiments, an operator wearing the virtual reality headset and interacting with the operator interface 14 may experience a binocular representation or simulation of the visual environment in which the operator controllable device 12 is situated.

In various embodiments, block 404 may direct the operator interface processor 100 to cause various heads-up display items to be displayed to the operator to enhance the embodiment experience. For example, in various embodiments, if movements made by the operator are approaching an end of a range of allowed movements for the operator controllable device 12 (or predetermined limits as to the range or degree of movement or motion of the operator controllable device 12), block 404 may direct the operator interface processor 100 to cause the operator's display to flash red or display some other form of warning message for the operator.

As discussed above, the operator interface 14 may include headphones which may include left and right speakers and act as the speakers 110. In various embodiments, where a device environment frame record such as the device environment frame record 350 shown in FIG. 6 has been received and stored in the location 160 of the variable memory 104 shown in FIG. 3, block 404 shown in FIG. 7 may direct the operator interface processor 100 shown in FIG. 3 to produce signals for causing audio represented by the audio information stored in the left audio field 356 to be output by the left speaker of the headphones and to produce signals for causing audio represented by the audio information stored in the right audio field 358 to be output by the right speaker of the headphones. Accordingly, in various embodiments, an operator wearing the headphones and interacting with the operator interface 14 may experience an auditory representation or simulation of the auditory environment of the operator controllable device 12.

In various embodiments, an operator interacting with the operator interface 14 shown in FIG. 3 may experience a representation or simulation of the environment in which the operator controllable device 12 (in FIG. 2) is situated. In some embodiments, the operator may wish to control the operator controllable device 12 to cause the operator controllable device 12 to perform a task. To do so, the operator may take one or more actions via the operator interface 14 to control or alter the operation of the operator controllable device 12 in response to the representation of the environment or portions thereof received by the operator interface 14 and communicated to the operator. Block 406 may direct the operator interface processor 100 to receive operator interface sensor information representing the action taken by the operator via the operator interface 14 and to be used to control or alter the operation of the operator controllable device 12.

In various embodiments, block 406 may direct the operator interface processor 100 to receive the operator interface sensor information from sensors of the operator interface 14 and to store a representation of the operator interface sensor information in the location 164 of the variable memory 104. In various embodiments, block 406 may direct the operator interface processor 100 to store the representation as one or more operator interface sensor frame records.

Figure 8:
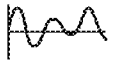
FIG. 8 is a representation of an exemplary operator interface sensor frame record used in the system shown in FIG. 1.

FIG. 8 depicts an exemplary operator interface sensor frame record 450 in accordance with one embodiment. The operator interface sensor frame record 450 includes an operator audio field 452 for storing a representation of audio information received from the microphone 112 and an IMU x-axis field 462 and an IMU z-axis field 464 for storing angle values representing x-axis and z-axis orientations of the IMU 114. The operator interface sensor frame record 450 also includes first, second, and third potentiometer fields 454, 456, and 458 for storing respective representations of position information received from the potentiometers 108 and a haptic glove condition field 466 for storing a representation of a condition of the haptic glove 116. The operator interface sensor frame record also includes a time field 468 for storing a representation of a time when the information stored in the fields 452-466 was sampled.

In various embodiments, block 406 may direct the operator interface processor 100 to query the microphone 112 and receive audio information from the microphone 112. In various embodiments the audio information may represent speech information received from an operator interacting with the operator interface 14. Block 406 may then direct the operator interface processor 100 to store the audio information in the operator audio field 452 of the operator interface sensor frame record 450 shown in FIG. 8.

In various embodiments, block 406 shown in FIG. 7 may direct the operator interface processor 100 to query the IMU 114 shown in FIG. 3 and receive values representing an x-axis angle and a z-axis angle of an operator's head. Block 406 may direct the operator interface processor 100 to store the values in the IMU x-axis and IMU z-axis fields 462 and 464 of the operator interface sensor frame record 450 shown in FIG. 8.

In various embodiments, the operator may begin moving their head using their neck to look more closely at the coffee cup displayed for them and so the operator may cause the values in the IMU x-axis and IMU z-axis fields 462 and 464 of the operator interface sensor frame record 450 to represent a new head position.

In various embodiments, block 406 shown in FIG. 7 may direct the operator interface processor 100 to query the first and second potentiometers of the potentiometers 108 shown in FIG. 3 to determine an orientation of a shoulder of the operator and to query the third potentiometer to determine an orientation of an elbow of the operator. Block 406 may direct the operator interface processor 100 to receive from the first, second, and third potentiometers values representing angles of the potentiometers. Block 406 may direct the operator interface processor 100 to store the values representing angles of the first, second, and third potentiometers in the first, second, and third potentiometer fields 454, 456, and 458 respectively of the operator interface sensor frame record 450 shown in FIG. 8.

In various embodiments, the operator may have begun moving their arm to cause the operator controllable device 12 to reach out to a detected object (by way of example only, a coffee cup) from the environment of the operator controllable device 12, wherein a representation of the detected object is displayed to the operator via the operator interface 14 so that the operator can cause the operator controllable device 12 to interact with the object. The operator interface 14 may be configured to allow the operator to cause the values in the first, second, and third potentiometer fields 454, 456, and 458 of the operator interface sensor frame record 450 to reflect one or more new arm and shoulder positions to facilitate such interaction by the operator controllable device 12 to interact with the object.

In various embodiments, block 406 shown in FIG. 7 may direct the operator interface processor 100 to query the haptic glove 116 shown in FIG. 3 and receive a value from the haptic glove 116 representing a condition sensed by the glove. For example, in various embodiments, the haptic glove may provide a value between 0 and 100 wherein 0 corresponds to a closed condition and 100 corresponds to a fully open condition of an operator's hand within the haptic glove 116. Block 406 may direct the operator interface processor 100 to store the value received from the haptic glove 116 in the haptic glove condition field 466.

In various embodiments, the operator may begin opening their hand to cause the gripper of the operator controllable device 12 to open and so the operator may cause the values in the haptic glove condition field 466 of the operator interface sensor frame record 450 to reflect an opening hand.

Block 406 shown in FIG. 7 may direct the operator interface processor 100 shown in FIG. 3 to store a time associated with the operator interface sensor information represented by the information stored in the fields 452-466 in the time field 468. In the embodiment shown in FIG. 8, the operator interface sensor frame record 450 represents operator interface sensor information that was sensed shortly after the environment sensor information, possibly on the order of a hundredth of a second, represented by the device environment frame record 350 shown in FIG. 6 was sensed.

Block 408 shown in FIG. 7 then directs the operator interface processor 100 to derive device control instructions from the operator interface sensor information, the device control instructions being configured to cause the operator controllable device 12 to simulate or replicate the at least one action taken by the operator. In various embodiments, block 408 may direct the operator interface processor 100 to store a representation of the device control instructions in the location 166 of the variable memory 104. The representation of the device control instructions may include one or more device control instructions frame records, each representing device control instructions associated with a time.

Figure 9:
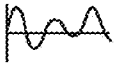
FIG. 9 is a representation of an exemplary device control instructions frame record used in the system shown in FIG. 1.

An exemplary device control instructions frame record 500 according to one embodiment is shown in FIG. 9. The device control instructions frame record 500 includes a speaker control field 502 for storing audio information to be output by a speaker such as the speaker 52 of the operator controllable device 12 shown in FIG. 2. The device control instructions frame record 500 also includes first, second, third, fourth, fifth and sixth motor control fields 504, 506, 508, 510, 512, and 514 for storing motor control instructions for controlling motors such as the first, second, third, fourth, fifth, and sixth servomotors of the motors 48 of the operator controllable device 12 shown in FIG. 2. In the embodiment shown, the motor control instructions represent a desired position of a motor. The device control instructions frame record also includes a time field 516 for storing a time associated with the instructions represented by the fields 502-514.

In various embodiments, block 408 of FIG. 7 may direct the operator interface processor 100 shown in FIG. 3 to derive information for the fields 502-514 of the device control instructions frame record 500 shown in FIG. 9 from fields of an operator interface frame record, such as the fields 452-468 of the operator interface sensor frame record 450 shown in FIG. 8.

For example, in various embodiments, block 408 of FIG. 7 may direct the operator interface processor 100 shown in FIG. 3 to copy audio information stored in the operator audio field 452 of the operator interface sensor frame record 450 shown in FIG. 8 into the speaker control field 502 of the device control instructions frame record 500 shown in FIG. 9. Block 408 may direct the operator interface processor 100 to copy the values representing angles from the potentiometer fields 454, 456, and 458 of the operator interface sensor frame record 450 into the first, second, and third motor control fields 504, 506, and 508 of the device control instructions frame record 500.

In various embodiments, block 408 may direct the operator interface processor 100 to copy the angle values from the IMU x-axis and the IMU z-axis fields 462 and 464 of the operator interface sensor frame record 450 into the fourth and fifth motor control fields 510 and 512 of the device control instructions frame record 500.

In various embodiments, block 408 may direct the operator interface processor 100 to scale the value stored in the glove condition field 466 by a scaling factor to produce a desired position value that may act as motor control instructions and to store the desired position value in the sixth motor control field 514.

In various embodiments, other functions besides copying and scaling may be used to derive the device control instructions. In various embodiments, block 408 may direct the operator interface processor 100 to apply audio encoding, vocoders or vocal encoders, text-to-speech and/or speech-to-text functions to the operator interface sensor information on the fly. In various embodiments, a voice of an operator may be modulated, for example by sending it through a vocoder or vocal encoder, to produce a variety of voices.

In various embodiments, this may provide a range of personalities that can be embodied by the operator controllable device 12, which may facilitate tailoring the operator controllable device 12 to a specific environment or user interacting with the device. In various embodiments, such tailoring may facilitate use of the operator controllable device 12 as a companion, where a companion may be an entity with which a human can communicate and interact.

In some embodiments, block 408 may direct the operator interface processor 100 to apply transformations to the operator interface sensor information when deriving device control instructions which may smooth actions taken by the operator controlled device as a result of the device control instructions. For example, in one embodiment a non-linear response function may be applied to the operator interface sensor information, such as, for example, by scaling down the operator interface sensor information when deriving the device control instruction records if the operator is approaching a limit of the environment and/or the operator controllable device. This may facilitate slowing of movements of the operator controllable device 12 towards a limit, when the operator controllable device nears the limit. The limit or end of range of extension of a particular servo may be defined to generally mimic the range of the analogous joint in a human. For example, in one embodiment the operator may extend their right arm with a particular speed and in a particular direction and as a result of instructions from the operator interface 14 an arm on the operator controllable device 12 will also extend its arm in the same or similar speed and direction. As the operator controllable device approaches the limit or end of its range of extension, the velocity of operator controllable device right arm may be scaled down by modifying device control instructions being generated from actions of the operator at the operator interface 14 to slow the speed of arm extension of the operator controllable device 12. In various embodiments the speed of extension of the arm of the operator interface 14 may not change even though the speed of extension of the comparable arm of the operator controllable device 12 is scaled down.

In various embodiments, block 408 may direct the operator interface processor 100 to recognize a gesture made by an operator using functional mappings. Block 408 may direct the operator interface processor 100 to include in a set of device control instruction records, a set of pre-saved device control instructions for a particular pre-recorded set of actuations. For example, in various embodiments, the pre-recorded set of actuations may include facial expressions and/or common gestures.

Block 410 of the flowchart 400 shown in FIG. 7 then directs the operator interface processor 100 shown in FIG. 3 to send the device control instructions to the operator controllable device 12 and/or the analyzer 16 shown in FIG. 1. In various embodiments, block 410 may direct the operator interface processor 100 to retrieve a representation of the device control instructions from the location 166 of the variable memory 104 and to send the representation to the operator controllable device 12 and the analyzer 16 via the I/O interface 120 and the network 18.

Referring again to FIG. 5, block 306 directs the device processor 40 shown in FIG. 2 to receive device control instructions. In various embodiments, block 306 may direct the device processor 40 to receive a representation of device control instructions via the I/O interface 58 and the network 18. The representation of the device control instructions may have been sent by the operator interface 14 at block 410 of the flowchart 400 shown in FIG. 7, for example. In various embodiments, block 306 directs the device processor 40 to store the representation of the device control instructions in the location 82 of the variable memory 44.

Block 308 shown in FIG. 5 then directs the device processor 40 to produce signals for causing the operator controllable device 12 shown in FIG. 2 to take action based on the device control instructions. In various embodiments, block 308 may direct the device processor 40 to produce signals for causing the operator controllable device 12 to simulate or replicate at least one action taken by an operator experiencing a representation or simulation of the environment of the operator controllable device 12.

In various embodiments, block 308 of FIG. 5 may direct the device processor 40 to read the representation of the device control instructions from the location 82 of the variable memory 44 shown in FIG. 2 and to produce signals based on the device control instructions for causing at least one actuator or output device of the operator controllable device 12 to take action.

For example, in various embodiments a device control instructions frame record such as the device control instructions frame record 500 shown in FIG. 9 may be included in the representation of the device control instructions stored in the location 82 of the variable memory 44 shown in FIG. 2. Block 308 of FIG. 5 may direct the device processor 40 to read audio information from the speaker control field 502 and to produce signals for causing the speaker 52 of the operator controllable device 12 to output audio represented by the audio information. In various embodiments, by outputting the audio represented by the audio information, the speaker 52 may be simulating audio sensed by the microphone 112 of the operator interface 14 and causing the speaker 52 to act analogously to a vocal apparatus of an operator interacting with the operator interface 14.

In various embodiments, block 308 of FIG. 5 may direct the device processor 40 to produce signals for causing one or more of the first, second, third, fourth, fifth, and sixth servomotors of the motors 48 to take action based on the values stored in the motor control fields 504-514 to cause the motors 48 to move to positions that correspond to the positions represented by the values stored in the motor control files 504-514. In various embodiments, by moving according to the motor control fields 504-514, the first, second, third, fourth, fifth, and sixth servomotors of the motors 48 may cause the operator controllable device 12 to act analogously to an operator interacting with the operator interface.

In various embodiments, the first and second servomotors may cause the mechanical neck of the operator controllable device 12 to move based on the values stored in the motor control fields 504 and 506 such that the mechanical neck moves analogously to the neck of the operator interacting with the operator interface 14. The third and fourth servomotors may cause the mechanical shoulder of the operator controllable device 12 to move based on the values stored in the motor control fields 508 and 510 such that the mechanical shoulder moves analogously to the shoulder of the operator, The fifth servomotor may cause the mechanical elbow of the operator controllable device 12 to move based on the values stored in the motor control field 512 such that the mechanical elbow moves analogously to the elbow of the operator, and the sixth servomotor may cause the gripper of the operator controllable device 12 to move based on the value stored in the motor control field 514 such that the gripper moves analogously to a hand of the operator.

In various embodiments, flowcharts 300 and 400 shown in FIGS. 5 and 7 may be executed a plurality of times to facilitate an operator or operators causing the operator controllable device 12 to complete a task repeatedly. In some embodiments, blocks 302 and 304 may be executed continuously and blocks 306 and 308 may be executed continuously and concurrently with blocks 302 and 304.

In some embodiments blocks 402 and 404 may be executed continuously and blocks 406, 408 and 410 may be executed continuously and concurrently with blocks 402 and 404.

For example, in various embodiments, the flowcharts 300 and 400 may facilitate the operator causing the operator controllable device 12 to pick up a coffee cup and/or setting the coffee cup down.

In various embodiments, the operator may cause the operator controllable device 12 to interact with features of its environment. For example, in various embodiments, a feature may be considered to be any aspect of the environment that is not included in the operator controllable device 12.

In some embodiments, blocks similar to blocks 302 and 304 of the flowchart 300 may direct the device processor 40 to receive and send a subset of the sensor information. In some embodiments, blocks 306 and 308 may direct the device processor 40 to receive a subset of the device control instructions.

Similarly, in some embodiments, blocks 402 and 404 of the flowchart 400 shown in FIG. 7 may direct the operator interface processor 100 to receive a subset of the environment sensor information and to produce a subset of operator interface control signals. In some embodiments, blocks 406, 408, and 410 may direct the operator interface processor 100 to receive a subset of operator interface sensor information and derive and send a subset of device control instructions to the operator controllable device 12 and the analyzer 16.

In some embodiments, such as, for example, where subsets of information are being sent, more than one flowchart generally similar to the flowchart 300 and more than one flowchart generally similar to the flowchart 400 may be executed concurrently by one or more processor circuits acting as the processor circuits shown in FIGS. 2 and 3.

Generating Autonomous Control Information

Figure 10:
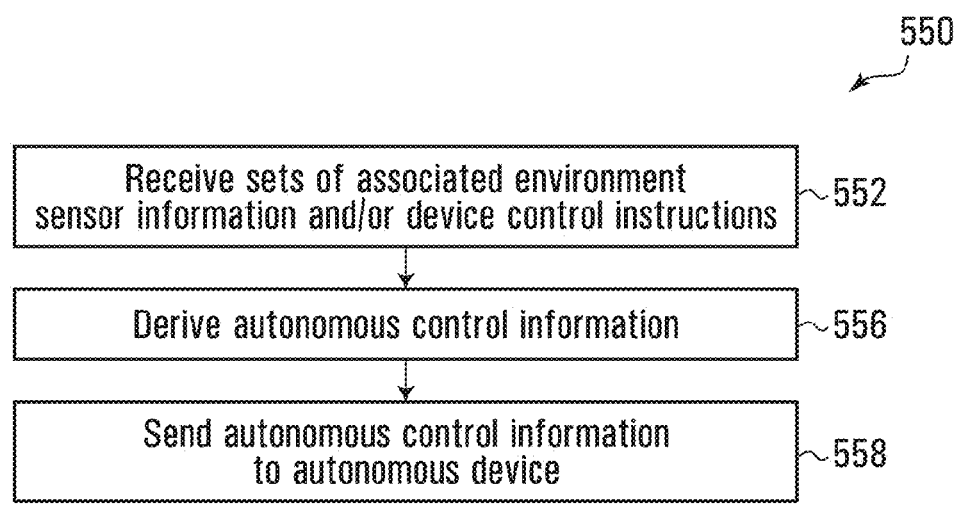
FIG. 10 is a flowchart depicting blocks of code for directing the analyzer shown in FIG. 4 to facilitate autonomous control information generation.

Referring to FIG. 10, a flowchart depicting blocks of code for directing the analyzer processor 200 shown in FIG. 4 to facilitate autonomous control information generation is shown generally at 550. The flowchart 550 may be encoded in the block of codes 222 shown in FIG. 4 for directing the analyzer processor 200 to effect autonomous information generation functions.

Referring to FIG. 10, the flowchart 550 begins with block 552 which directs the analyzer processor 200 shown in FIG. 4 to receive sets of associated environment sensor information and/or device control instructions. In various embodiments, each of the sets may include environment sensor information and/or device control instructions that were used to cause the operator controllable device 12 to complete a task. In various embodiments, block 552 may direct the analyzer processor 200 to receive one or more device environment frame records and/or one or more device control instructions frame records.

In some embodiments, block 552 of FIG. 10 may direct the analyzer processor 200 shown in FIG. 4 to store received environment sensor information in the location 240 of the variable memory 204 and to store received device control instructions in the location 242 of the variable memory 204. In various embodiments, the received environment sensor information and device control instructions may have been sent by the device processor 40 and the operator interface processor 100 at blocks 304 and 410 of flowcharts 300 and 400 shown in FIGS. 5 and 7 respectively.

When a task has been completed, block 552 of FIG. 10 may direct the analyzer processor 200 shown in FIG. 4 to retrieve or receive from the locations 240 and 242 of the variable memory 44 a set of associated environment sensor information and/or device control instructions that were included in the received environment sensor information and device control instructions and which are associated with completion of a task. For example, a user may use the display 206 and the one or more input devices 208 to identify a set of associated environment sensor information and device control instructions that were associated with completion of a task, and the user may cause block 552 to retrieve or receive from the locations 240 and 242 the set of associated environment sensor information and device control instructions that were associated with completion of the task.

In various embodiments, a task may have been started and completed within a particular time period and so a user may cause block 552 of FIG. 10 to direct the analyzer processor 200 shown in FIG. 4 to retrieve from the variable memory 204 a set of associated environment sensor information and device control instructions that include device environment frame records and device control instructions frame records that include time fields storing times that fall within the particular time period. Block 552 may then direct the analyzer processor to store the set as a first set of associated environment sensor information and device control instructions in the location 244 of the variable memory 204. In some embodiments, the user may cause only sets of information associated with a successful completion of the task to be received at block 552.

In various embodiments, some sets of associated environment sensor information and device control instructions may represent a failed attempt at a task. A user may wish to exclude such sets from those considered when generating the autonomous control information. Accordingly, a user may cause frame records belonging to such sets to include a label field value that indicates that the frame record represents a failed task and should be ignored when generating the autonomous control information.

In various embodiments, the operator controllable device 12 shown in FIG. 2 may be directed to complete the same task a plurality of times and thus block 552 of the flowchart 550 shown in FIG. 10 may direct the analyzer processor 200 shown in FIG. 4 to receive a plurality of sets of associated environment sensor information and device control instructions, each associated with an instance of completion of the task. In various embodiments, block 552 may direct the analyzer processor 200 to store each set in the variable memory 204 shown in FIG. 4, such as in the locations 244, 246, and 248.

In various embodiments, for example, block 552 may direct the analyzer processor 200 to receive one or more sets and to store the sets in the variable memory 204. In some embodiments, the analyzer processor 200 may receive between about 1 and about 1 billion sets of data or more. For example, the analyzer processor may receive about 10 thousand sets in certain embodiments, whereas in other embodiments the analyzer processor may receive about 100 million sets.

Block 556 then directs the analyzer processor 200 to derive autonomous control information from the sets of associated environment sensor information and device control instructions. The autonomous control information may be configured to facilitate generating autonomous device control signals from autonomous environment sensor information representing an environment associated with an autonomous device, wherein the autonomous device control signals are configured to cause the autonomous device to take at least one autonomous action.

In various embodiments, the autonomous control information may be configured to produce behaviour in the autonomous device that mimics types of behaviour learned from the actions of operators given similar environment sensor information representing similar situations.

In various embodiments, block 556 of FIG. 10 may direct the analyzer processor 200 shown in FIG. 4 to retrieve from the variable memory 204 the sets of associated environment sensor information and device control instructions including the sets stored in the locations 244, 246, and 248 and to derive a model, such as, for example, a deep hierarchical model, from the sets. In various embodiments, block 556 may direct the analyzer processor 200 to store a representation of the model as autonomous control information in the location 260 of the variable memory 204.

In some embodiments, block 556 may be executed concurrently with an operator using the operator interface 14 to control the operator controllable device 12 (online training). In various embodiments, block 556 may be executed on stored sets of associated environment sensor information and device control instructions that were created in the past (offline training).

In various embodiments block 556 of FIG. 10 may direct the analyzer processor 200 shown in FIG. 4 to use the sets of associated environment sensor information and device control instructions to train machine learning models, such as, deep temporal models, or algorithms, such as, for example, generative deep hierarchical learning algorithms which treat time explicitly. Examples of such models or algorithms include Conditional Deep Belief Networks (CDBN). An exemplary description of a CDBM with a concrete implementation is provided in Taylor, G. (2009). *Composable, distributed-state models for high-dimensional time series*. Ph.D. Thesis. University of Toronto: Canada (http://www.uoguelph.ca/~gwtaylor/thesis/Taylor_Graham_W_200911_PhD_thesis.pdf), hereafter referred to as Taylor (2009).

In some embodiments, block 556 of the flowchart 550 shown in FIG. 10 may direct the analyzer processor 200 to derive weights and/or biases for a CDBN having at its visible layer, bits of information included in the environment sensor information and the device control instructions. Representations of the weights and/or biases may act as the autonomous control information and/or environmental sensor information.

Other algorithms may also or alternatively be used to derive autonomous control information from the sets of associated environment sensor information and/or device control instructions. In some embodiments, any algorithm that predicts a set of device control instructions conditioned on present and past environment sensor information and/or past device control instructions may be used. Examples of these include Conditional Restricted Boltzmann Machines (CRBM), as described in Chapter 4 of Taylor (2009);

Hierarchical Temporal Memory models, such as described in Numenta, Inc (2011). *Hierachical Temporal Memory including HTM Cotical Learning Algorithms* (http://numenta.com/assets/pdf/whitepapers/hierarchical-temporal-memory-cortical-learning-algorithm-0.2.1-en.pdf) hereafter referred to as Numenta (2011); and Conditional Boltzmann Machines, as described in Srivastava N., Salakhutdinov R. (2014). *Multimodal Learning with Deep Boltzmann Machines* (http://jmlr.org/papers/volume15/srivastava14b/srivastava14b.pdf) hereafter referred to as Srivastava and Salahutdinov (2014).

In one embodiment, the block 556 may direct the analyzer processor 200 to derive autonomous control information from a subset of the environment sensor information and the operator control instructions. Specifically, in one embodiment, block 556 may direct the analyzer processor 200 to derive autonomous control information in the form of a learning model from one or more of the left image field 352, the right image field 354, the left audio field 356, the right audio field 358, the first motor position field 360, the second motor position field 362, the third motor position field 364, the fourth motor position field 366, the fifth motor position field 368 and the sixth motor position field 370 of the device environment frame record 350 shown in FIG. 6. Further description of how an analyzer generally similar to the analyzer 16 may derive the autonomous control information is provided below having regard to the operator controllable device 800 shown in FIG. 13 and the operator interface 900 shown in FIG. 16.

Thus, in some embodiments, the analyzer processor 200 may receive sets of environment sensor information without receiving device control instructions and block 556 may direct the analyzer processor to derive the autonomous control information from the received environment sensor information.

Block 558 of FIG. 10 then directs the analyzer processor 200 shown in FIG. 4 to send the autonomous control information to an autonomous device. In various embodiments, the operator controllable device 12 shown in FIG. 2 may be capable of acting as an autonomous device, such as when the operator controllable device 12 executes the block of code 62 shown in FIG. 2, and thus block 558 may direct the analyzer processor 200 to send the autonomous control information to the operator controllable device 12.

In various embodiments, block 558 of FIG. 10 may direct the analyzer processor 200 shown in FIG. 4 to retrieve the autonomous control information from the location 260 of the variable memory 204 and send the autonomous control information to the operator controllable device 12 shown in FIG. 1 via the I/O interface 210 and the network 18, for example.

Autonomous Control

After the autonomous control information has been generated, this information may be used to facilitate autonomous control of an autonomous device. As discussed above, in various embodiments, the operator controllable device 12 may act as an autonomous device.

Figure 11:
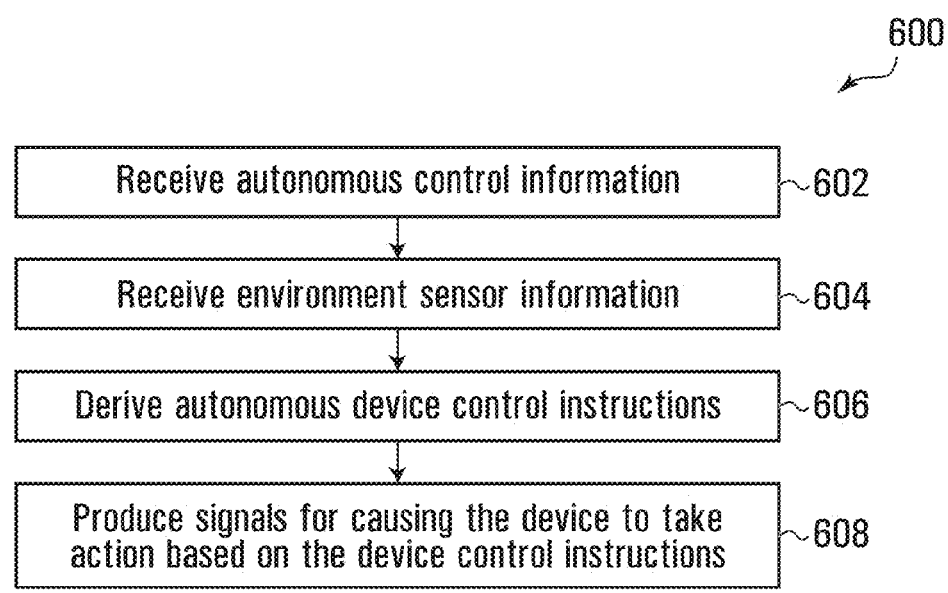
FIG. 11 is a flowchart depicting blocks of code for directing the operator controllable device shown in FIG. 2 to facilitate autonomous control functions.

Referring to FIG. 11, a flowchart depicting blocks of code for directing the device processor 40 shown in FIG. 2 to facilitate autonomous control functions, is shown generally at 600. The flowchart 600 may be encoded in the block of codes 62 for directing the device processor 40 shown in FIG. 2 to effect autonomous control functions.

The flowchart 600 of FIG. 11 begins with block 602 which directs the device processor 40 shown in FIG. 2 to receive autonomous control information. In various embodiments, block 602 may direct the device processor 40 to store the autonomous control information in the location 84 of the variable memory 44.

In various embodiments, block 602 of FIG. 11 may direct the device processor 40 shown in FIG. 2 to receive autonomous control information that was sent by the analyzer processor 200 at block 558 of the flowchart 550 shown in FIG. 10.

Block 604 of FIG. 11 then directs the device processor 40 shown in FIG. 2 to receive environment sensor information. Block 604 may be generally similar to block 302 of the flowchart 300 shown in FIG. 5. Accordingly, block 604 may direct the device processor 40 to store the environment sensor information in the location 80 of the variable memory 44 shown in FIG. 2.

Block 606 of FIG. 11 then directs the device processor 40 shown in FIG. 2 to derive device control instructions from the environment sensor information using the autonomous control information. The derived device control instructions may act as autonomous device control instructions.

In various embodiments, block 606 of FIG. 11 may direct the device processor 40 shown in FIG. 2 to retrieve the autonomous control information from the location 84 of the variable memory 44 and to use the autonomous control information to generate a model which is configured to take, as inputs, the environment sensor information and to produce, as outputs, device control instructions. Block 606 may direct the device processor 40 to input the environment sensor information into the model to generate or derive device control instructions. In various embodiments, block 606 may direct the device processor 40 to store the generated or derived device control instructions in the location 82 of the variable memory 44 as autonomous device control instructions.

In some embodiments blocks similar to the blocks 604 and 606 of flowchart 600 in FIG. 11 may be included in the processor circuit for implementing the analyzer 16 shown in FIG. 4 and the blocks may direct the analyzer processor 200 to derive the autonomous device control instructions and send the autonomous control instructions to the device processor 40 shown in FIG. 2.

Block 608 of FIG. 11 directs the device processor 40 shown in FIG. 2 to produce signals for causing the device to take action based on the device control instructions. In various embodiments, block 608 may direct the device processor 40 to produce device control signals representing the autonomous device control instructions for causing the operator controllable device 12 to take at least one autonomous action. For example, block 608 may direct the device processor 40 to produce signals for causing the speaker 52 and/or one or more of the motors 48 to take action. In various embodiments, block 608 may be generally similar to the block 308 of the flowchart 300 shown in FIG. 5.

Accordingly, in various embodiments, the operator controllable device 12 shown in FIG. 2 may react to environment sensor information and take action and the manner in which the device reacts and takes action may be learned from previously received environment sensor information and/or device control instructions generated during analogous control of the device.

Multiple Devices and Interfaces

Figure 12:
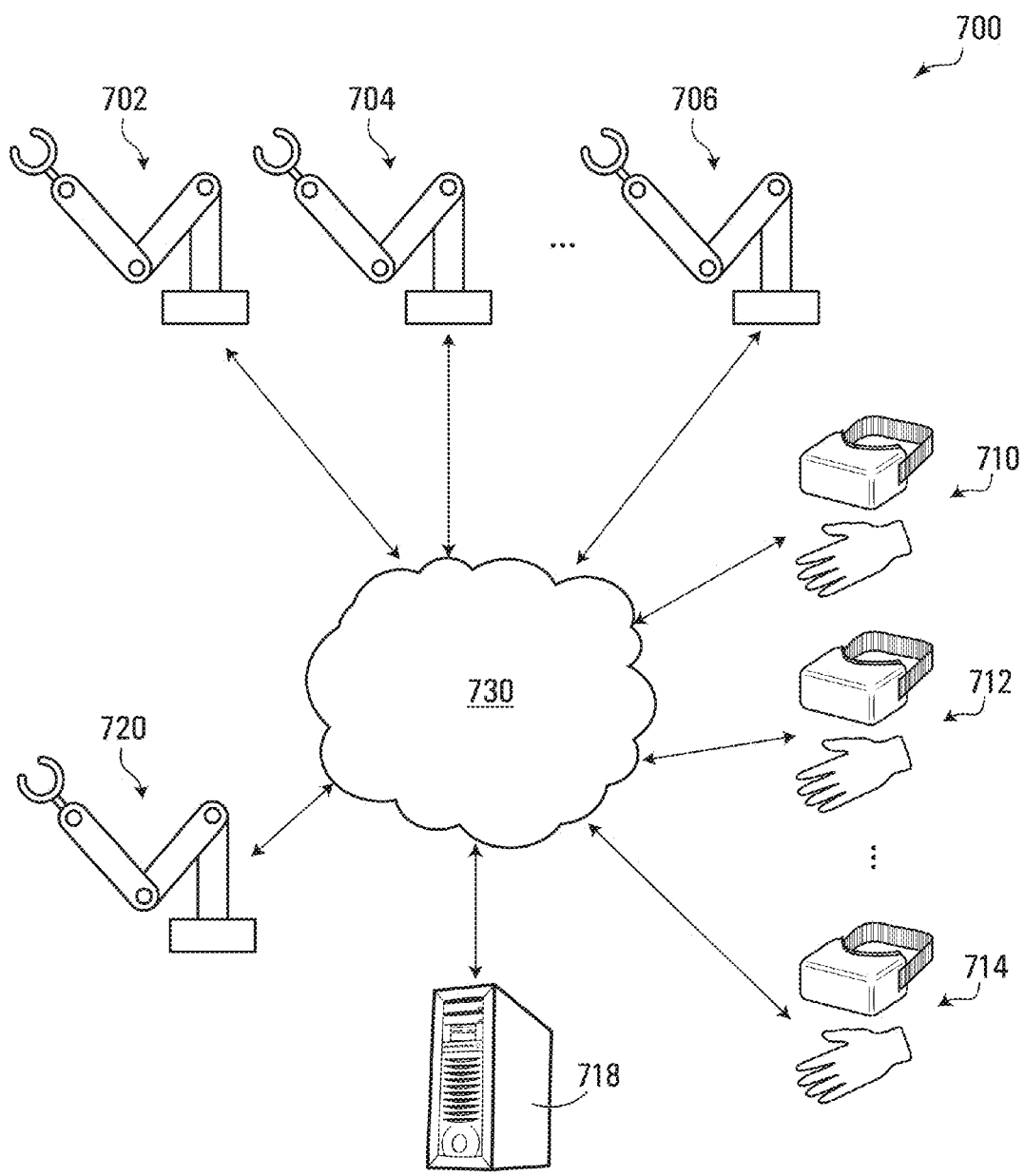
FIG. 12 is a schematic view of a system for deriving autonomous control information in accordance with various embodiments of the invention.

Referring to FIG. 12, according to an embodiment of the invention, there is provided a system 700 for deriving autonomous control information. In the embodiment shown, the system 700 includes a plurality of operator controllable devices including operator controllable devices 702, 704, and 706. The system 700 also includes a plurality of operator interfaces including operator interfaces 710, 712, and 714. The system also includes an analyzer 718 and one or more autonomous devices such as 720. The operator controllable devices 702, 704, and 706 may be in communication with the analyzer 16 and the operator interfaces 710, 712, and 714 through a network 730. The operator interfaces 710, 712, and 714 and the autonomous device 720 may also be in communication with the analyzer 718 through the network 730.

In various embodiments, each of the operator controllable devices 702, 704, and 706 may be generally similar to the operator controllable device 12 shown in FIG. 2, although in some embodiments, the operator controllable devices 702, 704 and 706 may not include the block of codes 62 shown in FIG. 2 for directing the operator controllable device 12 to effect autonomous control functions. The autonomous device 720 may be generally similar to the operator controllable device 12 although in some embodiments the autonomous device 720 may not include the block of codes 60 shown in FIG. 2 for directing the operator controllable device 12 to effect operator controlled functions. Each of the operator interfaces 710, 712, and 714 may be generally similar to the operator interface 14 shown in FIG. 3 and the analyzer 718 may be generally similar to the analyzer 16 shown in FIG. 4.

In various embodiments, the operator controllable devices 702, 704, 706 may be controlled by operators interacting with the operator interfaces 710, 712, and 714, generally as described above having regard to the operator controllable device 12 and the operator interface 14. In some embodiments, the operator interfaces 710, 712, and 714 may be configured to control any of the operator controllable devices 702, 704, 706. In some embodiments, the operator interfaces 710, 712, and 714 may be configured to control only one, or a subset of the operator controllable devices 702, 704, 706.

In the embodiment shown in FIG. 12, operators interacting with the operator interfaces 710, 712, and 714 may cause the operator controllable devices 702, 704, 706 to perform tasks. The analyzer 718 may derive autonomous control information from sets of associated environment sensor information and device control instructions used by the operator interfaces 710, 712, and 714 and the operator controllable devices 702, 704, 706 to perform the tasks.

In some embodiments the analyzer 718 may send the autonomous control information to the operator controllable devices 702, 704, and 706 such that these devices can act as autonomous devices. In some embodiments, the analyzer 718 may send the autonomous control information to the autonomous device 720 to cause the autonomous device 720 to act autonomously.

In various embodiments, the system 700 shown in FIG. 12 may include a plurality of autonomous devices generally similar to the autonomous device 20 shown in FIG. 12 and each of the plurality of autonomous devices may be in communication with the analyzer 718 through the network 730.

In various embodiments, more than one operator interface may alternatingly control a single operator controlled device over time. For example, in various embodiments, operators interacting with the operator interfaces 710, 712, and 714 may alternatingly cause the operator controllable device 702 to perform a task or tasks. In various embodiments, generally at least one operator and/or at least one autonomous controller (machine) may control one or more operator controllable device.

In some embodiments, more than one operator controllable device (e.g. the operator controllable devices 702, 704, and 706) may be controlled by an operator interacting with a single operator interface (e.g., the operator interface 710). A single operator interface controlling multiple operator controllable devices may facilitate the operator controllable devices completing the same task simultaneously. The task may for example be making a cup of coffee, or performing a choreographed dance.

In some embodiments, more than one operator interface (e.g. the operator interfaces 710, 712, and 714) may be used to alternatingly control components and actuators of a single operator controllable device (e.g. the operator controllable device 702). More than one operator interface alternatingly controlling the components and actuators of a single operator controllable device may facilitate providing the operator controllable device with a greater variability of control instructions where a greater variability of control instructions may provide a broader set of data from which artificial intelligence models, or learning models, can learn.

In some embodiments, more than one operator interface (e.g. the operator interfaces 710, 712, and 714) may be used to simultaneously control subsets of components and actuators of a single operator controllable device (e.g. the operator controllable device 702). More than one operator interface simultaneously controlling subsets of components and actuators of a single operator controllable device may facilitate, for example, specialists controlling subsets of components of the operator controllable device.

For example, an operator operating the operator interface 710 may be an actor providing a recordable set of behaviours (e.g. a set of verbal communications by way of microphones on the operator interface 710 to be played through a speaker on the operator controllable device 702). An operator operating operator interface 712 may be a specialist in performing a specific task using the operator controllable device 702, and may control non-speaker components and actuators on the operator controllable device 702 through the operator interface 712 with the speaker controlled by the operator interface 710.

Combined Devices

In various embodiments, any or all of the operator controllable device 12, the operator interface 14, and the analyzer 16 shown in FIG. 1, or aspects thereof, may be implemented within a single processor circuit having at least one processor. In such embodiments, some information and/or instructions described above may not need to be sent between processors. Accordingly, flowcharts similar to the flowcharts 300, 400 and 550 shown in FIGS. 5, 7, 10, and 11 may be executed wherein the flowcharts include blocks that differ from blocks 304, 410 and/or 558 and/or do not include blocks similar to blocks 304, 410 and/or 558, for example.

In some embodiments, the operator controllable device 12 and the analyzer 16 may be implemented on a single processor circuit to reduce or remove network related latency. Reduced network latency may be desirable if the analyzer is required for generation of autonomous control instructions for controlling the operator controllable device in a remote location where no network is available, for example.

In some embodiments, the operator controllable device 12, the operator interface 14, and the analyzer 16 shown in FIG. 1 may be implemented within a single processor circuit to reduce or remove network related latency. This may facilitate performing close to real time manipulation of the data arriving from the operator interface. Reducing or removing the time required for the data to leave the operator interface 14, cross the network 18 and arrive at the analyzer 16 may facilitate the analyzer working with the data immediately, regardless of the quality of the network.

In some embodiments, the operator controllable device 12, the operator interface 14, and the analyzer 16 shown in FIG. 1 may be implemented within a single processor circuit to reduce network related latency. In this embodiment, the operator may wear both the operator interface 14 and the operator controllable device 12. The operator controllable device 12 may provide more force using its various actuators than the operator may be able to using its muscles thus the operator may be able to perform tasks using the operator interface 14 to control the operator controllable device 12 that the operator may not otherwise have been able to perform such a lifting a heavy object. An example when this may be implemented may be if the operator interface is required to control the operator controllable device in a remote location where no network is available.

Sensors, Actuators and/or Output Devices

In various embodiments an operator controllable device generally similar to the operator controllable device 12 shown in FIG. 2 may include fewer, additional, or alternative sensors, actuators and/or output devices to those of the operator controllable device 12. In some embodiments, an operator controllable device generally similar to the operator controllable device 12 may appear humanoid and may include a mechanical torso, mechanical appendages and a mechanical head that act analogously to a human operator's arms, legs, and head.

Some examples of sensors that may be included in an operator controllable device generally similar to the operator controllable device 12 shown in FIG. 2 include a touch or force feedback sensor, a location sensor, such as a global positioning system ("GPS"), a range finder, a proximity sensor for detecting feature proximity, a chemical sensor, a temperature sensor, and/or an orientation sensor such as a gyroscope.

Some examples of actuators and/or output devices or systems that may be included in an operator controllable device generally similar to the operator controllable device 12 shown in FIG. 2 include motor systems providing functionality including gripping, pushing, pulling, propulsion, and/or moving the operator controllable device and/or objects in proximity to the operator controllable device, and communication systems for producing carriers and signals including sound including human speech, RF, Wi-Fi™, Bluetooth™ Ethernet, and/or light sources including screens, LEDs and lasers, for example.

In various embodiments an operator interface generally similar to the operator interface 14 shown in FIG. 3 may include fewer, additional, or alternative sensors, actuators and/or output devices to those of the operator interface 14 shown in FIG. 3.

For example, in some embodiments, the operator interface may include at least one camera for tracking movement of an operator. In some embodiments, the operator interface may include haptic or force sensing and/or feedback systems. For example, in various embodiments, the operator interface may include actuators for simulating touch or forces felt by sensors of the operator controllable device. In some embodiments, the operator interface may include sensors for sensing touch or forces applied by the operator to the sensors. In various embodiments, the operator interface may include sensors and/or devices for facilitating electroencephalography (EEG), functional magnetic resonance imaging (fMRI), transcranial magnetic simulation, electromyography (EMG), and/or electrocardiography (ECG). In various embodiments, the operator interface may include temperature sensors, which may, in various embodiments be configured to measure skin temperature of an operator, chemical sensors and biometrics sensors. In some embodiments the operator interface may include multi-spectral or hyper-spectral imaging sensors. In various embodiments, generally, any sensor allowing capture of signals produced by an operator (human or otherwise) may be included in the operator interface.

In some embodiments, the operator interface may include input mechanisms such as, a motion capture system, or a computer interface input for a web version of the interface involving a keyboard, mouse, joystick, or gaming style inputs that may, in various embodiments, utilize game controllers.

Operator Controllable Device

As discussed above, in various embodiments an operator controllable device generally similar to the operator controllable device 12 shown in FIG. 2 may include fewer, additional, or alternative sensors, actuators and/or output devices to those of the operator controllable device 12. For example, referring to FIGS. 13 and 14, an operator controllable device in accordance with various embodiments of the invention is shown generally at 800.

The operator controllable device 800 includes a first arm 801 and a second arm 803. The first arm 801 includes a shoulder roll servo 802, a shoulder pitch servo 805, a shoulder yaw servo or upper arm rotation servo 804, an elbow servo 806, a wrist servo 808, and a haptic feedback hand or end manipulator 810, which includes first, second, and third haptic fingers 817, 819, and 821. In the embodiment shown, the first arm 801 has 5 degrees of freedom and thus may facilitate many motions a human arm is able to perform.

Figure 13:
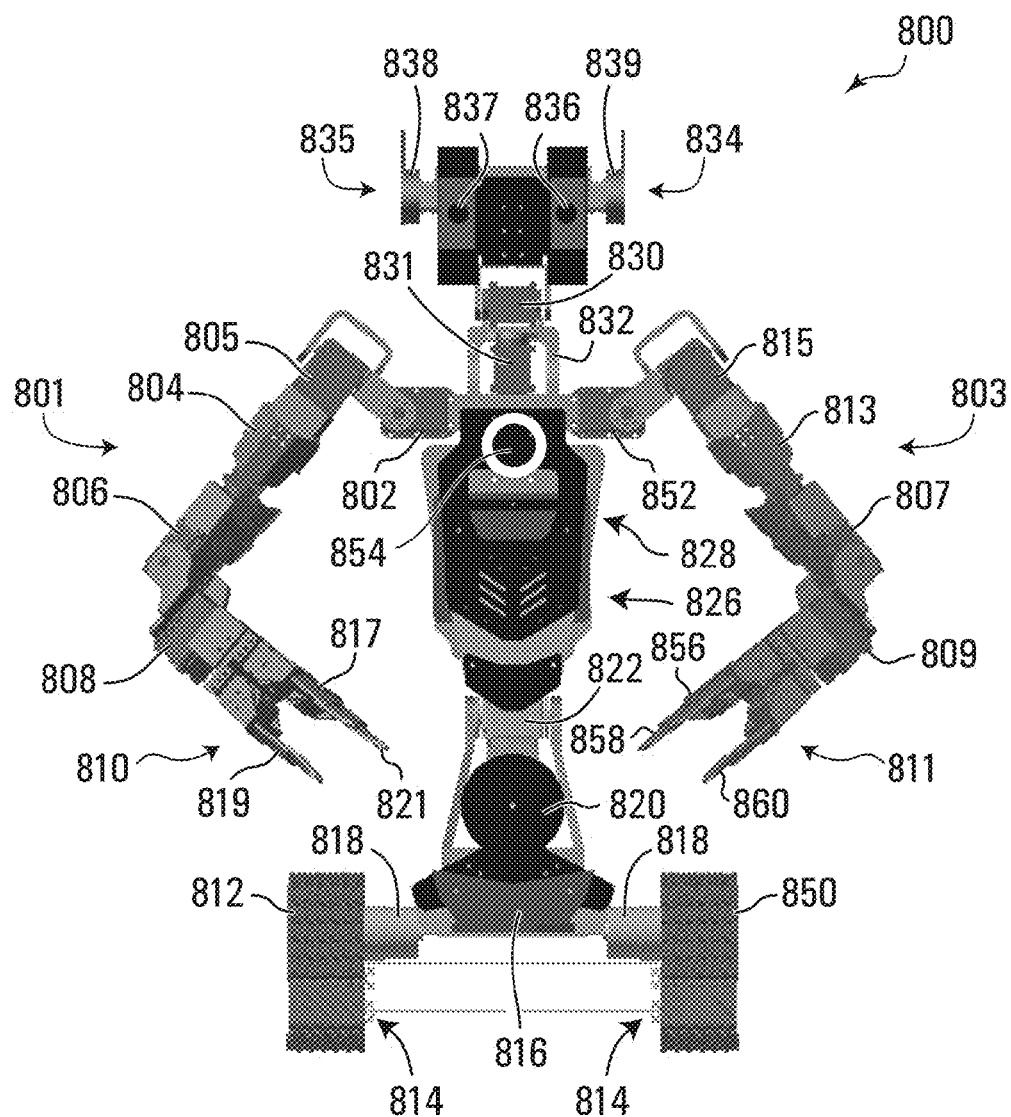
FIG. 13 is a front elevation view depicting an operator controllable device in accordance with various embodiments of the invention.

Referring to FIG. 13, in various embodiments, the shoulder servos 802 and 805 may control and sense roll and pitch respectively of a shoulder of the first arm 801 of the operator controllable device 800. In various embodiments, the shoulder servos 802 and 805 may, for example be MX-28 or Dynamixel™ AX-12 servo motors.

Referring to FIG. 13, in various embodiments, the shoulder yaw servo 804 may control and sense the yaw of the first arm 801 of the operator controllable device 800. In various embodiments, the shoulder yaw servo 804 may, for example, be a Dynamixel™ AX-12 servo motor.

In various embodiments, the elbow servo 806 may control and sense an elbow of the first arm 801 of the operator controllable device 800. In various embodiments, the elbow servo 806 may, for example be a Dynamixel™ AX-12 servo motor.

In various embodiments, the wrist servo 808 may control and sense an end manipulator rotation of the operator controllable device 800. In various embodiments, the wrist servo 808 may, for example be a Dynamixel™ AX-12 servo motor.

In various embodiments, the haptic hand 810 may include two fingers and a thumb with embedded force sensitive resistors. Respective servos, which may, for example be Dynamixel™ XL-320 servo motors, may operate each finger independently. Thus, in various embodiments, the haptic hand 810 may have 3 degrees of freedom (servos for two fingers and an opposing thumb) which may, in some embodiments, facilitate dexterous manipulation.

In various embodiments, the fingers 817, 819, and 821 of the haptic hand 810 may have polymer filled fingers and rubber finger pads, which may, in various embodiments enhance gripping and simulate the resistance of a human finger. In some embodiments, the fingers may each have a haptic sensor or pressure sensor which may sense pressure applied to the sensor and produce signals proportional to the pressure.

Figure 14:
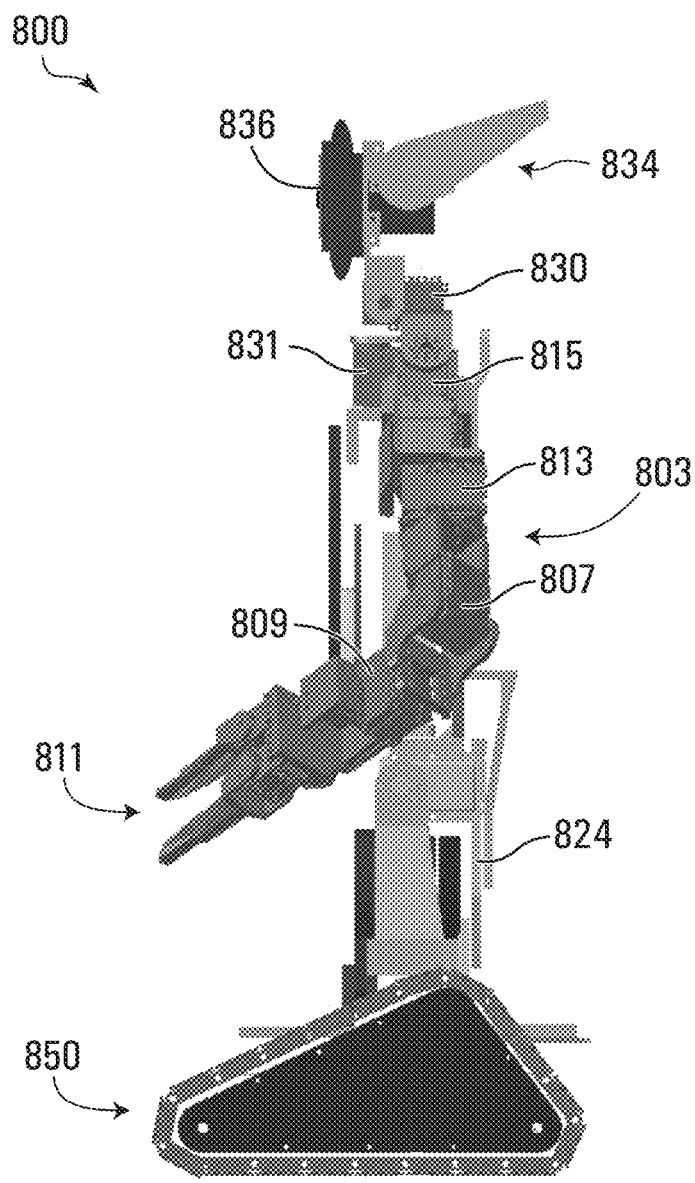
FIG. 14 is a side elevation view depicting the operator controllable device shown in FIG. 13.

The second arm 803 is generally similar to the first arm 801 but mirrored. Referring to FIGS. 13 and 14, the second arm 803 includes a shoulder roll servo 852, a shoulder pitch servo 815, a shoulder yaw servo 813, an elbow servo 807, a wrist servo 809, and a haptic feedback hand or end manipulator 811 including fingers 856, 858, and 860.

Referring back to FIG. 13, the operator controllable device 800 also includes motility treads 812 and 850, strut supports 814, an electronics compartment 816, DC motors 818, a speaker 820, a waist pitch servo 822, an interlock mechanism or device 826, a single board computer (SBC) 828, two neck servos including a head pitch servo 830 and a head yaw servo 831, a carrying handle and chassis 832, ears and ear servos 834 and 835, cameras 836 and 837, microphones 838 and 839, lights/LEDs 854 and cable bundles. Referring to FIG. 14, the operator controllable device 800 also includes a backstop mechanism 824.

Referring to FIG. 13, in various embodiments, the motility treads 812 and 850 may provide the capacity for locomotion to the operator controllable device 800. In one embodiment, the treads 812 and 850 may include 28 link 2" treads with 6" sprockets. In various embodiments, the motility treads 812 and 850 may provide a broad base which may, in some embodiments, increase stability of the operator controllable device 800.

Referring to FIG. 13, in various embodiments, the strut supports 814 may be made of a light weight and strong material, such as, for example, aluminium. In various embodiments, the strut supports 814 may include an open beam support structure.

Referring to FIG. 13, the electronics compartment 816 includes a shelf-like cabinet that may, in various embodiments, provide access to various wiring and electronic components. In various embodiments for example, three batteries may be found in the compartment 816. The batteries may include a first battery for providing power to the motor bus (the DC motors 818) and all the servos except the servos for controlling the fingers of the haptic hands 810 and 811 and the ear and ear servos 834 and 835, a second battery for powering the SBC 828 and the speaker 820, and a third battery which may be used to power a motor control board (such as, for example an OpenCM™ motor control board) which may drive the ear and ear servos 834 and 835 and the servos for controlling the fingers of the haptic hands 810 and 811.

In various embodiments, the first battery may, for example, be a lithium polymer 4000 mAh 3 cell 12 V battery, the second battery may be a 5V 9600 mAh, USB mobile charging power pack, and the third battery may include two combined 3.7V lithium ion batteries.

Referring still to FIG. 13, the electronics compartment 816 may contain, in certain embodiments, an Arduino Leonardo with a motor shield on top which may control the DC motors, device chest LEDs and may receive signals from the haptic sensors in the haptic hands 810 and 811.

In some embodiments the electronics compartment 816 may also contain a power breakout board which may act as a patch panel including patching of the hand sensor signal and some ground pins. In some embodiments, the electronics compartment 816 may contain a motor control board, for example an OpenCM™ board made by Robotsis™. In some embodiments, the electronics compartment 816 may also contain switches, which may facilitate independent powering of 12V and 5V trains.

In various embodiments, the DC motors 818 may be configured to turn one of the sprockets that then rotates the entire tread assembly. In various embodiments, the DC motors 818 may act as drive motors. In certain embodiments, the DC motors 818 may be generic 12V DC motors.

In various embodiments, the speaker 820 may facilitate projection of audio signals into an environment of the operator controllable device 800. For example, the audio signals may represent speech. In one embodiment, the speaker 820 may be a Blue Piston Bluetooth wireless speaker. As discussed above, having regard to the operator controllable device 12, in various embodiments, a voice of an operator may be modulated before it is communicated by the speakers 820, for example by sending it through a vocoder or vocal encoder, to produce a variety of voices. In various embodiments, this may facilitate use of the operator controllable device 800 as a companion.

Referring still to FIG. 13, in various embodiments, the waist pitch servo 822 may control forward pitch of the operator controllable device. In various embodiments, the waist servo 822 may enable the operator controllable device 800 to reach the floor using the hands 810 and 811. The waist pitch servo 822 may, for example be a Dynamixel MX-64.

Referring to FIG. 14, in various embodiments, the backstop mechanism 824 may be configured to stop the operator controllable device 800 from bending backwards at the torso. Accordingly, the backstop mechanism 824 may simulate the human spine.

Referring back to FIG. 13, in various embodiments, the interlock device 826 may be configured to lock a position of the waist pitch servo 822 when the power is off and thus provide structural stability to a torso of the operator controllable device 800 when the power is off.

The SBC 828, in one embodiment may for example be implemented using an Odroid-XU3 board. In some embodiments, the SBC 828 may include periphery devices such as a USB hub (extender for USB ports), a Wifi adapter, and/or a Pure Audio or generic sound card which may, in some embodiments, be used for both incoming and outgoing audio signal processing.

In various embodiments, the neck servos 830 and 831 may control and sense pitch and yaw of a head of the operator controllable device 800. In various embodiments, the neck servos 830 and 831 may allow the operator controllable device 800 to move the orientation of the cameras 836 and 837 and thus look around in its environment. In various embodiments, the neck servos 830 and 831 may, for example be Dynamixel™ AX-12 servo motors.

Referring still to FIG. 13, in various embodiments, the carrying handle 832 may facilitate easy transportation. In various embodiments, the chassis of the operator controllable device 800 may have plates installed primarily on the arms and chest. In various embodiments, the plates may provide decoration. The plates may be different colours, materials and/or finishes to cater to a client or to a personality of a particular operator controllable device.

In various embodiments, the ears and ear servos 834 and 835 may provide expressive feedback from the operator controllable device 800. Thus, in various embodiments, the ears and ear servos 834 and 835 may increase an expressiveness of a face of the operator controllable device 800 and thus allow the appearance of emotional states to be displayed. In various embodiments, for example, the ear servos may be Dynamixel™ XL-320 servo motors.

In various embodiments, the cameras 836 and 837 may be spaced apart to simulate the average distance between human eyes for optimized stereo or binocular vision. The cameras 836 and 837 may provide the ability to capture visual signals from the environment. For example, the cameras 836 and 837 may in one embodiment be Logitech™ C920 HD wide angle lens cameras. The cameras 836 and 837 may be capable of capturing 1920×1080@30 fps.

In various embodiments, the microphones 838 and 839 may be configured to capture audio information in a stereo manner from the environment of the operator controllable device 800. In one embodiment, the microphones 838 and 839 may, for example, be MM-BSM-5 "Micro" Binaural Stereo Microphones. The microphones 838 and 839 may be configured to capture opus Encoded Mono Audio at 48 kHz (each frame is one chunk of data from the audio stream), for example In various embodiments, the cable bundles include three main cable bundles located along the back of the operator controllable device and may provide an aesthetic function and appeal. There may be two smaller arm bundles that run up the back of each arm into the shoulder/neck of the operator controllable device torso. There may be a larger cable bundle more analogous to a spinal cord running from the lower back torso of the operator controllable device down to the electronics compartment 816 in the base of the operator controllable device. In some embodiments, the cable bundling may also prevent cable tangling and optimize organization.

The servos may be configured to provide both positional and velocity information. Generally the velocity information may not be as reliable as the positional information and so, it in addition to the positional information may be used by the system to derive probabilistic velocity measures. Note that though these two fields are passed around the system, once velocity and position information or instructions arrive at an operator interface, for example, these two signals may be fed into a control algorithm to generate a different and/or larger list of control signals to be sent to various servos to control the servos.

Figure 15:
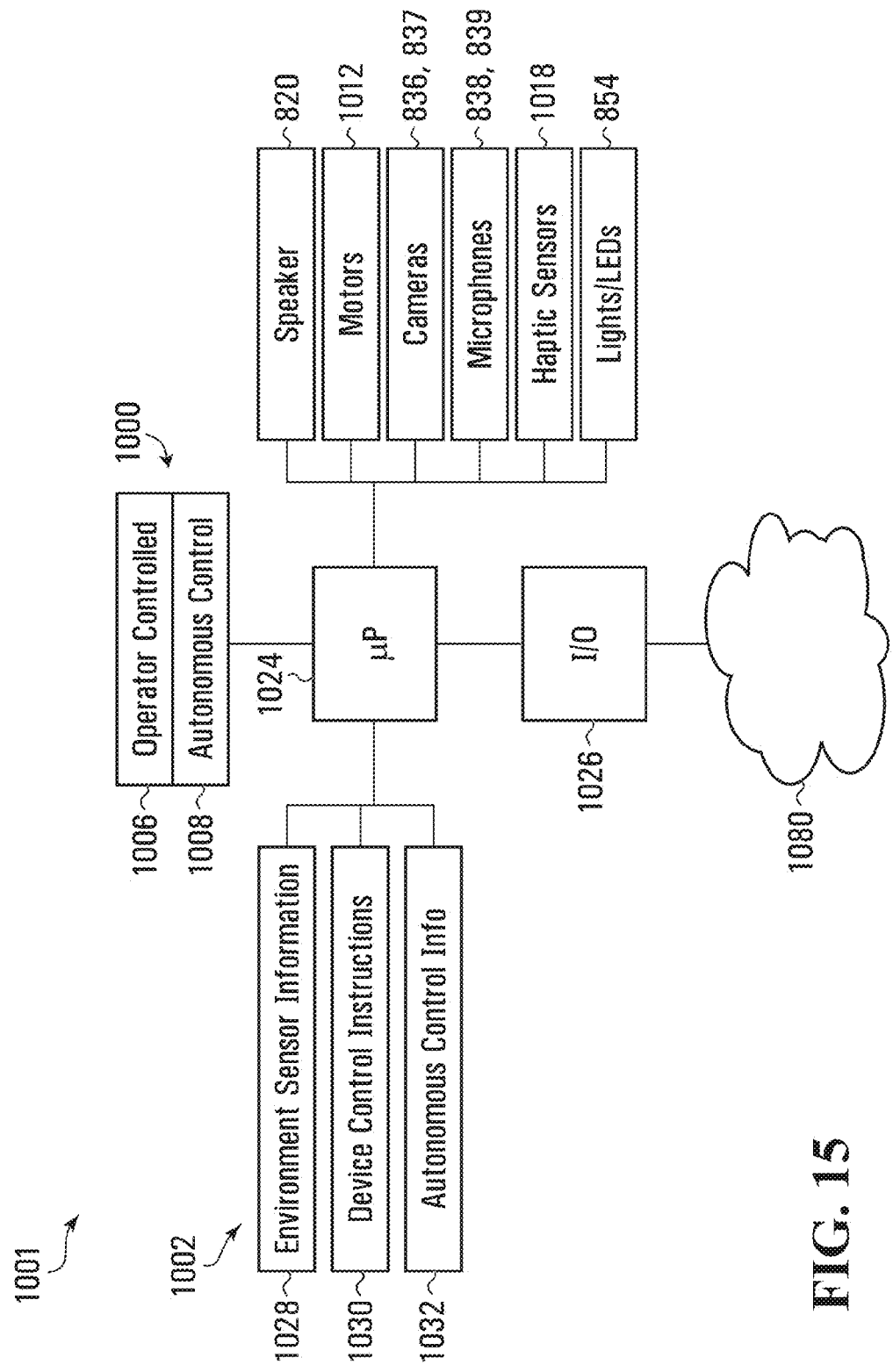
FIG. 15 is a schematic view of a processor circuit for implementing the operator controller device shown in FIG. 13.

Referring to FIG. 15, a schematic view of a processor circuit for implementing the operator controllable device 800 shown in FIG. 13 according to one embodiment is shown at 1001. The processor circuit 1001 includes a device processor 1024, a program memory 1000 and a variable memory 1002. In the embodiment shown in FIG. 13, the device processor 1024, the program memory 1000 and the variable memory 1002 shown in FIG. 15 may be included in the single board computer 828 of FIG. 13. While the device processor 1024 is shown schematically as a single unit in the embodiment shown in FIG. 13, in various embodiments the device processor 1024 may be implemented using one or more processors.

Referring back to FIG. 15, the processor circuit 1001 includes the speaker 820 of FIG. 13 and the motors of the operator controllable device 800 FIG. 13, which are shown, for convenience, schematically at 1012. The processor circuit 1001 shown in FIG. 15 also includes the cameras 836 and 837 of FIG. 13 and the microphones 838 and 839 shown in FIG. 13.

Referring still to FIG. 15, the processor circuit 1001 also includes haptic sensors 1018 of the fingers of the haptic hands 810 and 811 of the operator controllable device 800 shown in FIG. 13. The processor circuit 1001 also includes lights/LEDs 854.

Still referring to FIG. 15, the processor circuit 1001 also includes an I/O interface 1026, which may include a network interface having a network interface card with an input/output for connecting to a network 1080, and through which communications may be conducted with devices connected to the network 1080, such as an operator interface and/or an analyzer.

In various embodiments, the program memory 1000, variable memory 1002, and I/O interface 1026 may be implemented, for example, as described for the program memory 42, variable memory 44, and I/O interface 58 of the operator controllable device 12 shown in FIG. 2.

The program memory 1000 includes a block of codes 1006 for directing the operator controllable device 800 to effect operator controlled functions and a block of codes 1008 for directing the operator controllable device 800 to effect autonomous control functions. In some embodiments, the block of codes 1006 may store codes having generally similar functionality to the block codes 60 of the program memory 42 shown in FIG. 2. The block of codes 1008 may store codes having generally similar functionality to the block codes 62 of the program memory 42 shown in FIG. 2.

The variable memory 1002 includes a plurality of storage locations including location 1028 for storing environment sensor information and location 1030 for storing device control instructions. In some embodiments, the variable memory includes location 1032 for storing autonomous control information.

In various embodiments, the cameras 836 and 837 shown in FIGS. 13-15 may act analogously to an operator's eyes and may be spaced apart to provide binocular vision information. In the embodiment shown in FIG. 15, the operator controllable device 800 includes a mechanical neck controllable by the servo motors 830 and 831 that acts analogously to an operator's neck. The mechanical neck is connected to the cameras 836 and 837 such that movement of the neck servomotors 830 and 831 moves a target area or orientation of the cameras 836 and 837.

In various embodiments, the microphones 838 and 839 may act analogously to an operator's ears and may be positioned and oriented compared to the cameras 836 and 837, generally analogously to how ears are positioned and oriented compared to eyes on a human being. The speaker 820 may act analogously to an operator's vocal apparatus (i.e., for providing speech communication capabilities). In the embodiment shown in FIG. 13, the speaker is positioned near a bottom of the torso. However, in various embodiments, the speaker 820 may be positioned and oriented compared to the cameras 836 and 837 and the microphones 838 and 839 analogously to how a mouth is positioned and oriented compared to eyes and ears of a human being.

Figure 64:
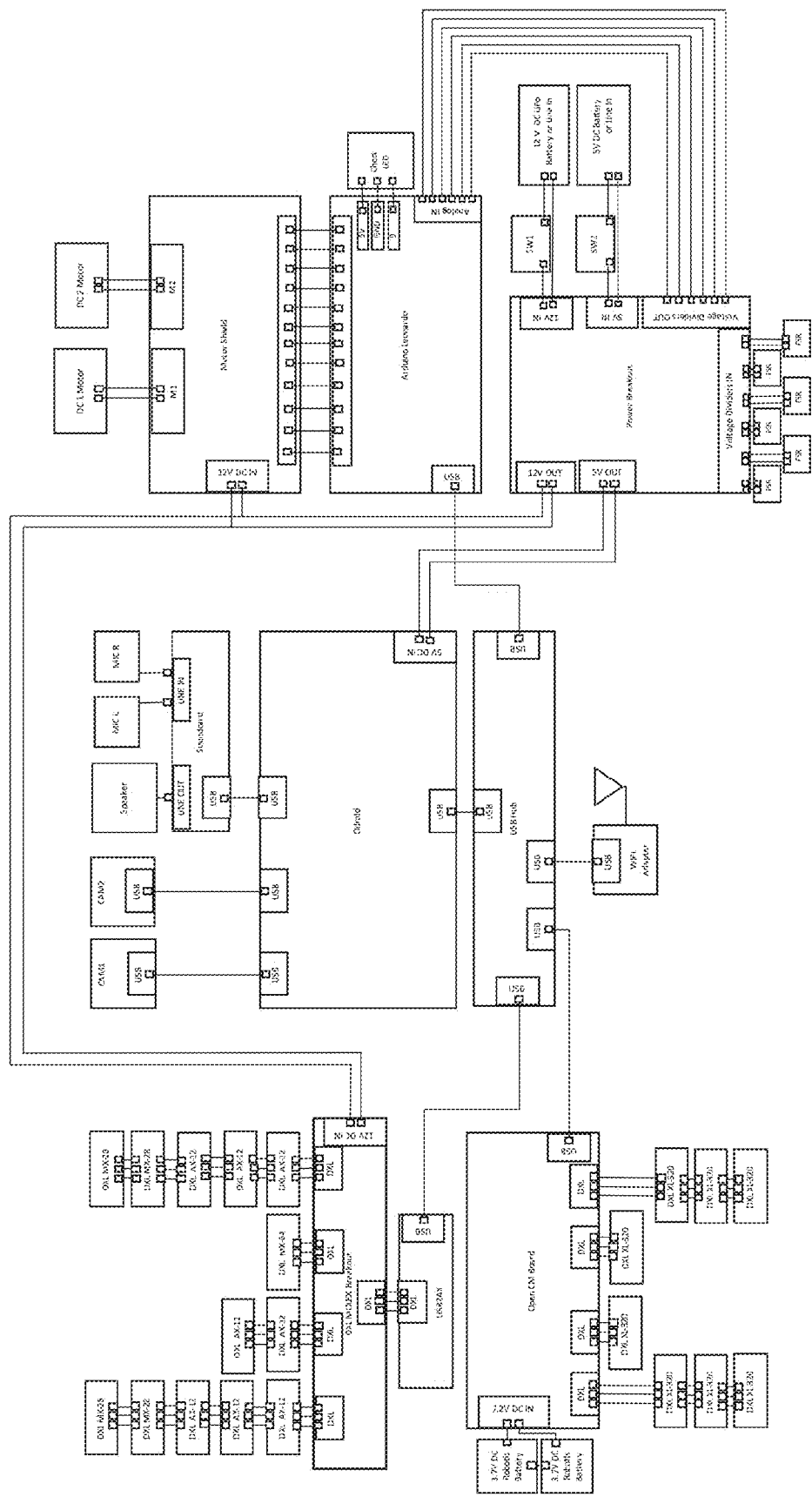
FIG. 64 is a schematic view of an embodiment of the processor circuit shown in FIG. 15.

In various embodiments, one or more processor circuits may act as the processor circuit 1001. For example, the processor circuit 1001 may be implemented using one or more processors acting as the processor 1024, one or more memory devices acting as the program memory 1000 and/or the variable memory 1002, one or more sensors or actuators acting as any of the sensor or actuators shown in FIG. 15 and/or one or more I/O interfaces acting as the I/O interface 1026. For example, in various embodiments, the processor circuit 1001 may be implemented as shown in FIG. 64.

Operator Interface

As discussed above, in various embodiments an operator interface generally similar to the operator interface 14 shown in FIG. 3 may include fewer, additional, or alternative sensors, actuators and/or output devices to those of the operator interface 14 shown in FIG. 3. For example, referring to FIG. 16, there is shown an operator interface 900 in accordance with various embodiments of the invention.

The operator interface 900 includes left/right audio input 902, left/right visual display 904, a microphone 1056, a head/neck motion sensor 906, and first and second arm sensor assemblies 907 and 909.

Figure 16:
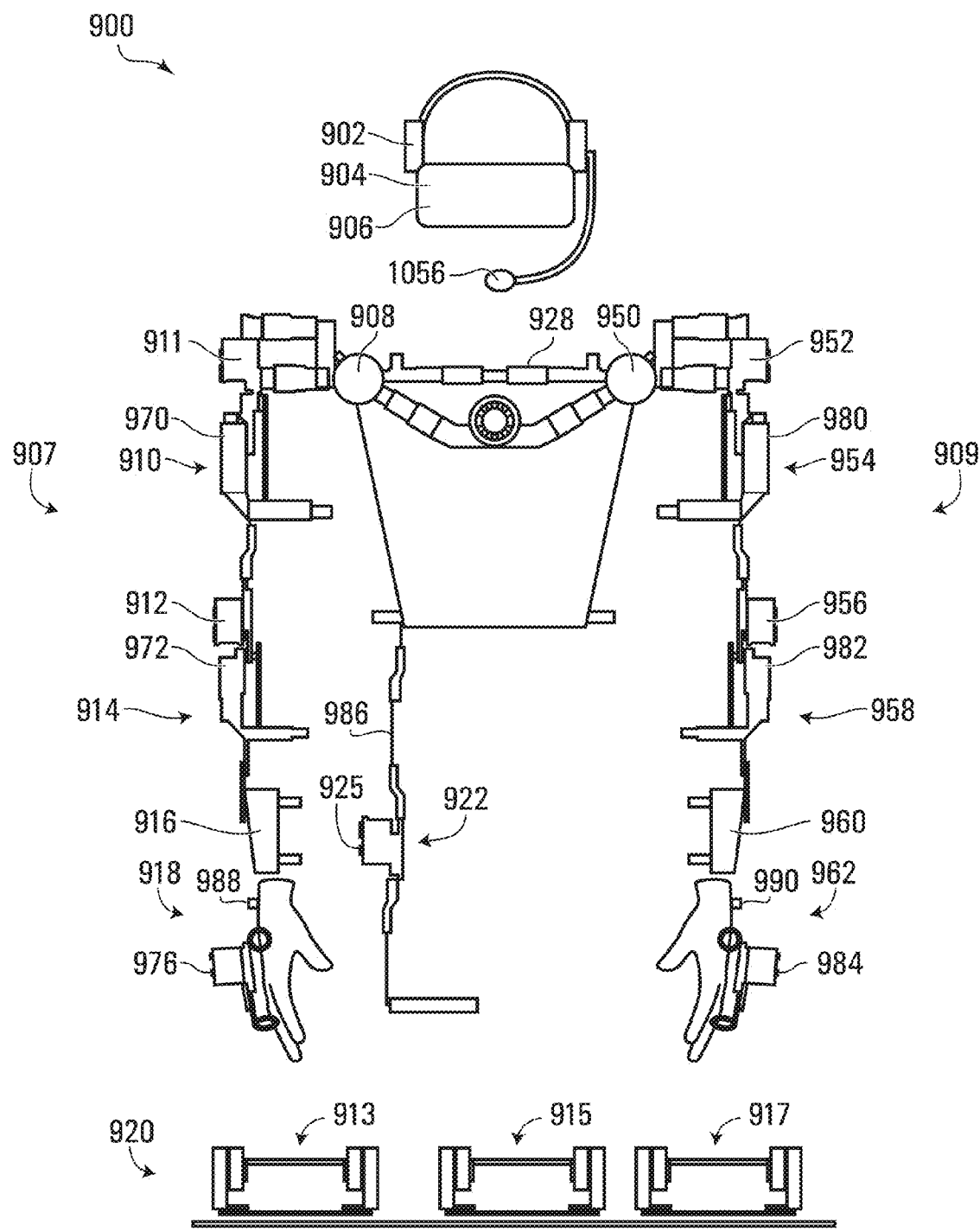
FIG. 16 is a front elevation view depicting an operator interface in accordance with various embodiments of the invention.

The first arm sensor assembly 907 includes a shoulder roll servo 908, a shoulder pitch servo 911, an upper-arm rotation capture device 910, an elbow servo 912, a lower-arm rotation capture device 914, a forearm mount or strap 916, and a manipulator interface or haptic glove 918. The second arm sensor assembly 909 may be generally similar to the first arm sensor assembly 907 but mirrored. Referring to FIG. 16, the second arm sensor assembly 909 includes a shoulder roll servo 950, a shoulder pitch servo 952, an upper arm rotation capture device 954, an elbow servo 956, a lower arm rotation capture device 958, a forearm mount 960, and a manipulator interface or haptic glove 962, Referring still to FIG. 16, the operator interface 900 includes a set of locomotion pedals 920 including first, second, and third locomotion pedals 913, 915, and 917. The operator interface also includes a torso pitch interface 922 including an extension arm and a waist servo 925, an operator vest 924, an electronic back-box 926 (shown in FIG. 17) and a chest/shoulder suit support structure 928.

Referring to FIG. 16, in various embodiments, the left/right audio input 902 may be implemented using speakers or headphones to provide an interface for transmitting audio information from an operator controllable device, such as the operator controllable device 800 shown in FIG. 13, to an operator using the operator interface 900 shown in FIG. 16.

In some embodiments the audio information transmitted using the left/right audio input 902 may simulate or replicate audio information captured by the microphones 838 and 839 of the operator controllable device 800. However, in various embodiments, audio information generated from a source other than the microphones 838 and 839 shown in FIG. 13 may be provided by the left/right audio input 902. For example, audio information may be generated by an analyzer or may be generated in response to environment information and also or alternatively be transmitted through the left/right audio input 902.

An example of generated audio that may be output by the left/right audio input 902 to an operator, in one embodiment, may be an audible communication of remaining battery life of the operator controllable device 800 shown in FIG. 13 using beeping of various frequencies.

In some embodiments, the operator's voice may be translated to text and then back to speech using automatic speech to text and text to speech programs such as Google Chrome's API. This speech-to-text-to-speech conversion may be performed at the operator interface 900 before the audio signals being sensed on the operator interface microphone are sent to the operator controllable device. In some embodiments, performing this conversion may result in a consistent voice projected from the operator controllable device regardless of the operator operating the operator interface.

In various embodiments, the left/right audio input 902 may include a set of headphones which may be designed for gaming and therefore may be comfortable to wear for extended periods. In various embodiments, the left/right audio input 902 may include, for example, SoundBlaster Tactic3D™ headphones.

Referring to FIG. 16, the microphone 1056 is mounted to the left/right audio input 902 such that when the left/right audio input 902 is worn by an operator, the microphone 1056 is positioned near a mouth of the operator. The microphone 1056 is configured to sense audio such as speech from the operator.

Referring still to FIG. 16, the left and right visual displays 904 may provide an interface for displaying visual information captured by the cameras 836 and 837 of the operator controllable device 800 shown in FIG. 13. In some embodiments, other visual information may also or alternatively be generated for display on the left and right displays 904. An example of generated information which may be displayed on the left and right visual display 904, in one embodiment, may be battery charge levels of the operator controllable device 800 shown in FIG. 13. In one embodiment, the left and right visual display 904 may be implemented using a virtual reality headset, such as, for example an Oculus Rift™.

Referring to FIG. 16, the head/neck motion sensor 906 is configured to sense or capture movement of an operator's head, specifically pitch and yaw. In one embodiment, the head/neck motion sensor 906 may include a gyroscope, an accelerometer, a magnetometer, and/or another inertial measurement unit (IMU). In various embodiments, the head/neck motion sensor 906 may be built into a virtual reality headset such as, for example, the Oculus Rift™.

In various embodiments, the shoulder roll servo 908 and the shoulder pitch servo 911 may sense or capture roll and pitch positioning of an operator's shoulder. In some embodiments, the servos may include feedback resistors or potentiometers that provide signals representing servo position measurements. In some embodiments, the operator interface 900 may be configured to cause the shoulder servos 908 and 911 to simulate or replicate positions of the shoulder servos 802 and 805 respectively, as shown in FIG. 13. In one embodiment, for example, these servos may be Dynamixel™ AX-12 servos.

Referring still to FIG. 16, in various embodiments, the upper arm rotation capture device 910 may sense or capture rotation of an upper arm of an operator.

In various embodiments, the upper arm rotation capture device 910 may include a semi-circular gear mechanism that wraps around the upper arm and couples with a second semi-circular gear mechanism at about 90 degrees to the first. In various embodiments, this gear arrangement may transfer the rotation of the upper arm to the rotation of a potentiometer 970 centered around and connected to the second gear mechanism.

In various embodiments, a non-moving part of the potentiometer may be fixed to the operator's shoulder. In one embodiment, the potentiometer may have a wider than normal central shaft with a hole in the center. In one embodiment, the potentiometer may be, for example, a 39/20 mm Center Space Rotary Potentiometer.

Referring to FIG. 16, in various embodiments, the elbow servo 912 may capture or sense an angle of an operator's elbow. For example, in one embodiment, the elbow servo 912 may be a Dynamixel™ AX-12. In some embodiments, the operator interface 900 may be configured to cause the elbow servo 912 to simulate or replicate positions of the elbow servo 806 of the operator controllable device 800 shown in FIG. 13.

Referring to FIG. 16, in various embodiments, the lower arm rotation capture device 914 may capture or sense the rotation of the lower arm of the operator. In various embodiments, the lower arm rotation capture device 914 may operate generally similarly to the upper arm rotation capture device 910. The lower arm rotation capture device 914 includes a semi-circular gear mechanism that wraps around the lower arm and couples with a second semi-circular gear mechanism at 90 degrees to the first. This gear arrangement may transfer the rotation of the lower arm to the rotation of a potentiometer 972 centered around and connected to the second gear mechanism. In various embodiments, a non-moving part of a potentiometer may be fixed to the operator's arm. In one embodiment, the potentiometer may have a wider than normal central shaft with a hole in the center. In one embodiment, the potentiometer may, for example, be a 39/20 mm Center Space Rotary Potentiometer.

In various embodiments, the forearm strap 916 may secure the first arm sensor assembly 907 of the operator interface 900 to the operator.

Referring to FIG. 16, in various embodiments, the haptic glove 918 may capture or sense a position of the operator's pointer finger and thumb relative to one another. A servo 976 shown in FIG. 17 may be affixed to the haptic glove 918 at the center point of rotation of the thumb and pointer finger of the operator. The angle of the servo may be controlled by two armatures with rings allowing coupling of the operator fingers to the armatures. One armature can be affixed to the operator glove thumb 994 and the second armature can be affixed to the operator glove pointer finger 993. In various embodiments, the servo may be configured to provide feedback information garnered from the haptic hand 810 of the operator controllable device 800 shown in FIG. 13 to the fingers of the operator using the operator interface 900 shown in FIG. 15 in the form of resistance as the operator guides the operator controllable device 800 to pick up an object. In one embodiment, for example, the haptic glove 918 may use a Dynamixel™ AX-12 servo.

Referring still to FIG. 16, in various embodiments, the haptic glove 918 may have a right vibrational device or buzzer 988, which may be configured to vibrate with an amplitude or frequency that is a function of the signals coming from the finger pressure sensors of the haptic hand 810 of the operator controlled device 800 shown in FIG. 13. In various embodiments, the amplitude or frequency may increase with increasing sensed pressure. In some embodiments, the vibrational device 988 may be mounted on the back of the operator interface glove, or elsewhere on the haptic glove.

As discussed above, the second arm sensor assembly 909 may be generally similar to the first arm sensor assembly 907, except that it is mirrored. In the embodiment shown in FIG. 16, the upper arm rotation capture device 954 includes a potentiometer 980, the lower arm rotation capture device 958 includes a potentiometer 982, and the haptic glove 962 includes a servo 984 and a left vibrational device or buzzer 991.

Referring to FIG. 16, in various embodiments, the locomotion pedals 920 may be controlled by the operator's feet. The locomotion pedals 920 may be configured such that angles sensed or captured by the pedals control the motors 818 of the operator controllable device 800 shown in FIG. 13 and thus control locomotion of the operator controllable device 800. Referring to FIG. 16 in various embodiments, left and right forward motion pedals 917 and 913 may operate independently triggering left and right treads 850 and 812 respectively of the motility treads of the operator controllable device 800 shown in FIG. 13 and may facilitate turning of the operator controllable device 800.

In various embodiments, the locomotion pedals 920 may include a reverse motion pedal 915 configured to control both left and right treads 850 and 812 shown in FIG. 13. The three pedals may be fixed to a single rubber mat to prevent movement or sliding during use. In one embodiment, each of the locomotion pedals 920 may include a rotating foot platform, a potentiometer to capture the angle of the foot platform and a spring to return the pedal to a neutral position when the operator's foot is removed.

Still referring to FIG. 16, in some embodiments, the locomotion pedals 920 may include a pedal for the left drive train, a pedal for the right drive train, and a pedal for reverse. In some embodiments, the left and right drive train pedals may provide signals which are combined to calculate a rotational and linear velocity of the operator controllable device.

Referring to FIG. 16, in various embodiments, a torso pitch interface 922 may capture or sense how much an operator has bent forward by sensing the angle of the operator's torso relative to their legs. An extension arm 986 on which the servo 925 is mounted may connect to the operator interface 900 by a hinge. In various embodiments, the extension arm may firmly connect to the operator's upper thigh. In one embodiment, the waist servo 925 of the torso pitch interface 922 may, for example, be a Dynamixel™ AX-12 servo.

Referring still to FIG. 16, in various embodiments, the operator vest 924 may provide a mounting structure for components of the operator interface 900. The operator vest 924 may attach and anchor the operator interface 900 firmly to the operator's body. In some embodiments the operator vest 924 may have decorative lights or LEDs 1072 on the front. In some embodiments, the operator vest 924 may also or alternatively have LEDs on the back of the operator vest. In one embodiment, the operator vest 924 may, for example, be implemented using a Fox Racing Airframe Roost Deflector.

Figure 17:
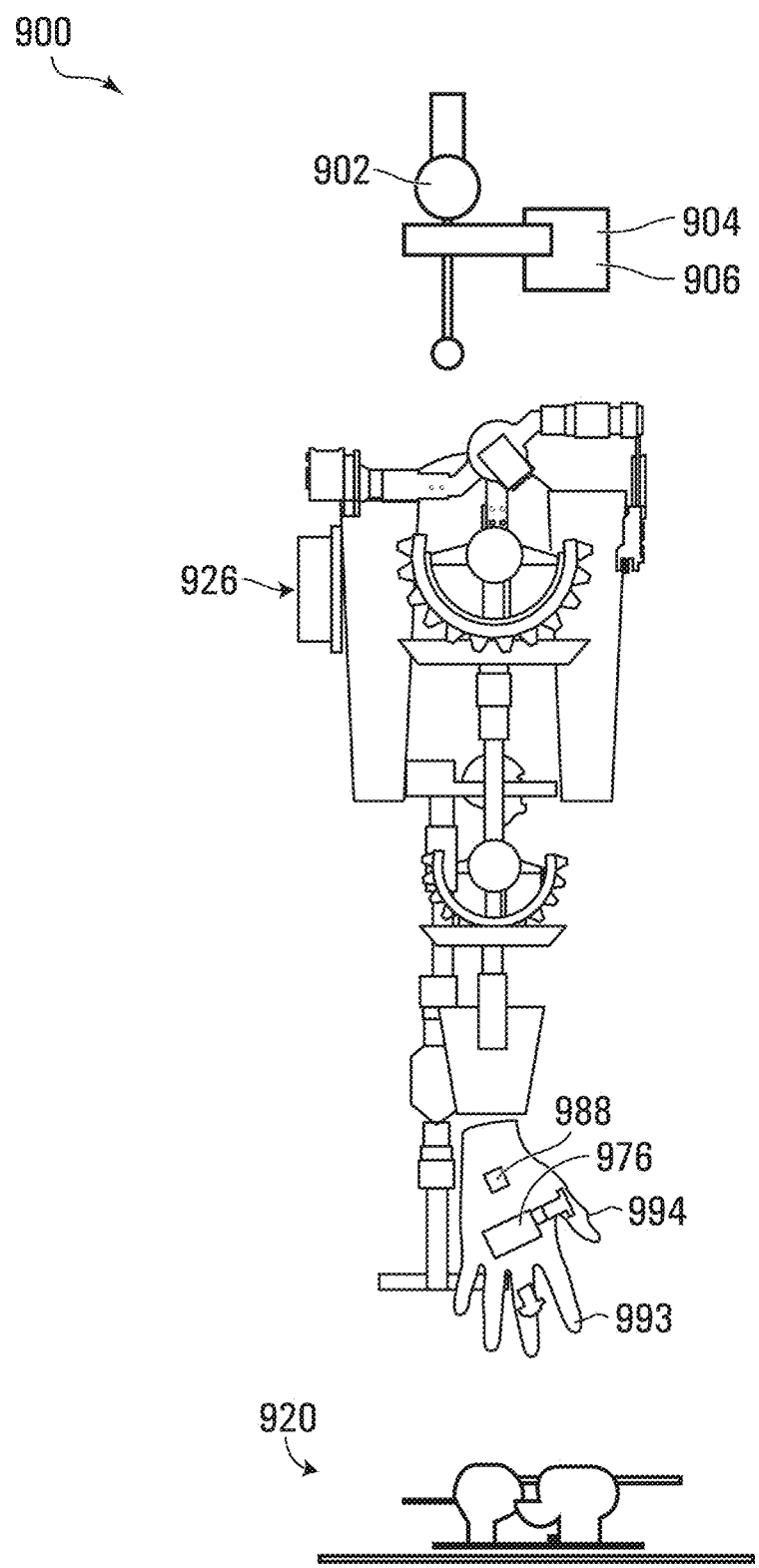
FIG. 17 is a side elevation view depicting the operator interface shown in FIG. 15.

Referring to FIG. 17, in various embodiments, the electronic back-box 926 may be attached to the vest 924 and may contain electronic components associated with the operator interface 900. In one embodiment the electronic back-box 926 may contain an Arduino Pro Mini which captures the sensor signals from the potentiometers 970, 972, 980, and 982 and controls the LEDS mounted on the vest 924, power boards for the Dynamixel™ bus, a power-breakout board which may also act as a patch panel including patching of the hand sensor signals and some ground pins, an Odroid™ which handles the wireless adapter for Wifi communication as well as a USB2AX connector which allows the Odroid™ to send signals to the Dynamixels™. The Odroid™ may also send signals to the Android™ Pro mini. The electronic back-box 926 may also contain an Arduino Uno configured to receive or capture position information from the pedals 920.

The chest/shoulder suit support structure 928 allows for suspension of operator interface suit items from the frame rather than from the operator's limbs. In various embodiments, the chest/shoulder suit support structure 928 may facilitate removal of the weight of the operator interface 900 off of the operator's arms onto the operators shoulder and back.

Figure 18:
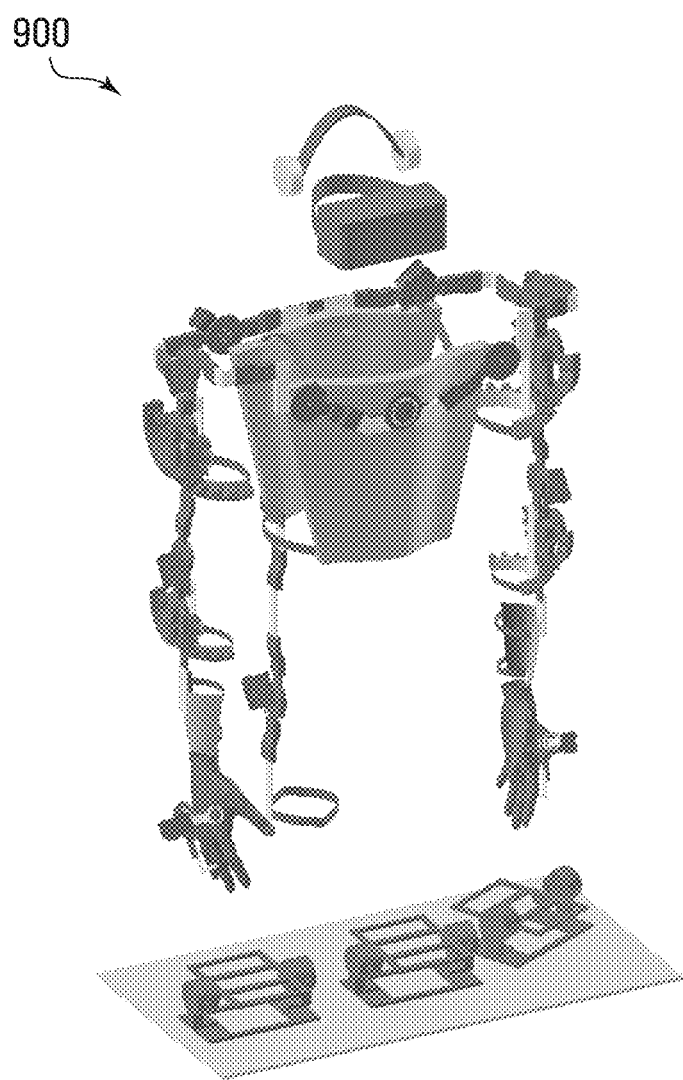
FIG. 18 is a front perspective view depicting the operator interface shown in FIG. 15.
Figure 19:
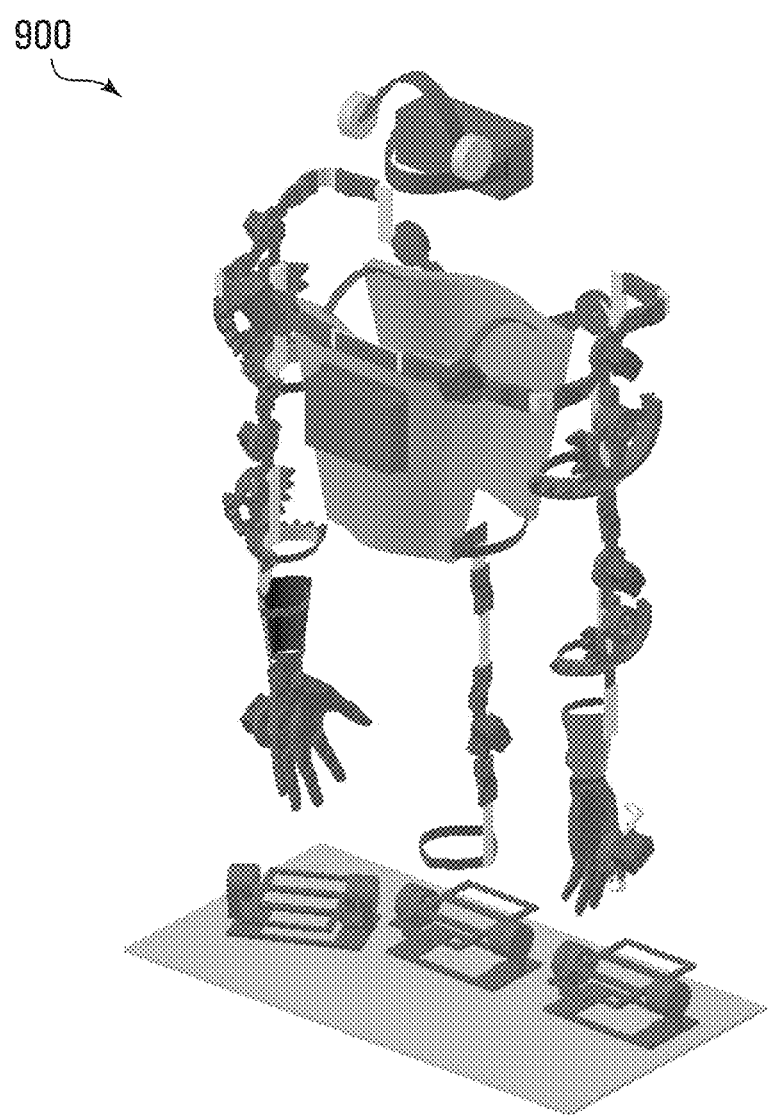
FIG. 19 is a rear perspective view depicting the operator interface shown in FIG. 15.

FIG. 17 shows a side elevation view of the operator interface 900 shown in FIG. 16. FIG. 18 shows a front perspective view of the operator interface 900 shown in FIG. 16. FIG. 19 shows a rear perspective view of the operator interface 900 shown in FIG. 16.

Figure 20:
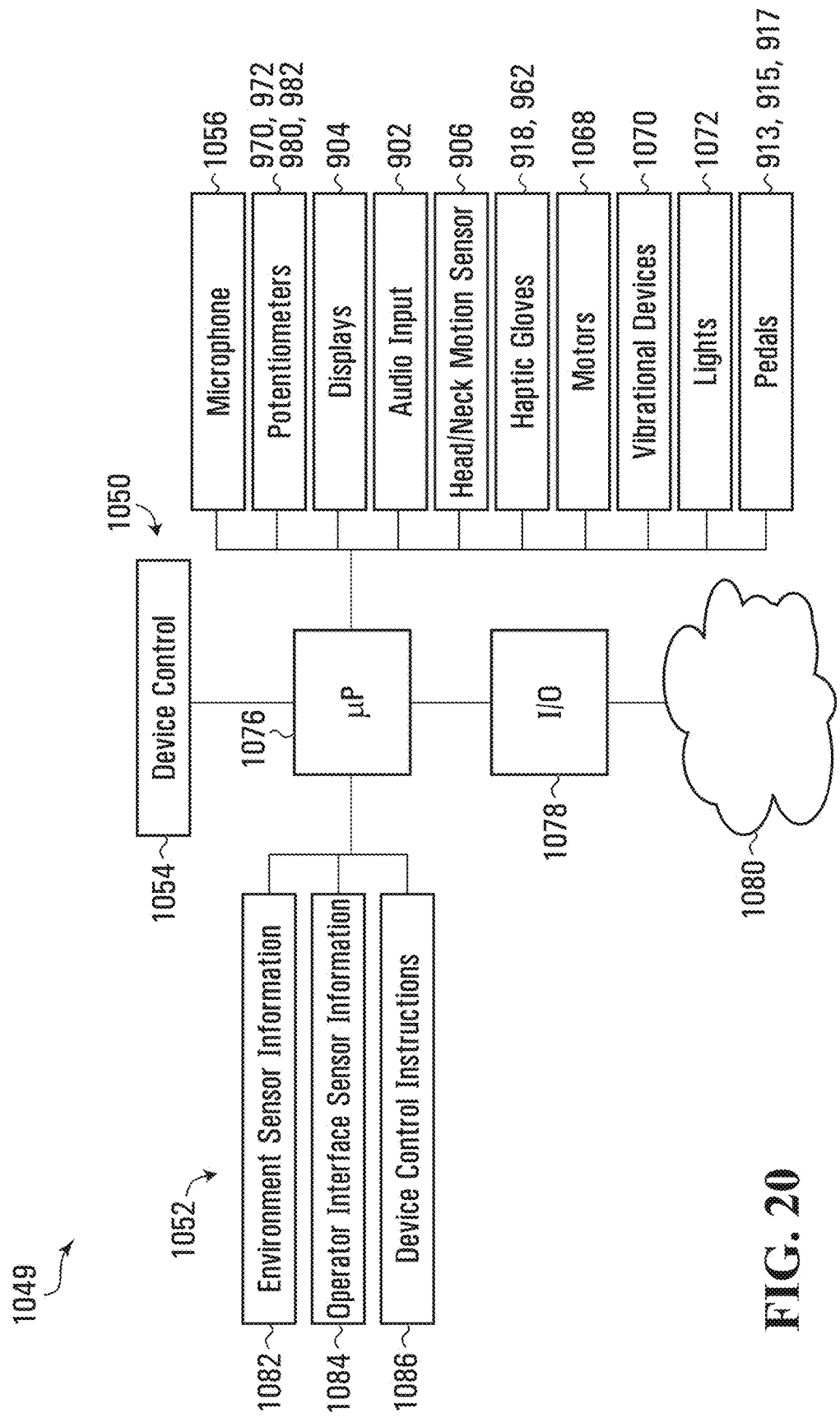
FIG. 20 is a schematic view of a processor circuit for implementing the operator interface shown in FIG. 16.

Referring to FIG. 20, a schematic view of a processor circuit for implementing the operator interface 900 shown in FIG. 16 according to one embodiment is shown at 1049. The operator interface 900 includes an operator interface processor 1076, a program memory 1050, and a variable memory 1052. In the embodiment shown in FIG. 16, the operator interface processor 1076, the program memory 1050, and the variable memory 1052 may be included in the Odroid™ included in the electronic backbox 926. While the operator interface processor 1076 is shown schematically as a single unit in the embodiment shown in FIG. 20, in various embodiments the operator interface processor 1076 may be implemented using one or more processors.

The processor circuit 1049 also includes the microphone 1056 of the operator interface 900 shown in FIG. 16 and the potentiometers 970, 972, 980, and 982 of the operator interface 900 shown in FIG. 16.

The processor circuit 1049 also includes the left and right visual displays 904 of the operator interface 900 shown in FIG. 16, the left/right audio input 902 of the operator interface 900 shown in FIG. 16, and the head/neck motion sensor 906 of the operator interface 900 shown in FIG. 16.

Referring still to FIG. 20, the processor circuit 1049 also includes the haptic gloves 918 and 962 of the operator interface 900 shown in FIG. 16, and the motors of the operator interface 900 shown in FIG. 16, which are shown, for convenience, schematically at 1068 in FIG. 20.

The processor circuit 1049 also includes the vibrational devices (shown at 1070) of the haptic gloves 918 and 962 shown in FIG. 20, the lights/LEDs 1072 of the operator vest 924, pedals 913, 915, and 917 and an input/output ("I/O") interface 1078.

In various embodiments, the program memory 1050, variable memory 1052, and I/O interface 1078 may be implemented, for example, as described for the program memory 102, variable memory 104, and I/O interface 120 of the operator interface 14 shown in FIG. 3.

The I/O interface 1078 may be configured to connect to the network 1080, through which communications may be conducted with devices connected to the network 1080, such as the operator controllable device 800 and/or an analyzer.

In various embodiments, the program memory 1050 includes a block of codes 1054 for directing the operator interface 900 to effect device control functions. The block of codes 1054 may store code having generally similar functionality to the block codes 140 of the program memory 102 shown in FIG. 3.

The variable memory 1052 includes a plurality of storage locations including location 1082 for storing device environment sensor information, location 1084 for storing operator interface sensor information, and location 1086 for storing device control instructions.

In various embodiments, the operator interface 900 may be configured to be interacted with by a human operator. In such embodiments, the sensors and actuator and/or output devices of the operator interface 900 may be configured to be interacted with by a human operator such that the operator is able to experience and react to a representation or simulation of an environment sensed by the operator controllable device 800 shown in FIG. 19.

Figure 65:
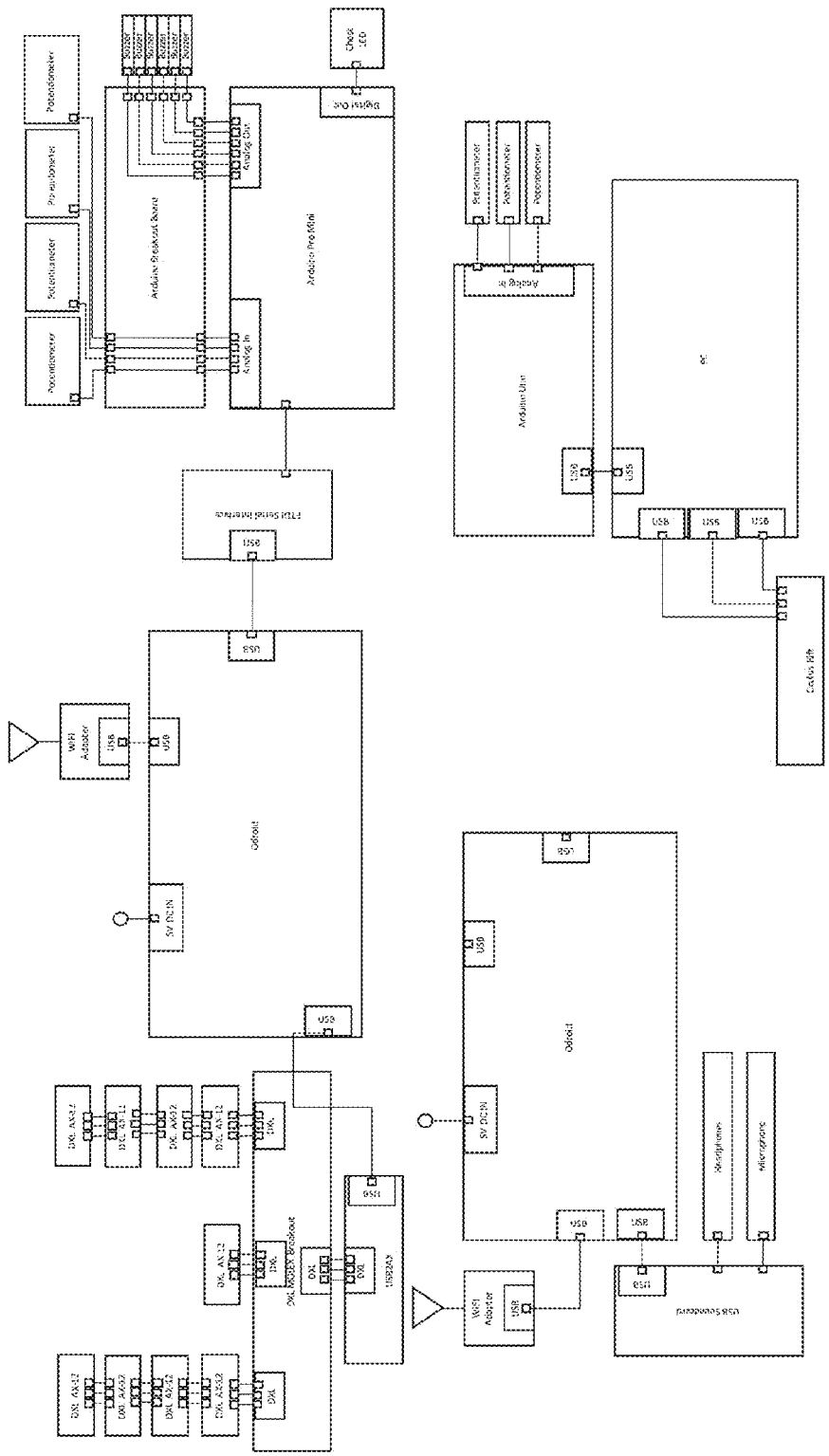
FIG. 65 is a schematic view of an embodiment of the processor circuit shown in FIG. 20.

In various embodiments, one or more processor circuits may act as the processor circuit 1049. For example, the processor circuit 1049 may be implemented using one or more processors acting as the operator interface processor 1076, one or more memory devices acting as the program memory 1050 and/or the variable memory 1052, one or more sensors or actuators acting as any of the sensor or actuators shown in FIG. 20 and/or one or more I/O interfaces acting as the I/O interface 1078. For example, in various embodiments, the processor circuit 1049 may be implemented as shown in FIG. 65.

Facilitating Device Control

In various embodiments, the operator controllable device 800 and the operator interface 900 shown in FIGS. 13 and 16 respectively may be configured to function and interact generally similarly to as described above regarding the operator controllable device 12 and the operator interface 14 shown in FIG. 1.

Referring to FIG. 15, in various embodiments, the block of codes 1006 for directing the device processor 1024 to effect operator controlled functions may encode one or more flowchart similar to the flowchart 300 shown in FIG. 5. In some embodiments, the block of codes 1006 may include blocks similar to blocks 302 and 304 of the flowchart 300 shown in FIG. 5, that direct the device processor 1024 to receive and send a subset of environment sensor information to the operator interface 900 and/or an analyzer 992 shown in FIG. 51.

Similarly, the block of codes 1054 shown in FIG. 20 may encode one or more flowcharts similar to the flowchart 400 shown in FIG. 7. In some embodiments, the block of codes 1054 may include blocks similar to the blocks 406, 408 and 410 of the flowchart 400 shown in FIG. 7, that direct the operator interface processor 1076 to receive a subset of operator interface sensor information and derive and send a subset of device control instructions.

Figure 51:
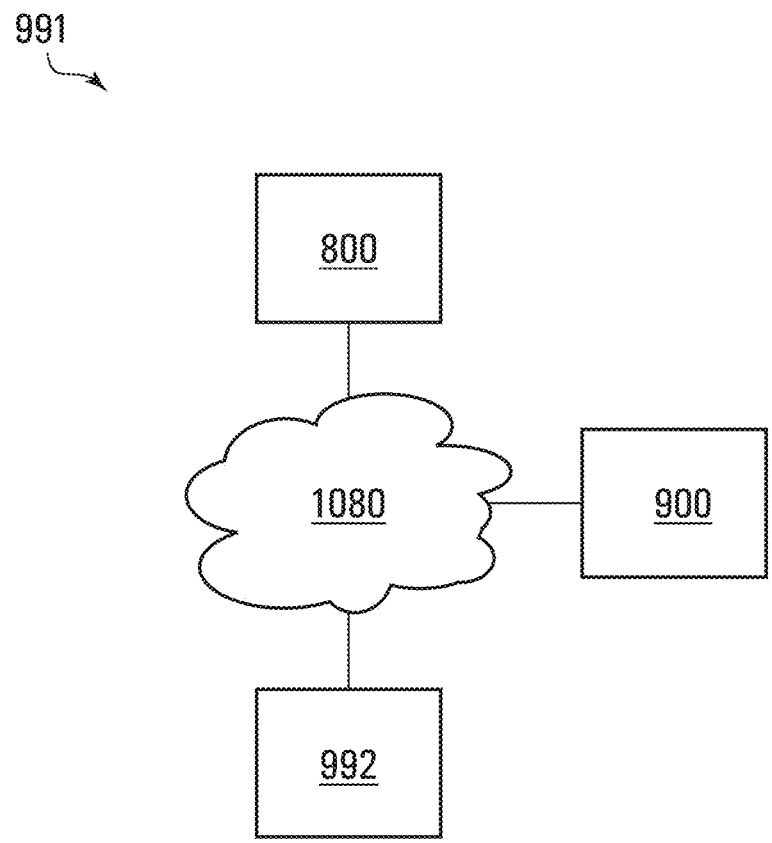
FIG. 51 is a schematic view of a system for delivering facilitating device control in accordance with various embodiments.

Accordingly, the structure of communications within a system similar to the system shown in FIG. 1, such as the system 991 shown in FIG. 51, for example, may be modular. Sub-groupings of sensors and/or actuators on the operator controllable device 800 shown in FIG. 13, may communicate separately with an associated group of sensors and/or actuators on the operator interface 900 shown in FIG. 16 by sending sets of frame records here referred to as streams.

Data moving through the system may be captured into data frames at a stream level. In some embodiments, streams may include an operator controllable device left video stream which may include operator controllable device left video stream frame records, such as the frame record 2550 shown in FIG. 21, an operator controllable device right video stream which may include operator controllable device right video stream frame records, such as the frame record 2600 shown in FIG. 22, an operator controllable device audio stream which may include operator controllable device audio stream frame records, such as the frame record 2650 shown in FIG. 23, an operator controllable device arm and torso stream which may include operator controllable device arm and torso stream frame records, such as the frame record 2700 shown in FIG. 24, an operator controllable device hand stream which may include operator controllable device hand stream frame records, such as the frame record 2750 shown in FIG. 25, an operator controllable device pressure sensor stream which may include operator controllable device pressure sensor stream frame records, such as the frame record 2800 shown in FIG. 26, an operator controllable device tread stream which may include operator controllable device tread stream frame records, such as the frame record 3200 shown in FIG. 69, an operator interface audio stream which may act as device control instructions and include operator interface audio stream frame records, such as the frame record 2850 shown in FIG. 27, an operator interface head orientation stream which may act as device control instructions and include operator interface head orientation stream frame records, such as the frame record 2900 shown in FIG. 28, an operator interface arm and torso stream which may act as device control instructions and include operator interface arm and torso stream frame records, such as the frame record 2950 shown in FIG. 29, and operator interface wrist and shoulder yaw stream which may act as device control instructions and include operator interface wrist and shoulder yaw stream frame records, such as the frame record 3000 shown in FIG. 30 and an operator interface pedal stream which may act as device control instructions and include operator interface pedal stream frame records, such as the frame record 3050 shown in FIG. 31.

FIG. 21 depicts an exemplary operator controllable device left video stream frame record 2550 in accordance with one embodiment. The operator controllable device left video stream frame record 2550 includes a left image field 2551 for storing a representation of a portion of H264 Encoded Video 1024×576, which may be captured at 30 fps, for example. Blocks encoded in the block of codes 1006 of the program memory 1000 shown in FIG. 15 may be generally similar to the blocks 302 and 304 shown in FIG. 5 and may direct the device processor 1024 to receive left video information from the camera 836 of the operator controllable device 800 shown in FIG. 13 and send a left video stream frame record representing the left video information, such as the left video stream frame record 2550, to the analyzer 992 and/or the operator interface 900, for example, with each frame record representing data from a video stream.

FIG. 22 depicts an exemplary operator controllable device right video stream frame record 2600 in accordance with one embodiment. The operator controllable device right video stream frame record 2600 includes a right image field 2601 for storing a representation of a portion of H264 Encoded Video 1024×576 which may be captured at 30 fps, for example. Blocks encoded in the block of codes 1006 of the program memory 1000 shown in FIG. 15 may be generally similar to the blocks 302 and 304 shown in FIG. 5 and may direct the device processor 1024 to receive right video information from the camera 837 of the operator controllable device 800 shown in FIG. 13 and send a right video stream frame record representing the right video information, such as the right video stream from record 2600 to the analyzer 992 and/or the operator interface 900, for example, with each frame record representing data from a video stream.

FIG. 23 depicts an exemplary operator controllable device audio stream frame record 2650 in accordance with one embodiment. The operator controllable device audio stream frame record 2650 includes a left audio field 2651, and a right audio field 2652 each for storing a representation of a portion of Opus Encoded Mono Audio at 48 kHz. Blocks encoded in the block of codes 1006 of the program memory 1000 shown in FIG. 15 may be generally similar to the blocks 302 and 304 shown in FIG. 5 and may direct the device processor 1024 to receive audio information from the microphones 838 and 839 and send an audio stream frame record representing the audio information, such as the audio stream from record 2650 to the analyzer 992 and/or the operator interface 900, for example, with each frame record representing data from an audio stream.

FIG. 24 depicts an exemplary operator controllable device arm and torso stream frame record 2700 in accordance with one embodiment. The operator controllable device arm and torso stream frame record 2700 includes a left wrist motor position field 2701, a right wrist motor position field 2702, a left elbow motor position field 2703, a right elbow motor position field 2704, a left shoulder pitch motor position field 2705, a right should pitch motor position field 2706, a left shoulder roll motor position field 2707, a right shoulder roll motor position field 2708, a left shoulder yaw motor position field 2709, a right shoulder yaw motor position field 2710, a torso pitch motor position field 2711, a head yaw motor position field 2712, a head pitch motor position field 2713, a left wrist motor velocity field 2714, a right wrist motor velocity field 2715, a left elbow motor velocity field 2716, a right elbow motor velocity field 2717, a left shoulder pitch motor velocity field 2718, a right should pitch motor velocity field 2719, a left shoulder roll motor velocity field 2720, a right shoulder roll motor velocity field 2721, a left shoulder yaw motor velocity field 2722, a right shoulder yaw motor velocity field 2723, a torso pitch motor velocity field 2724, a head yaw motor velocity field 2725 and a head pitch motor velocity field 2726. In various embodiments, each of the fields of the operator controllable device arm and torso stream frame record 2700 may store a normalized value between 0 and 1. Blocks encoded in the block of codes 1006 of the program memory 1000 shown in FIG. 15 may be generally similar to the blocks 302 and 304 shown in FIG. 5 and may direct the device processor 1024 to receive operator controllable device arm and torso information from the left wrist servo 808, the right wrist servo 809, the left elbow servo 807, the right elbow servo 806, the left shoulder pitch servo 815, the right shoulder pitch servo 805, the left shoulder roll servo 852, the right shoulder roll servo 802, the left shoulder yaw servo 813, the right shoulder yaw servo 804, the torso pitch servo 822, the head yaw servo 831 and the head pitch servo 830 of the operator controllable device 800 shown in FIG. 13 and send an operator controllable device arm and torso stream frame record representing the motor information, such as the operator controllable device arm and torso stream from record 2700 to the analyzer 992 and/or the operator interface 900, for example, with each frame record representing data from a device arm and torso stream.

FIG. 25 depicts an exemplary operator controllable device hand stream frame record 2750 in accordance with one embodiment. The operator controllable device hand stream frame record 2750 includes a left first finger motor position field 2751, a right first finger motor position field 2752, a left second finger motor position field 2753, a right second finger motor position field 2754, a left third finger motor position field 2755, a right third finger motor position field 2756, a left first finger motor velocity field 2757, a right first finger motor velocity field 2758, a left second finger motor velocity field 2759, a right second finger motor velocity field 2760, a left third finger motor velocity field 2761 and a right third finger motor velocity field 2762. In various embodiments, each of the fields of the operator controllable device hand stream frame record 2750 may store a normalized value between 0 and 1. Blocks encoded in the block of codes 1006 of the program memory 1000 shown in FIG. 15 may be generally similar to the blocks 302 and 304 shown in FIG. 5 and may direct the device processor 1024 to receive operator controllable device hand information from the right first finger 817 motor, the left first finger motor generally similar to 817 on the left haptic feedback hand or end manipulator 811, a right second finger 819 motor, a left second finger motor generally similar to 819 on the left haptic feedback hand or end manipulator 811, a right third finger 821 motor and a left third finger motor generally similar to 819 on the left haptic feedback hand or end manipulator 811 of the operator controllable device 800 shown in FIG. 13 and send an operator controllable device hand stream frame record representing the motor information, such as the operator controllable device hand stream from record 2750 to the analyzer 992 and/or the operator interface 900, for example, with each frame record representing data from a device hand stream.

FIG. 26 depicts an exemplary operator controllable device pressure sensor stream frame record 2800 in accordance with one embodiment. The operator controllable device pressure sensor stream frame record 2800 includes a right first finger haptic signal field 2801, a right second finger haptic signal field 2802, a right third finger haptic signal field 2803, a left first finger haptic signal field 2804, a left second finger haptic signal field 2805 and a left third finger haptic signal field 2806. In various embodiments, each of the fields of the operator controllable device pressure sensor stream frame record 2800 may store a normalized value between 0 and 1. Blocks encoded in the block of codes 1006 of the program memory 1000 shown in FIG. 15 may be generally similar to the blocks 302 and 304 shown in FIG. 5 and may direct the device processor 1024 to receive operator controllable device hand information from the right first finger 817 pressure sensor, the left first finger generally similar to 817 on the left haptic feedback hand or end manipulator 811 pressure sensor, the right second finger 819 pressure sensor, the left second finger generally similar to 819 on the left haptic feedback hand or end manipulator 811 pressure sensor, the right third finger 821 pressure sensor and the left third finger generally similar to 821 on the left haptic feedback hand or end manipulator 811 pressure sensor of the operator controllable device 800 shown in FIG. 13 and send an operator controllable device pressure sensor stream frame record representing the pressure information, such as the operator controllable device pressure sensor stream from record 2800 to the analyzer 992 and/or the operator interface 900, for example, with each frame record representing data from a device pressure stream.

FIG. 69 depicts an exemplary operator controllable device tread stream frame record 3200 in accordance with one embodiment. The exemplary operator controllable device tread stream frame record 3200 includes a left tread motor position field 3201, a right tread motor position field 3202, a left tread motor velocity field 3203 and a right tread motor velocity field 3204. In various embodiments, each of the fields of the operator controllable device tread stream frame record 3200 may store a normalized value between 0 and 1. Blocks encoded in the block of codes 1006 of the program memory 1000 shown in FIG. 15 may be generally similar to the blocks 302 and 304 shown in FIG. 5 and may direct the device processor 1024 to receive operator controllable device tread motor information from the left and right tread motors 818 of the operator controllable device 800, and send an operator controllable device tread stream frame record representing the device tread motor information, such as the operator controllable device tread stream from record 3200 to the analyzer 992 and/or the operator interface 900, for example, with each frame record representing data from a device tread stream.

FIG. 27 depicts an exemplary operator interface audio stream frame record 2850 in accordance with one embodiment. The operator interface audio stream frame record 2850 includes an operator audio field 2851 for storing a representation of a portion of Opus Encoded Mono Audio at 48 kHz. Blocks encoded in the block of codes 1054 of the program memory 1050 shown in FIG. 20 may be generally similar to the blocks 406, 408, and 410 of the flowchart 400 shown in FIG. 7 and may direct the operator interface processor 1076 to receive audio information from the microphone 1056 of the operator interface 900 shown in FIG. 20 and to derive and send an operator interface audio stream frame record representing the audio information, such as the operator interface audio stream frame record 2850, to the analyzer 992 and/or the operator controllable device 800, for example, with each frame record representing data from an audio stream.

FIG. 28 depicts an exemplary operator interface head orientation stream frame record 2900 in accordance with one embodiment. The operator interface head orientation stream frame record 2900 includes an IMU x-axis field 2901, an IMU y-axis field 2902 and an IMU z-axis field 2903. Blocks encoded in the block of codes 1054 of the program memory 1050 shown in FIG. 20 may be generally similar to the blocks 406, 408, and 410 of the flowchart 400 shown in FIG. 7 and may direct the operator interface processor 1076 to receive head orientation information from the head/neck motion sensor 906 of the operator interface 900 shown in FIG. 20 and to derive and send an operator interface head orientation stream frame record representing the head orientation information, such as the operator interface head orientation stream frame record 2900, to the analyzer 992 and/or the operator controllable device 900 for example, with each frame record representing data from a head orientation stream.

FIG. 29 depicts an exemplary operator interface arm and torso stream frame record 2950 in accordance with one embodiment. The operator interface arm and torso stream frame record 2950 includes a left haptic glove servo position field 2951, a right haptic glove servo position field 2952, a left elbow motor position field 2953, a right elbow motor position field 2954, a left shoulder pitch motor position field 2955, a right shoulder pitch motor position field 2956, a left shoulder roll motor position field 2957, a right shoulder roll motor position field 2958, a left haptic glove servo velocity field 2959, a right haptic glove servo velocity field 2960, a left elbow motor velocity field 2961, a right elbow motor velocity field 2962, a left shoulder pitch motor velocity field 2963, a right shoulder pitch motor velocity field 2964, a left shoulder roll motor velocity field 2965 and a right shoulder roll motor velocity field 2966. Blocks encoded in the block of codes 1054 of the program memory 1050 shown in FIG. 20 may be generally similar to the blocks 406, 408, and 410 of the flowchart 400 shown in FIG. 7 and may direct the operator interface processor 1076 to receive arm and torso information from the left haptic glove servo 984, right haptic glove servo 976, left elbow servo 956, right elbow servo 912, left shoulder pitch servo 952, right shoulder pitch servo 911, left shoulder roll servo 950 and right shoulder roll servo 908 of the operator interface 900 shown in FIG. 20 and to derive and send an operator interface arm and torso stream frame record representing the arm and torso information, such as the operator interface arm and torso stream frame record 2950, to the analyzer 992 and/or the operator controllable device 900 for example, with each frame record representing data from an arm and torso stream. The frame records may be captured and sent at 50 frame records per second for example.

FIG. 30 depicts an exemplary operator interface wrist and shoulder yaw stream frame record 3000 in accordance with one embodiment. The operator interface wrist and shoulder yaw stream frame record 3000 includes a left wrist potentiometer field 3001, a right wrist potentiometer field 3002, a left shoulder yaw potentiometer field 3003 and a right shoulder potentiometer field 3004. Blocks encoded in the block of codes 1054 of the program memory 1050 shown in FIG. 20 may be generally similar to the blocks 406, 408, and 410 of the flowchart 400 shown in FIG. 7 and may direct the operator interface processor 1076 to receive wrist and shoulder yaw information from a left upper arm rotation capture device potentiometer 980, a right upper arm rotation capture device potentiometer 970, a left lower arm rotation capture device potentiometer 982 and a right lower arm rotation capture device potentiometer 972 of the operator interface 900 shown in FIG. 20 and to derive and send an operator interface wrist and shoulder yaw stream frame record representing the wrist and shoulder yaw information, such as the operator interface wrist and shoulder yaw stream frame record 3000, to the analyzer 992 and/or the operator controllable device 900 for example, with each frame record representing data from a wrist and shoulder yaw stream.

FIG. 31 depicts an exemplary operator interface pedal stream frame record 3050 in accordance with one embodiment. The operator interface pedal stream frame record 3050 includes a first pedal potentiometer field 3051, a second pedal potentiometer field 3052 and a third pedal potentiometer field 3053. Blocks encoded in the block of codes 1054 of the program memory 1050 shown in FIG. 20 may be generally similar to the blocks 406, 408, and 410 of the flowchart 400 shown in FIG. 7 and may direct the operator interface processor 1076 to receive pedal information from a first pedal locomotion pedal 913, a second locomotion pedal 915 and a third locomotion pedal 917 of the operator interface 900 shown in FIG. 20 and to derive and send an operator interface pedal stream frame record representing the pedal information, such as the operator interface pedal stream frame record 3050, to the analyzer 992 and/or the operator controllable device 900 for example, with each frame record representing data from a pedal stream.

Thus, in some embodiments, the operator interface frame records may act as device control instruction records and be sent from the operator interface 900 of FIG. 16 to the operator controllable device 800 of FIG. 13 and/or to an analyzer. In some embodiments, the block of codes 1054 of the program memory 1050 may direct the operator interface processor 1076 to derive device control instruction frame records from the operator interface frame records and send the device control instruction records to the operator controllable device and/or to the analyzer 992.

In some embodiments, one or more of the frame records 2550, 2600, 2650, 2700, 2750, 2800, 3200, 2850, 2900, 2950, 3000, and 3050 may also include metadata fields such as a timestamp field, a recipient field, a format/encoding parameters field for storing parameters sufficient to decode the stream, and a session information field which may include pilot id, task type, suit type, suit assembly id, avatar type, avatar assembly id, for example.

In various embodiments, any of the above described frame records may be sent at between about 30 and 120 frame records per second, for example.

In various embodiments, each data stream may be configured to flow in a particular direction. In one embodiment, streams may be configured to flow from the operator controllable device 800 to the operator controllable interface 900 and in a second embodiment streams may be configured to flow from the operator interface 900 to the operator controllable device.

Agents

In some embodiments, one or more stream may be considered to be sent by a single agent where an agent is a software construct which may facilitate allowing streams to be launched and killed together. For example, an agent is defined in processor readable and executable instructions stored upon or within one or more tangible computer readable storage media. In one embodiment, pairs of agents, one on the operator controllable device 800 and one on the operator interface 900 connect and communicate directly with one another and, once connected, are generally isolated from other agents and streams in the system. In some embodiments, this modularity may reduce the risk of failure of the entire operator controllable device 800 or the operator interface 900 and provide flexible structure for an agile approach to hardware development by allowing simple replacement and testing of particular sensor/actuators. Rather than the entire operator controllable device being in direct communication with the entire operator interface, a subset of the operator controllable device sensors/actuators may communicate separately with a subset of sensors/actuators on the operator interface using agents.

Referring to the operator controllable device 800 as generally shown in FIG. 13 and the operator interface 900 as generally shown in FIG. 16, the actuation of the locomotion pedals 920 of the operator interface 900 have the effect of actuating the motility treads 812 of the operator controllable device 800. The locomotion pedals 920 and the motility treads 812 may communicate directly using agents, through the network 1080 shown in FIG. 51, for example. Once communication is established between two agents, communication occurs directly between those agents and may be isolated from other agents.

In some embodiments, communications for individual or groups of sensors/actuators on the operator controllable device 800 or operator interface 900 may be controlled by an agent. Sensors/actuators may be grouped with a single agent functionally or by other means. In some embodiments, for communication to occur, an agent must be configured and running on both the operator controllable device 800 and on the operator interface 900. Communications for each of the operator controllable device 800 and the operator interface 900 can be considered to be controlled by groups of agents.

One embodiment of the operator controllable device 800 may involve using several agents including two separate camera feed agents, one motility tread controller agent, a motor controller agent, an audio feed agent, and a speaker agent.

One embodiment of the operator interface 900 may involve using several agents including a motor controller agent, one audio receive agent, an audio send agent, an Arduino agent, an Oculus agent.

In one embodiment, a central server in communication with the network 1080 shown in FIGS. 15 and 20 may be required to establish connections between associated agents acting on the operator controllable device 800 and operator interface 900. The central server may be a Redis™ server running in the cloud on Amazon™ EC2, for example. The server may listen for any input from any agents running on either the operator controllable device 800 or the operator interface 900. Upon startup, an agent randomly chooses a UDP port from a list of available ports where it will listen for incoming data. After initialization, the agent notifies the central server indicating a new agent ID, the IP address of the agent, a port and other diagnostic information.

One example of a connection initiated between matching agents may be launching an audio receive agent on the operator interface 900 and then launching an audio send agent on the operator controllable device 800 and sending an agent ID generated by the audio receive agent to the audio send agent. These two agents may be launched manually on the operator controllable device and operator interface or the two launches may be coordinated by a supervising agent (inhabit agent) which communicates the relevant ID information between matching pairs of agents. The audio send agent may use the agent ID to look up the audio receive agent on the central server and identify which IP address and port to use and thus establish a connection between the audio receive agent and the audio send agent. The connection may allow the operator to hear everything occurring in the environment of the operator controllable device 800 through the operator interface 900.

In some embodiments, two additional software entities (a host and an inhabit agent) may facilitate the launch and matchup of agents through the network 1080. A host agent may be launched on either the operator controllable device 800 or the operator interface 900. The host agent may be capable of launching or killing any agent running on the same device. When launched, the host agent may communicate to the central server an indication of which agents the device running the host is capable of running depending on the hardware available on the device. An inhabit agent may match up two host agents and establishes communication links. In some embodiments, the inhabit agent may be able to be run from anywhere, and may allow the launcher to define which two host agents to connect as well as which types of agents should be launched. The inhabit agent will look up both agents on the central server and verify that the required agents are available for both. The inhabit agent will then send requests to both host agents, requesting the launch of the required sub-agents. Once sub-agents at both host agents have launched the host agents will report the new agent IDs and the inhabit agent will match up corresponding agents. To terminate a connections, the inhabit agent will signal each of the host agents telling them to kill sub-agents created by them.

In order to create a connection between an operator controllable device and an operator interface, in some embodiments, a host agent must be launched on the operator controllable device, a second host agent must be launched on the operator interface and an inhabit agent can be launched from anywhere with the IDs of the two host agents to connect.

Data frame records may be logged to a central logging server on which a dedicated logging agent runs. In some embodiments, this central logging server may be included in the analyzer 16 in FIG. 1. This logging agent then logs data to a separate server running ElasticSearch, a third party search server providing a distributed multitenant-capable full-text search engine available under the Apache license.

In some embodiments, bypassing firewalls may be an important aspect of configuring connections between agents. Generally the agents are operating on networks protected by firewalls meaning the agent needs to communicate through the firewall in order to listen at a given port as described above. In some embodiments Universal Plug and Play (UPnP) (defined in standards document ISO/IEC 29341) may be used to allow agents to talk directly through firewalls, but not all routers provide support for UPnP. Accordingly, in some embodiments, VPN connections may be used so that remote devices or agents can connect to another local network in such a way as to appear as simply another machine in the network. Using VPN connections may mean that no ports need to be forwarded, as from the perspective of the agents, they are running on the same network.

Figure 32:
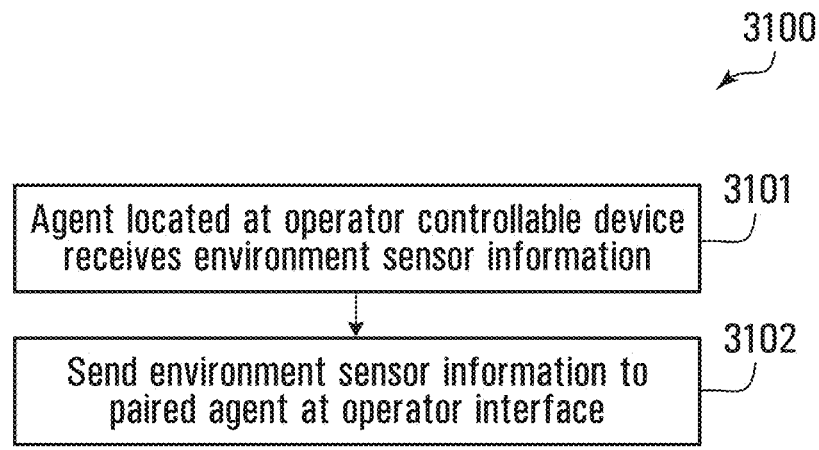
FIG. 32 is a flowchart depicting blocks of code for directing the operator controllable device shown in FIG. 13 to send environmental sensor information.

FIG. 32 shows a flowchart 3100 depicting blocks of code that may be included in the block of codes 1006 of the program memory 1000 of the processor circuit 1001 shown in FIG. 15 for directing the device processor 1024 to send environment sensor information to the operator interface, in accordance with one embodiment. The flowchart 3100 begins at block 3101 which directs the device processor 1024 to cause an agent of the operator controllable device 800 to receive environment sensor information. Block 3102 then directs the device processor 1024 to cause the agent to send the received or captured environment sensor information to the operator interface 900.

Figure 33:
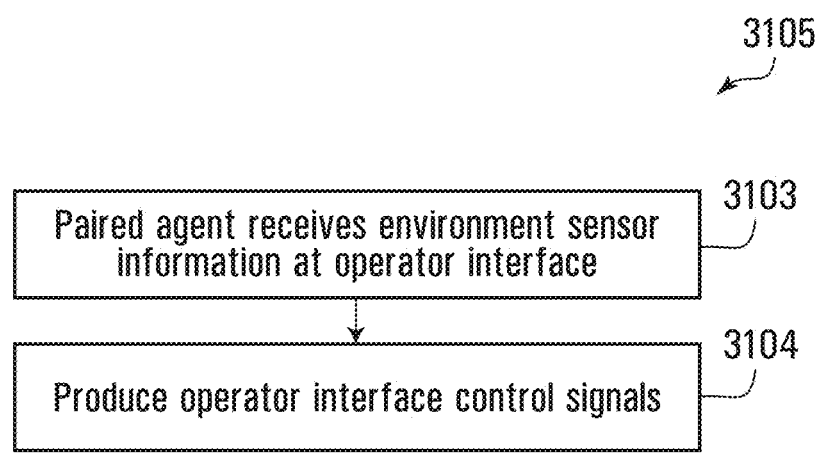
FIG. 33 is a flowchart depicting blocks of code for directing the operator interface shown in FIG. 16 to produce operator interface control signals.

FIG. 33 shows a flowchart 3105 depicting blocks of code that may be included in the block of codes 1054 of the program memory 1050 of the processor circuit 1049 shown in FIG. 20 for directing the operator interface processor 1076 to produce operator interface control signals, in accordance with one embodiment. The flowchart 3105 begins at block 3103 which directs the device processor 1024 to cause an agent located at the operator interface 900 that is paired to the agent of the operator controllable device 800 to receive the environment sensor information sent at block 3102 of the flowchart 3100 shown in FIG. 32. Block 3104 then directs the operator interface processor to produce operator interface control signals derived from the environment sensor information. For example, if the device environment information includes left image information received from the camera 836 of the operator controllable device 800 shown in FIG. 13, then block 3104 may direct the operator interface processor 1076 to cause the left image information to be displayed to an operator using the left display of the left/right displays 904 of the operator interface 900.

Figure 34:
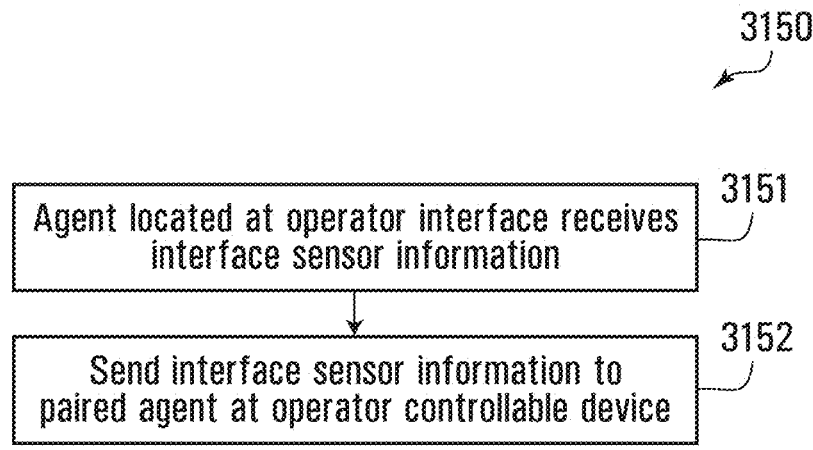
FIG. 34 is a flowchart depicting blocks of code for directing the operator interface shown in FIG. 16 to send operator interface sensor information.

FIG. 34 shows a flowchart 3150 depicting blocks of code that may be included in the block of codes 1054 of the program memory 1050 of the processor circuit 1049 shown in FIG. 20 for directing the operator interface processor 1076 to send operator interface sensor information to the operator controllable device, in accordance with one embodiment. The flowchart 3150 begins at block 3151 which directs the operator interface processor 1076 to cause an agent on the operator interface 900 to receive operator interface sensor information. Block 3152 then directs the operator interface processor 1076 to cause the agent to send the received or captured operator interface information to the operator controllable device 800.

Figure 35:
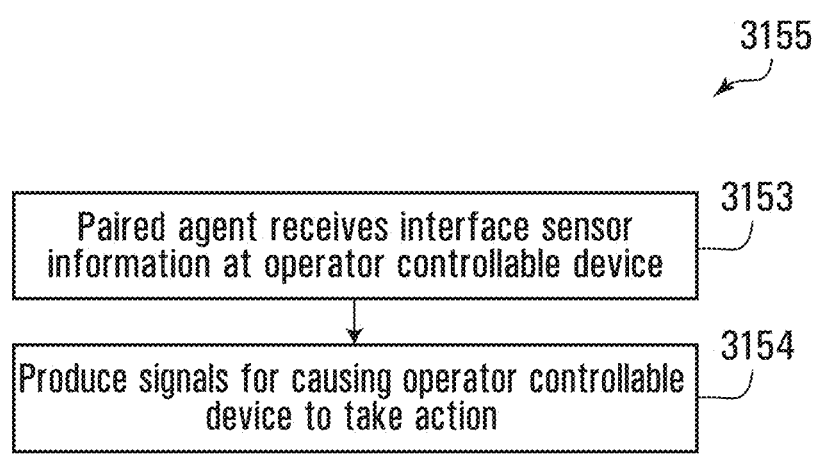
FIG. 35 is a flowchart depicting blocks of code for directing the operator controllable device shown in FIG. 13 to take action based on operator interface sensor information.

FIG. 35 shows a flowchart 3155 depicting blocks of code that may be included in the block of codes 1006 of the program memory 1000 of the processor circuit 1001 shown in FIG. 15 for directing the device processor 1024 to produce signals for causing the operator controllable device 800 to take action based on operator interface sensor information, in accordance with one embodiment. The flowchart 3155 begins at block 3153 which directs the device processor 1024 to cause an agent located at the operator interface 900 that is paired with the agent on the operator controllable device 800 to receive the operator interface sensor information sent at block 3152 of the flowchart 3150 shown in FIG. 34. Block 3154 then directs the device processor 1024 to produce signals for causing actuators of the operator controllable device 800 to take action based on the operator interface sensor information received at block 3153. In some embodiments, the operator interface sensor information may act as device control instructions.

Operator Arm Interface

Figure 36:
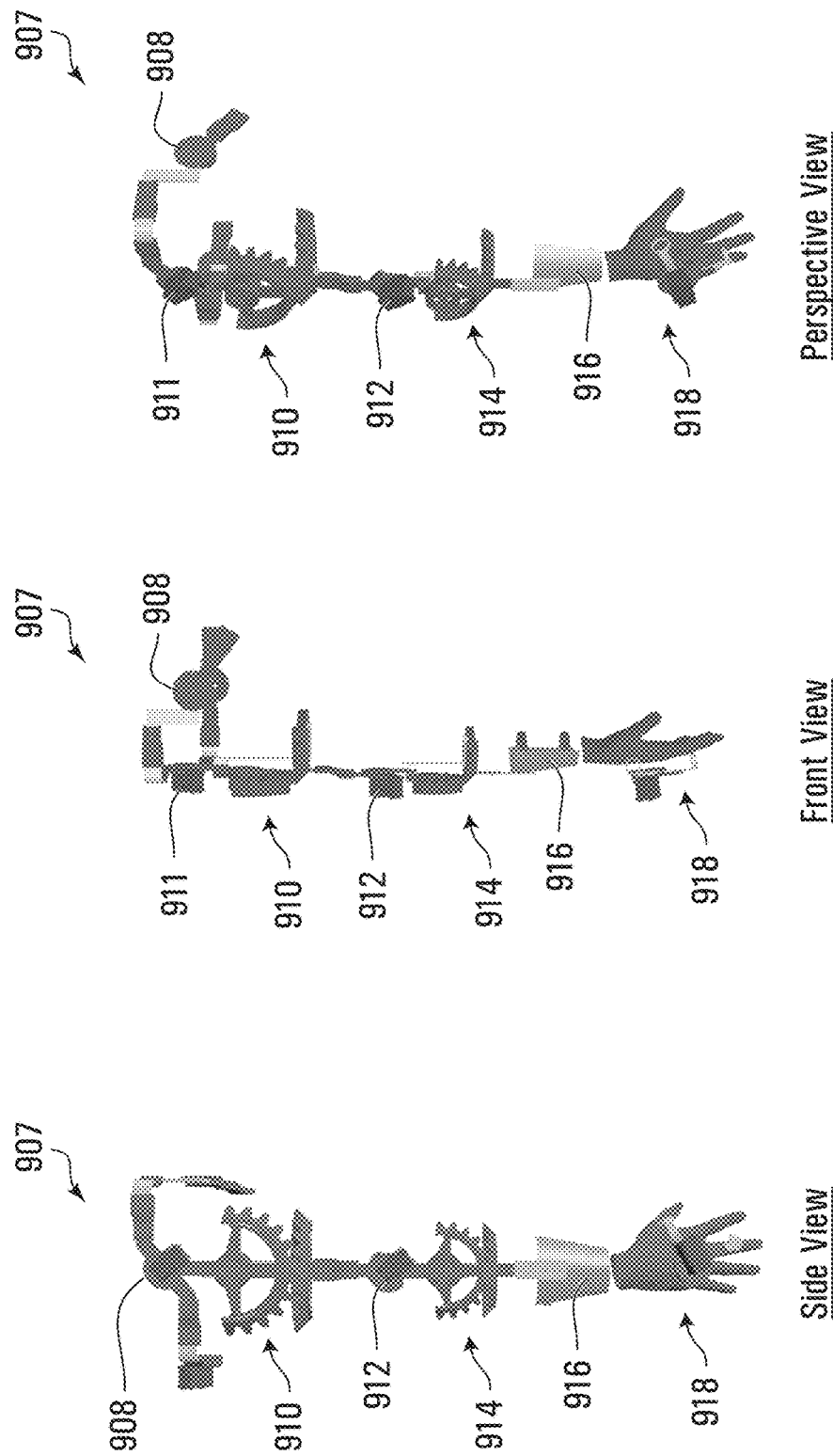
FIG. 36 is a side view, a front view and a perspective view of a first arm sensor assembly of the operator interface shown in FIG. 16 in accordance with one embodiment.

In some embodiments, as discussed above, the operator interface 900 shown in FIG. 16 includes the first arm sensor assembly 907 which acts as an interface for sensing movement of an operator's arm. In various embodiments, the first arm sensor assembly 907 may be used separately from other elements included in the operator interface 900. Referring to FIG. 36, a side view, front view and perspective view of the first arm sensor assembly 907 in accordance with one embodiment is shown in detail.

Figure 37:
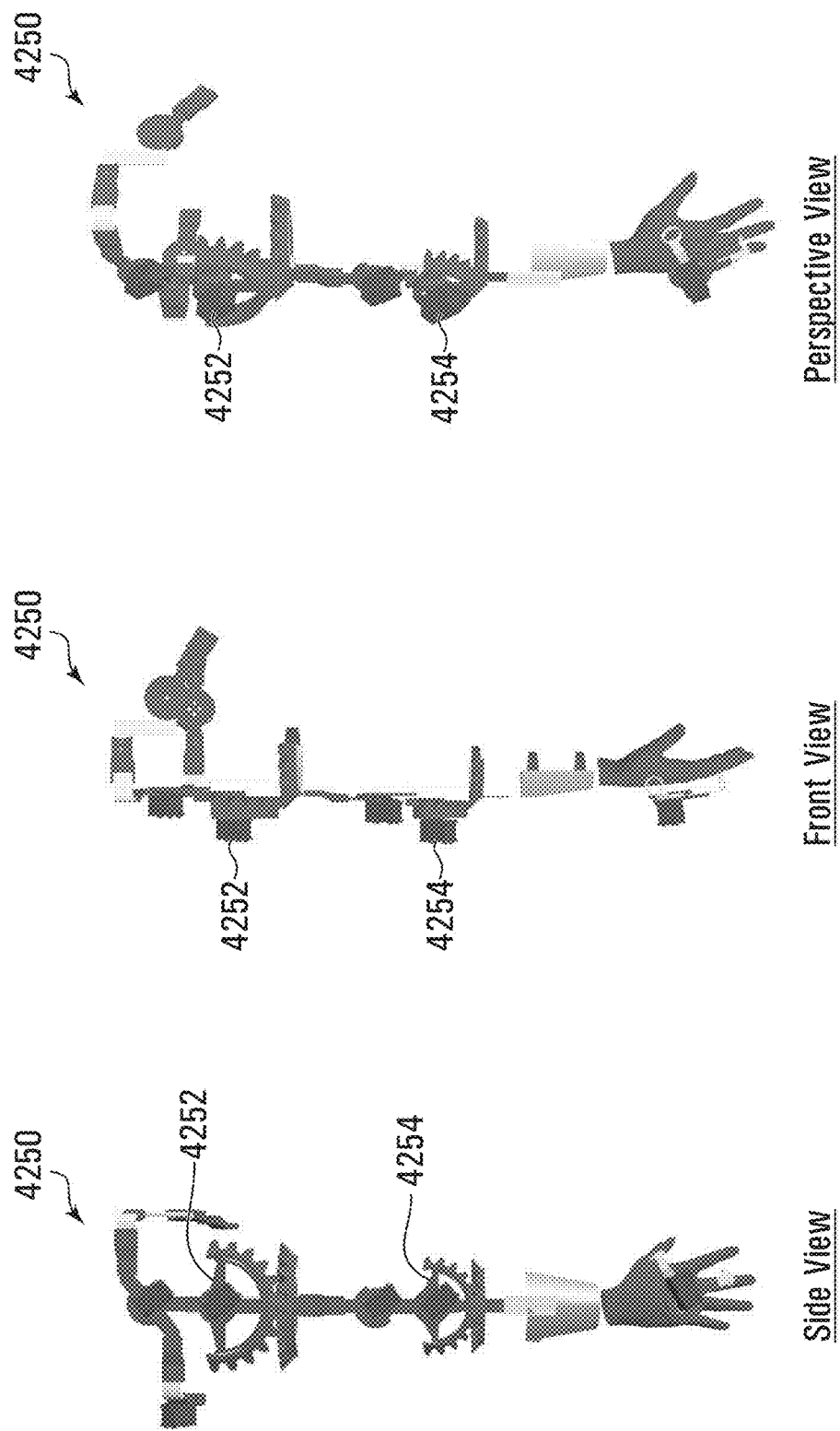
FIG. 37 is a side view, a front view and a perspective view of an arm assembly of the operator interface shown in FIG. 16 in accordance with one embodiment.

Referring to FIG. 37, an arm assembly 4250 in accordance with one embodiment is shown in side view, a front view, and a perspective view. The arm assembly 4250 is generally similar to the first arm sensor assembly 907 shown in FIGS. 16 and 36 except that the arm assembly 4250 includes a servo motor 4252 in place of the potentiometer of the upper arm rotation capture device 910 shown in FIG. 16 and a servo motor 4254 in place of the potentiometer of the lower arm rotation capture device 914. The servo motors 4252 and 4254 may be configured to control and sense positions and velocities of an arm of an operator using the arm assembly 4250. In some embodiments, an operator interface including the arm assembly 4250 with servos may facilitate the arm assembly simulating or replicating positions of a shoulder yaw servo of an operator controllable device, such as the operator controllable device 800 shown in FIG. 13, for example.

Referring now to FIG. 67, an operator interface arm sensor frame record in accordance with one embodiment is shown at 1875. The operator interface arm sensor frame record 1875 includes a haptic glove servo position field 1876, an elbow motors position field 1877, a should pitch motor position field 1878, a shoulder roll motor position field 1879, a haptic glove servo velocity field 1880, and elbow motor velocity field 1881, a shoulder pitch motor velocity field 1882, 1 shoulder roll motor velocity field 1883, a wrist potentiometer field 1884 and a shoulder yaw potentiometer field 1885, In some embodiments, the frame record 1875 may be sent from an operator interface including the arm assembly 4250 to an operator controllable device including the first arm 801 shown in FIG. 38, for example.

FIG. 68 shows an operator controllable device control instruction frame record for an operator controllable device arm in accordance with one embodiment at 1900. The operator controllable device control instruction frame record 1900 may be derived from the operator interface arm sensor frame record 1875 shown in FIG. 67, for example. The frame record 1900 includes a wrist motor position 1901 and velocity 1909, an elbow motor position 1902 and velocity 1910, a shoulder pitch motor position 1903, a shoulder roll motor position 1904 and velocity 1912, a shoulder yaw motor position 1905 and velocity 1913 and a position and velocity field for each of the three fingers 1906, 1907, 1908, 1914, 1915, 1916. In some embodiments, the frame record 1900 may be sent from an operator interface including the first arm sensor assembly 907 to an operator controllable device including the first arm 801, for example.

Operator Controllable Device Arm

Figure 38:
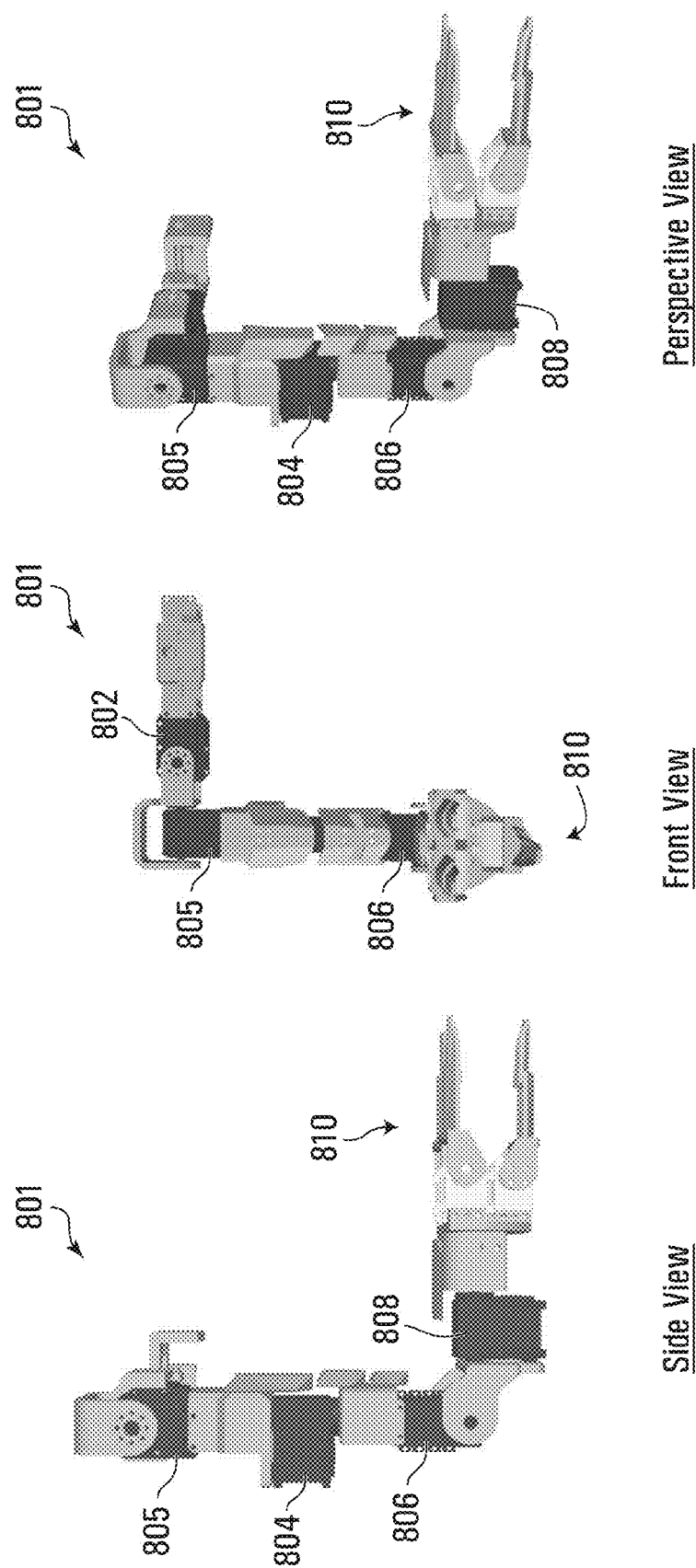
FIG. 38 is a side view, a front view and a perspective view of a first arm assembly of the operator controllable device shown in FIG. 13 in accordance with one embodiment.

In some embodiments, as discussed above, the operator controllable device 800 shown in FIG. 13 includes the first arm 801. In various embodiments, the first arm 801 may be used separately from other elements included in the operator controllable device 800. Referring to FIG. 38, a side view, front view and perspective view of the first arm 801 in accordance with one embodiment is shown in detail.

Referring now to FIG. 66, a frame record representing environment information for an operator controllable device arm including the first arm 801 in accordance with one embodiment is shown at 1850. The operator controllable device arm environment frame record 1850 includes a wrist motor position 1851 and velocity 1859, an elbow motor position 1852 and velocity 1860, a shoulder pitch motor position 1853 and velocity 1861, a shoulder roll motor position 1854 and velocity 1862, a shoulder yaw motor position 1855 and velocity 1863, a position and velocity field for each of the three finger 1857, 1858, 1859, 1864, 1865, 1866 and haptic signals for each of three fingers 1870, 1871, 1872. In some embodiments, the frame record 1850 may be sent from an operator controllable device including the first arm 801 to an operator interface including the arm assembly 4250 shown in FIG. 37, for example.

Upper Arm Rotation Capture Device

Figure 39A:
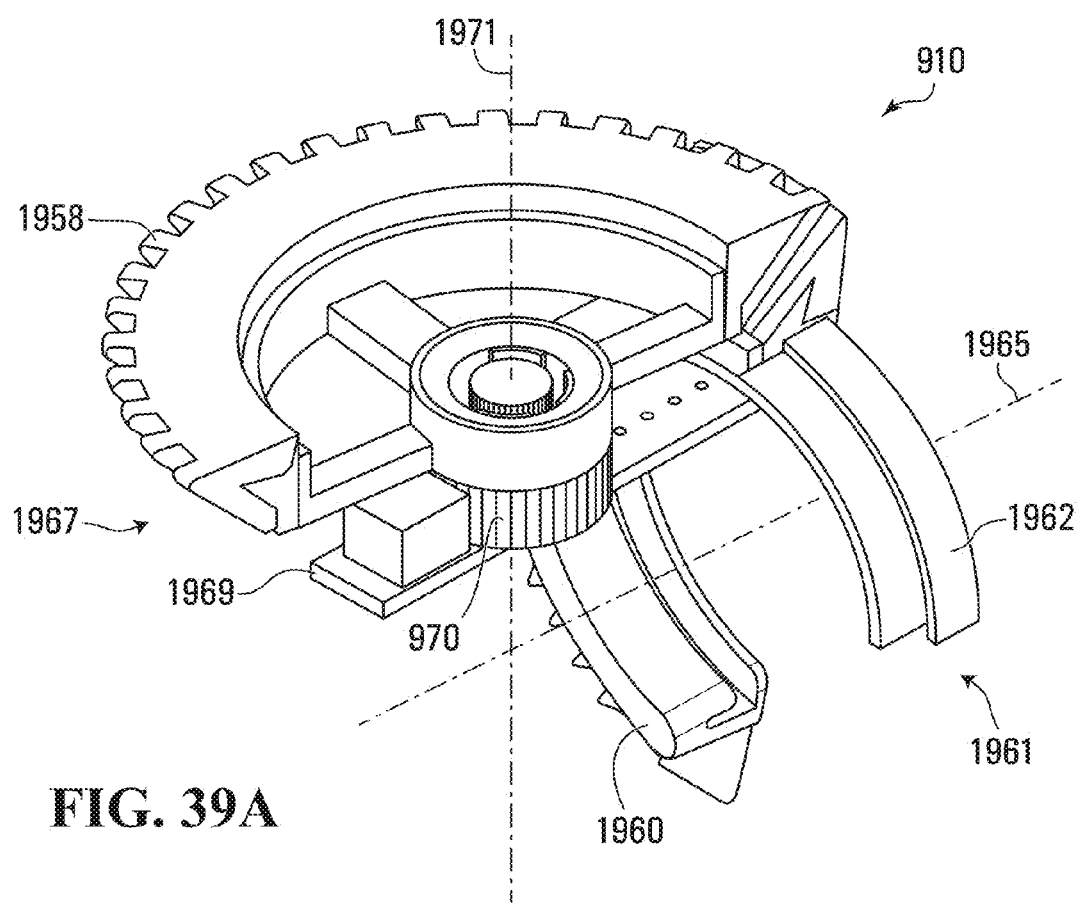
FIG. 39A is a perspective view of an upper arm rotation capture device of the operator interface shown in FIGS. 16 and 36 in accordance with one embodiment.

Referring now to FIG. 39A, the upper arm rotation capture device 910 as shown in FIGS. 16 and 36 is shown in further detail. Referring to FIG. 39A, the upper arm rotation capture device 910 is configured to sense rotation of an upper arm relative to a torso of an operator. The upper arm rotation capture device 910 includes a first rotator 1961 including a lower bevel gear 1960 and a sliding arm band 1962 connected to the lower bevel gear. In the embodiment shown, the lower bevel gear is a miter gear. The sliding arm band 1962 is affixed to a mount 1969 and configured to couple to an upper arm of an operator by partially encircling the upper arm and remains stationary relative to the arm during rotation. Rotation of the upper arm relative to the shoulder causes the sliding arm band 1962 and the lower bevel gear 1960, fixed to the rotation of the elbow, to rotate and slide along the stationary sliding arm band 1962 and thus the first rotator 1961 translates upper arm rotation into rotation of the lower bevel gear. Referring to FIG. 39A, the rotation of the lower bevel gear 1960 has a rotation axis 1965 generally corresponding to a rotation axis of the upper arm of the operator. In operation the rotation axis of the lower bevel gear may pass through the upper arm of the operator.

Referring still to FIG. 39A, the upper arm rotation capture device includes a second rotator 1967 which includes an upper bevel gear 1958 and the potentiometer 970 as shown in FIG. 16 acting as a sensor coupled between the upper bevel gear 1958 and the mount 1969. In one embodiment, the potentiometer 970 may be, for example, a 39/20 mm Center Space Rotary Potentiometer. The mount 1969 is rotatably connected to the upper bevel gear 1958 and held relative to a torso of the operator such that the mount 1969 does not rotate about the axis 1965 with rotation of the lower bevel gear 1960.

The upper bevel gear 1958 includes teeth which mesh with teeth of the lower bevel gear 1960 such that rotation of the lower bevel gear 1960 causes the upper bevel gear 1958 to rotate relative to the mount 1969 about an axis 1971 that is offset from the axis 1965. In various embodiments, by having the axis 1971 offset from the axis 1965, the potentiometer 970 may be positioned on the axis 1971 without being interfered with by the arm of the operator.

In the embodiment shown in FIG. 39A, the axis 1971 is angularly offset from the axis 1965. The axis 1971 being angularly offset from the axis 1965 may result in the upper bevel gear 1958 being able to be positioned near the axis 1965 and thus near the arm of the operator. In the embodiment shown, the axis 1971 is angularly offset by about 90 degrees from the axis 1965 and this may facilitate the upper bevel gear 1958 being positioned particularly close to the arm of the operator. In some embodiments, translation or transduction of the rotation of the operator arm 90 degrees may reduce a footprint of the rotation capture device on the operator interface 900 shown in FIG. 20, for example. In some embodiments the axis 1971 may be positionally offset from the axis 1965.

The potentiometer 970 is configured to sense rotation of the upper bevel gear 1958 relative to the mount 1969. The potentiometer is configured to produce at least one signal representing the rotation of the upper bevel gear 1958 and, referring to FIG. 20, to send the at least one signal to the processor 1076.

Referring still to FIG. 39A, bevel gear sizes may be chosen to fit around the average human arm. The number of teeth on the upper and lower bevel gears 1958, 1960 may be chosen to ensure two teeth are always in contact. The number of teeth on the upper and lower bevel gears 1958, 1960 may be chosen as a function of the individual tooth and tooth clearance as well as the diameter of the gears. For example, the number of teeth may be chosen has a value proportional to pi times the radius of the gear and inversely proportional to the sum of the width of the teeth and the tooth clearance width. For example, the number of teeth may be chosen using the following equation: Number of Teeth=pi*r/(tooth_width+tooth_clearance_width)

Figure 39B:
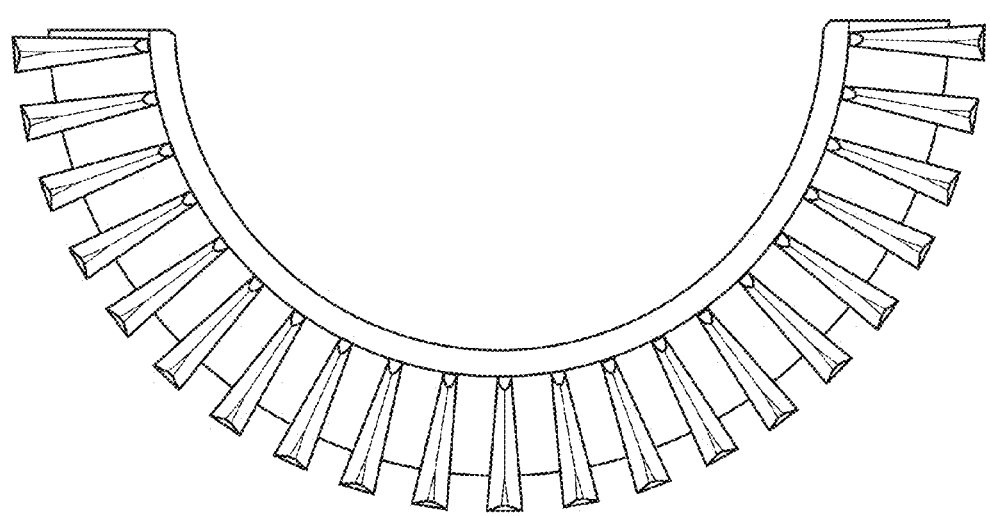
FIG. 39B is a top view of a component of the upper arm rotation capture device shown in FIG. 39A.
Figure 39C:
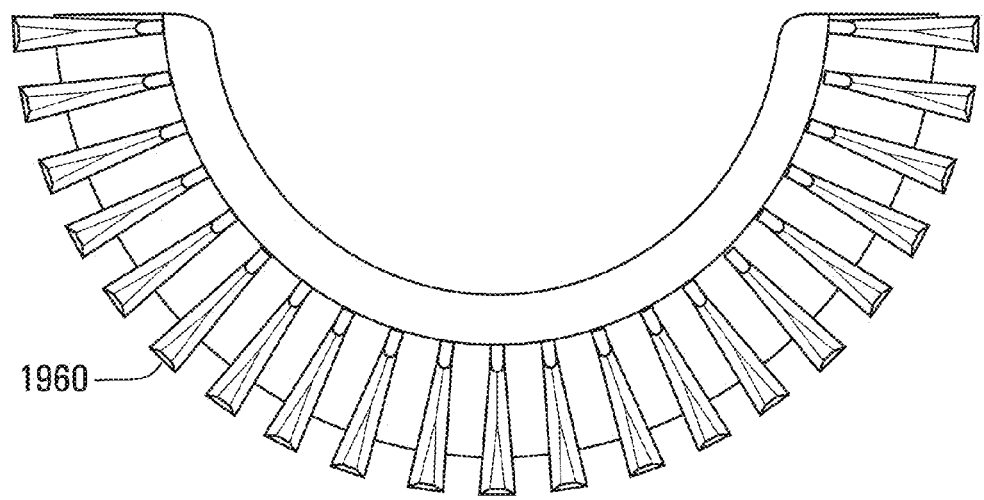
FIG. 39C is a top view of a component of the upper arm rotation capture device shown in FIG. 39A.
Figure 39D:
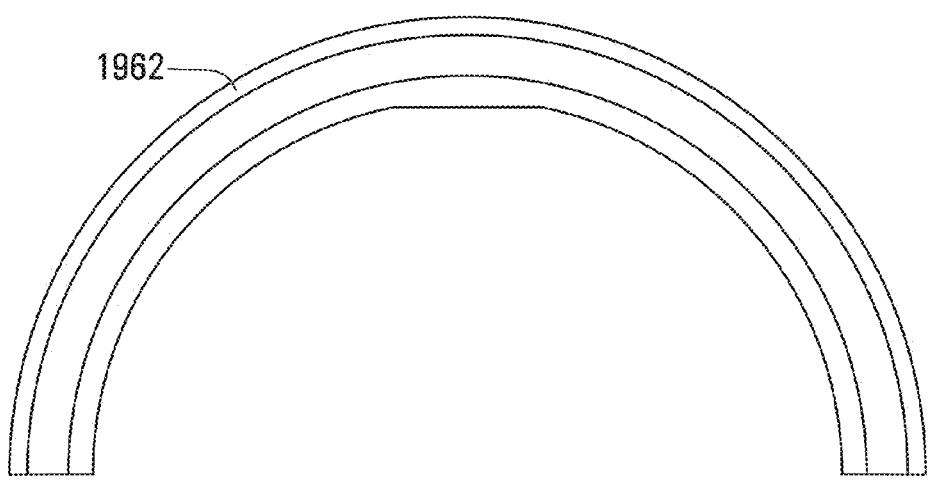
FIG. 39D is a top view of a component of the upper arm rotation capture device shown in FIG. 39A.

FIGS. 39B, 39C, and 39D depict views of the upper bevel gear 1958, the lower bevel gear 1960 and the sliding arm band 1962 respectively.

Lower Arm Rotation Capture Device

Figure 40:
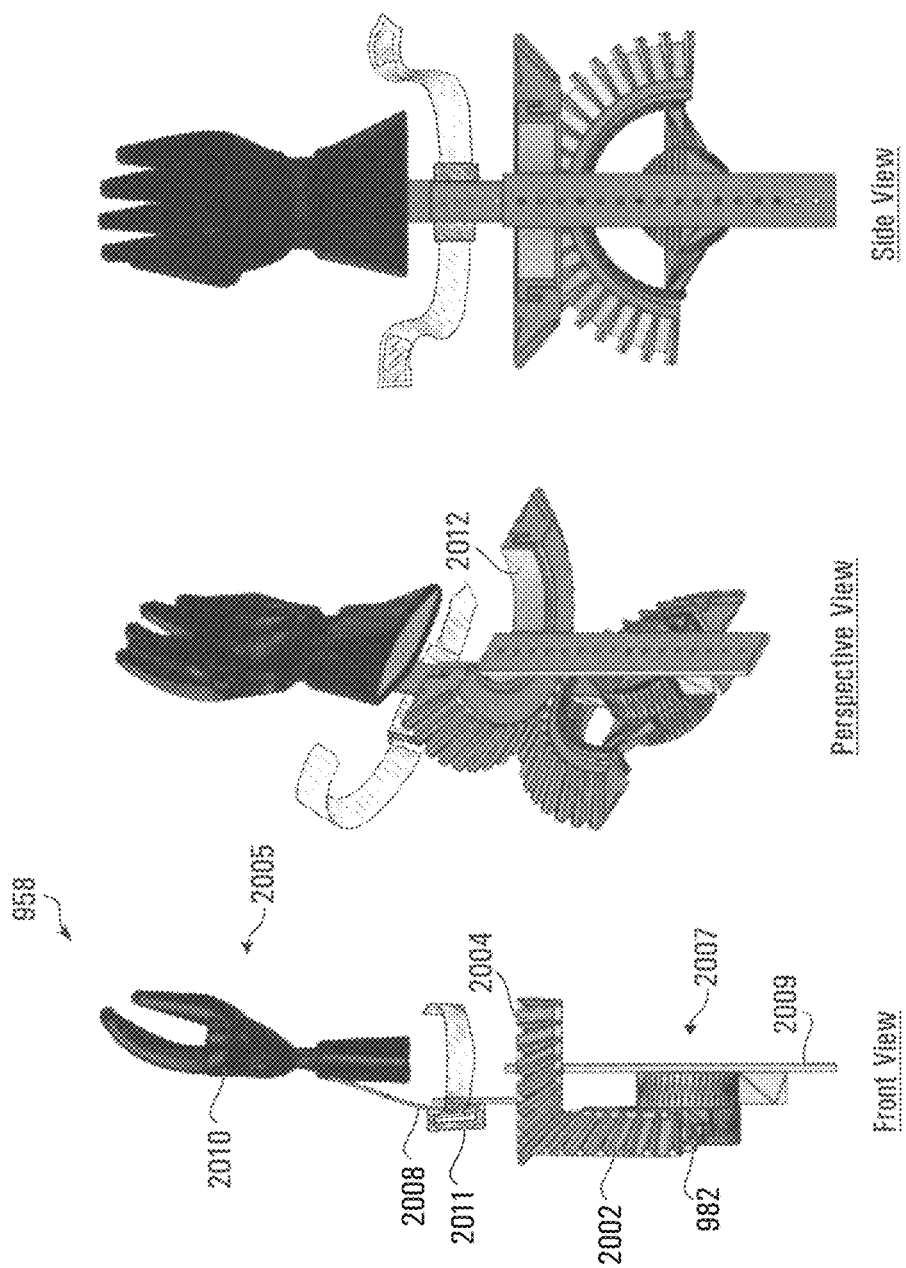
FIG. 40 is a front view, a perspective view, and a side view of a lower arm rotation capture device of the operator interface shown in FIGS. 16 and 36 in accordance with one embodiment.

Referring to FIG. 40, an embodiment of the lower arm rotation capture device 958 as shown in FIGS. 16 and 36 is shown in further detail. The lower arm rotation capture device 958 includes a first rotator 2005 including a lower bevel gear 2004 connected to an affixation member 2008, a forearm mount or strap 2011 and a glove 2010. When the glove 2010 is worn by the operator, rotation of the hand of the operator causes the lower bevel gear 2004 to rotate and slide around a sliding arm band 2012 which is fixed to a mount 2009, and thus the first rotator 2005 translates upper arm rotation into rotation of the lower bevel gear.

Referring still to FIG. 40, the lower arm rotation capture device includes a second rotator 2007 which includes an upper bevel gear 2002 and the potentiometer 982 acting as a sensor coupled between the upper bevel gear 2002 and the mount 2009. In one embodiment, the potentiometer 982 may be, for example, a 39/20 mm Center Space Rotary Potentiometer. The mount 2009 is rotatably connected to the upper bevel gear 2002 and held relative to the upper arm of the operator such that the mount 2009 does not rotate with rotation of the lower bevel gear 2004.

Generally the lower arm rotation capture device 958 may function in a way similar to that described above having regard to the upper arm rotation capture device 910.

The lower bevel gear 2004 and the upper bevel gear 2002 may coordinate to transduce rotation of the glove 90 degrees to rotation of the upper bevel gear 2002. The rotation of the upper bevel gear 2002 may then be captured by the potentiometer 982.

Referring still to FIG. 40, bevel gear sizes may be chosen to fit around the average human arm. In some embodiments, the transduction of the rotation of the operator arm 90 degrees may reduce a footprint of the rotation capture device on the operator interface. The number of teeth on the upper and lower bevel gears 2002, 2004 may be chosen to ensure two teeth are always in contact. The number of teeth on the upper and lower bevel gears 2002, 2004 may be determined from a function of the individual tooth and tooth clearance as well as the diameter of the gears. For example, the number of teeth may be chosen has a value proportional to pi times the radius of the gear and inversely proportional to the sum of the width of the teeth and the tooth clearance width For example, the number of teeth may be determined using the following equation: Number of Teeth=pi*r/(tooth_width+tooth_clearance_width).

Referring still to FIG. 40, the affixation strap 2008 may be firmly attached to the haptic glove 2010.

Rotation Capture Devices

Figure 41:
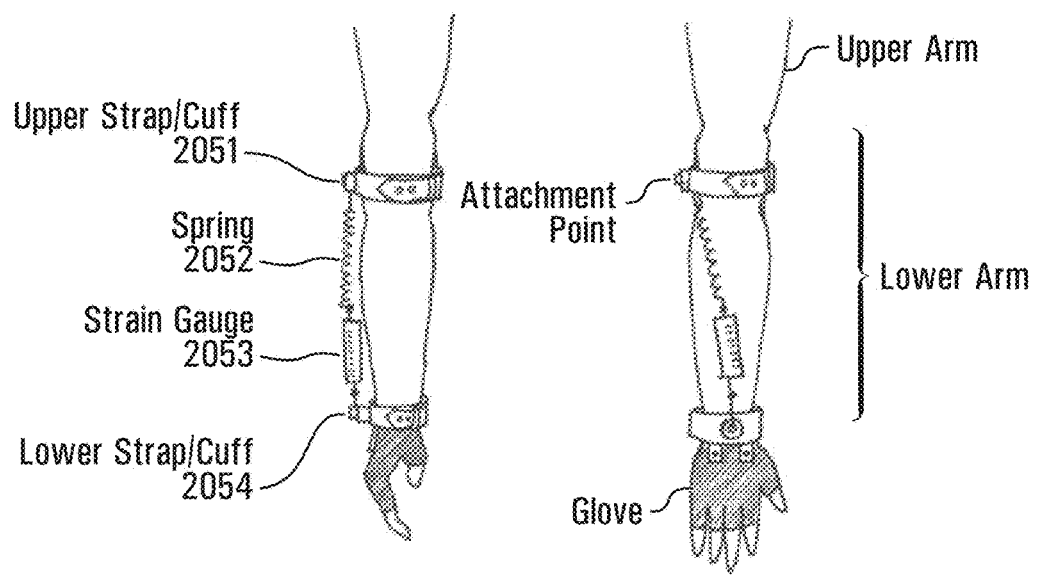
FIG. 41 is two front views of a lower arm spring based rotation capture device shown in two positions in accordance with one embodiment.

Referring to FIG. 41, a lower arm spring based rotation capture device 2050 in accordance with one embodiment is shown. The device 2050 includes an upper mount 2051, configured to be disposed below an elbow of the operator when the device is worn. The device 2050 also includes a spring 2052 attached to the upper mount 2051, and a strain gauge 2053 attached to the spring 2052 at one end and attached to a lower mount 2054 at the other end. The lower mount 2054 is configured to be worn around a wrist of the operator. In operation, as a lower arm of the operator is rotated, tension in the spring 2052 increases, which in turn increases strain measured by the strain gauge 2053. The strain measured by the strain gauge 2053 may represent a rotation position of the lower arm of the operator.

Figure 42:
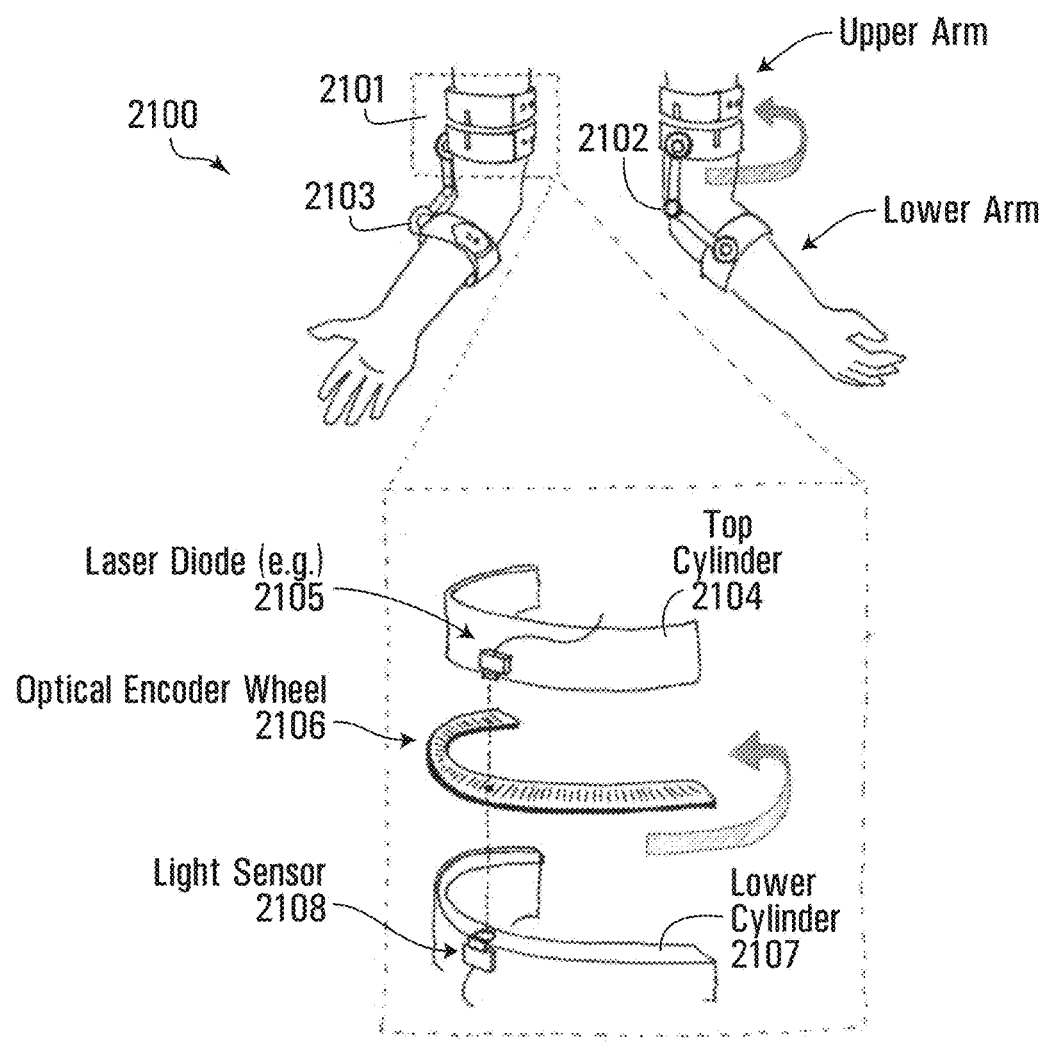
FIG. 42 is two front views of a lower arm optical encoder based rotation capture device shown in two positions in accordance with one embodiment.

Referring to FIG. 42, a lower arm optical encoder based rotation capture device 2100 in accordance with one embodiment is shown. The device 2100 includes an upper mount 2101, configured to be disposed above an elbow of the operator when the device is worn. The device 2100 also includes a hinged L bracket 2102 attached to the upper mount at one end and attached to a lower mount 2103 at the other end. The lower mount 2103 is configured to be worn around a forearm of the operator. The upper mount includes a top cylinder 2104, a laser diode 2105 which is attached to the top cylinder 2104, an optical encoder wheel 2106, a lower cylinder 2107 and a light sensor 2108. In operation, as a lower arm of the operator is rotated, light emitted by the laser diode is interrupted by patterns of holes in the optical encoder wheel 2106. The light sensor 2108 senses these interruptions. The signal emitted by the light sensor 2108, may be used to determine a rotation position of the lower arm of the operator.

Figure 43:
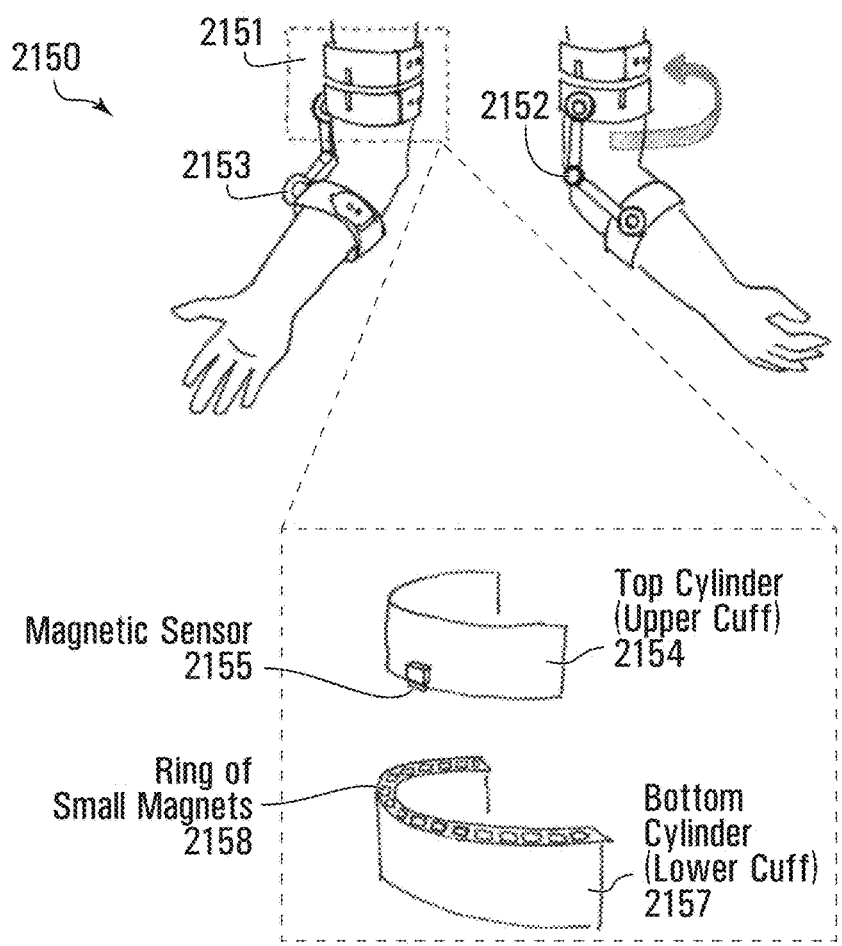
FIG. 43 is two front views of a lower arm magnetic encoder based rotation capture device shown in two positions in accordance with one embodiment.

Referring to FIG. 43, a lower arm magnetic encoder based rotation capture device 2150 in accordance with one embodiment is shown. The device 2150 includes an upper mount 2151, configured to be disposed above an elbow of the operator when the device is worn. The device 2150 also includes a hinged L bracket 2152 attached to the upper mount at one end and attached to a lower mount 2153 at the other end. The lower mount 2153 is configured to be worn around a forearm of the operator. The upper mount includes a top cylinder 2154, a magnetic sensor 2155, a ring of small magnets 2158, and a bottom cylinder 2157. The magnetic sensor 2155 is attached to the top cylinder 2154. The ring of small magnets 2158 is embedded in the top surface of the bottom cylinder 2157. In operation, as a lower arm of the operator is rotated, the ring of small magnets 2158 moves past the magnetic sensor 2155, causing the signal it emits to modulate in response to the changing amplitude of the magnetic field it senses. The signal emitted by the magnetic sensor 2155, may be used to determine a rotation position of the lower arm of the operator.

Figure 44:
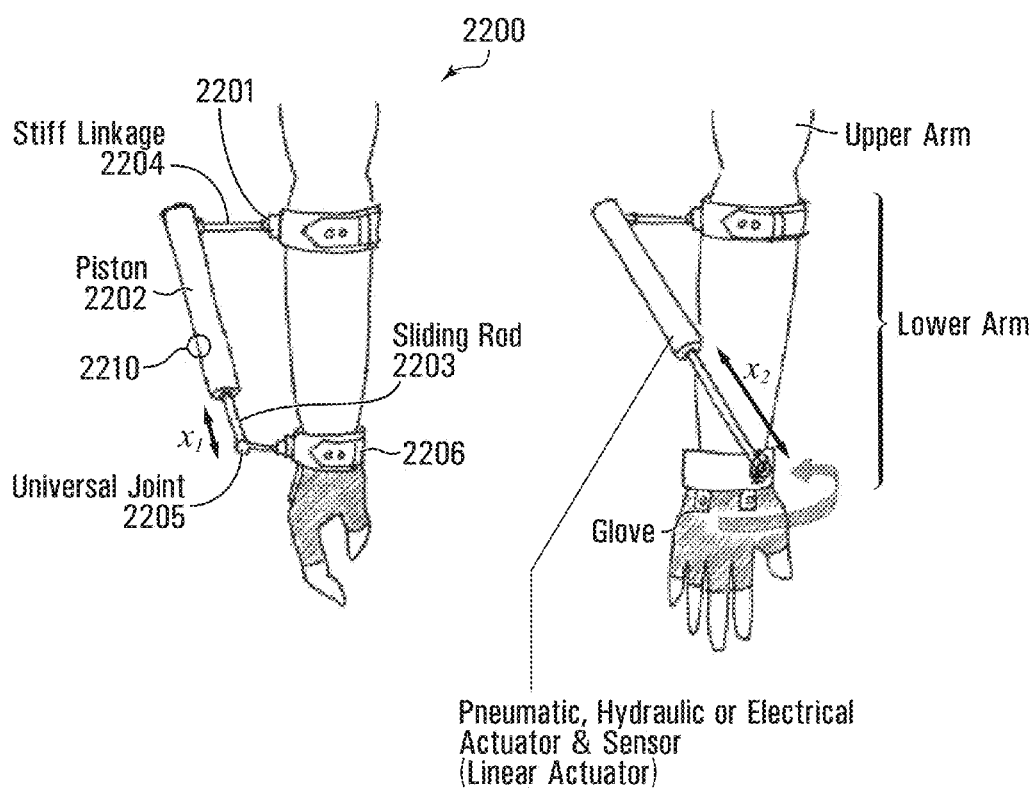
FIG. 44 is two front views of a hydraulic-based rotation capture device shown in two positions in accordance with one embodiment.

Referring to FIG. 44, a hydraulic based rotation capture device 2200 in accordance with one embodiment is shown. The device 2200 includes an upper mount 2201, configured to be disposed below an elbow of the operator when the device is worn. The device 2200 also includes a piston 2202 containing a sliding rod 2203 and a pressure sensor 2210 for sensing pressure in the piston 2202, and includes a stiff linkage 2204, a universal joint 2205 and a lower mount 2206. The piston 2202 is attached to the upper mount 2201 via the stiff linkage 2204. The sliding rod 2203 contained by the piston 2202 is attached to the lower mount 2201 via the universal joint 2205. The lower mount 2206 is configured to be worn around a wrist of the operator. In operation, as a lower arm of the operator is rotated, the sliding rod in the pneumatic piston translates diagonally and thus changes pressure in the piston 2202. The pressure sensor 2210 senses the change in pressure and the change in pressure can be used to determine a rotation position of the lower arm of the operator.

Glove

Figure 45:
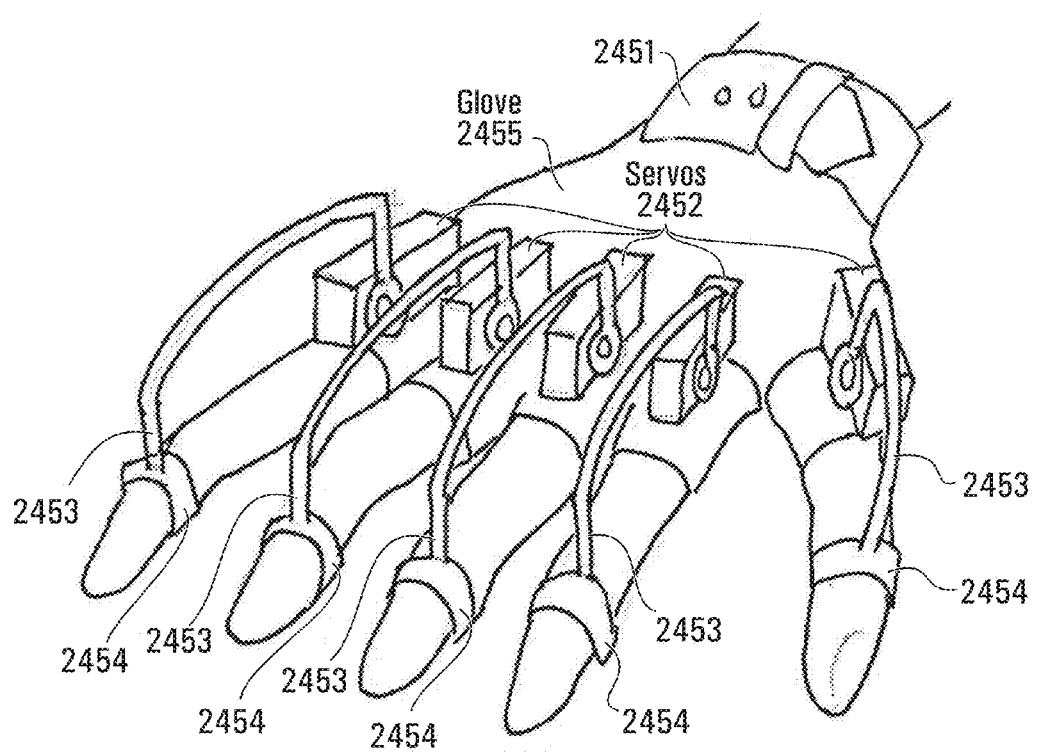
FIG. 45 is a perspective view of a servo based interface glove device in accordance with one embodiment.

Referring to FIG. 45, a servo based interface glove device 2450 in accordance with one embodiment is shown. The device 2450 includes a wrist mount 2451, configured to be disposed at a wrist of the operator when the device is worn. The device 2450 also includes a glove 2455, a plurality of servos 2452, a plurality of rigid armatures 2453, and a plurality of finger mounts 2454. The wrist mount 2451 is attached to the glove 2455 which has connected on its upper surface servos 2452 disposed above the knuckles of an operator. Each servo is connected to a respective one of the rigid armatures 2453, and each armature is connected to a respective one of the finger mounts 2454. The finger mounts 2454 are connected to finger tips of the operator using rings to fit around the fingertip, or using an adhesive directly to the interface glove fabric. In operation, as fingers of the operator are manipulated, the finger mounts 2454 and therefore the rigid armatures 2453 to which they are attached rotate. This rotation is captured by the servos 2452. In addition the servos may exert a force on an operator's fingers, providing a force feedback/haptic mechanism in addition to the rotation sensing mechanism.

Figure 46:
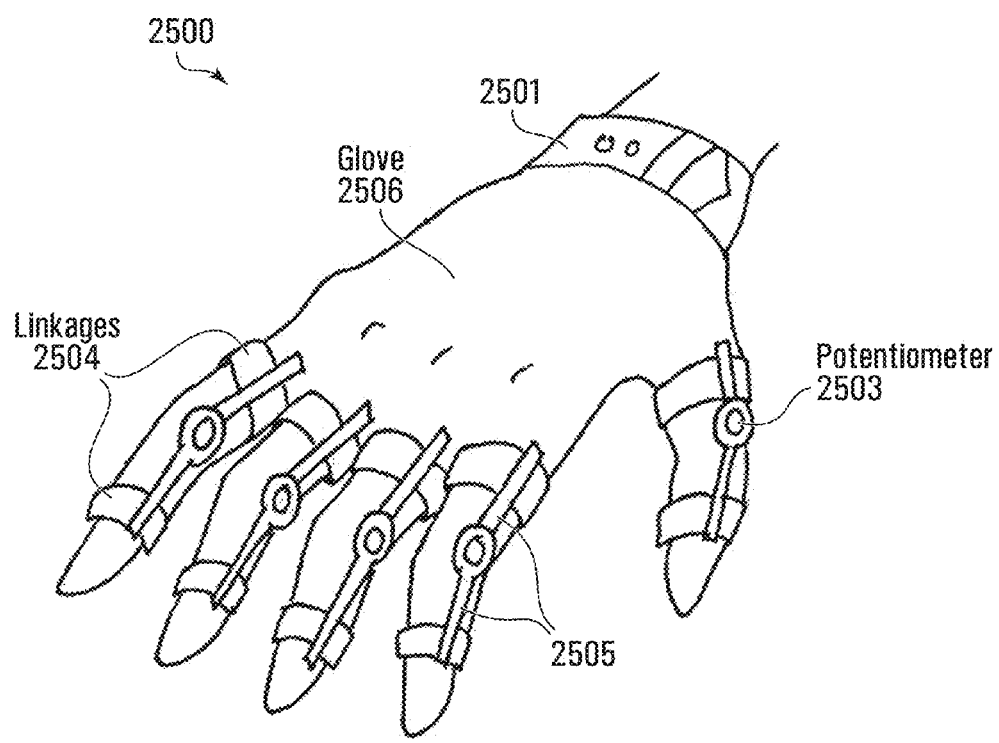
FIG. 46 is a perspective view of a potentiometer based interface glove device in accordance with one embodiment.

Referring to FIG. 46, a potentiometer based interface glove device 2500 in accordance with one embodiment is shown. The device 2500 includes a wrist mount 2501, configured to be disposed at a wrist of the operator when the device is worn. The device 2500 also includes a glove 2506, a plurality of potentiometers (one of which is labeled 2503), a plurality of linkages (two of which are labeled 2505), and a plurality of finger mounts (two of which are labeled 2504). The wrist mount 2501 is attached to the glove 2506. Two finger mounts 2504 are worn on each finger of an operator. The finger mounts 2504, are joined together by two linkages 2505, which meet at a rotating, hinged potentiometer 2503. In operation, as a finger of an operator is manipulated, linkages 2505 bend about the rotational axis of the potentiometer 2503. This rotation is captured by the potentiometer 2503 as a change in resistance, from which the angle of movement of an operator's fingers may be calculated.

Parachute Style Harness

Figure 47:
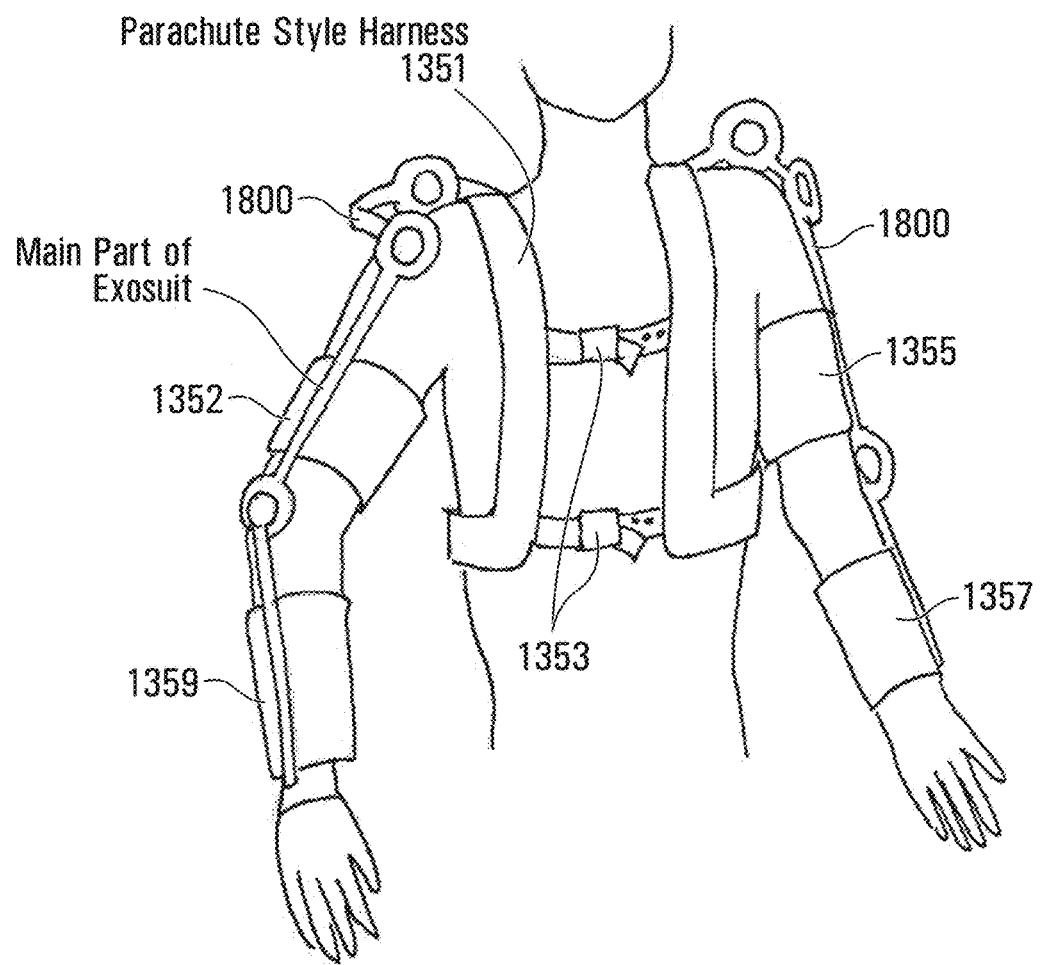
FIG. 47 is a perspective view of an exo-suit device with parachute style harness in accordance with one embodiment.

Referring to FIG. 47, an exo-suit device 1350 with parachute style harness, in accordance with one embodiment is shown. The device 1350 includes a plurality of arm bands 1352, 1359, 1355, and 1357, a parachute style harness 1351, one or more torso straps 1353 and one or more exo-suit arms with servos 1800. The parachute style harness may be worn around the torso of an operator and fastened to an operator's body by tightening the torso straps 1353. The one or more exo-suit arms with servos 1800 may be attached to arms of an operator by way of the arm bands 1352 1359, 1355, and 1357 to which the exo-suit arms with servos 1800 are connected. The arms are also connected to the parachute style harness 1351. In operation, as an arm of an operator is manipulated, its movement is captured by the exo-suit arms with servos 1800, which pivot about the operator relative to the parachute style harness 1351 to which they are attached. In some embodiments, the parachute style harness 1351 may provide a stable attachment of the exo-suit arms 1800 to the operator with less torso coverage or hard plastic parts which may result in a cooler, more comfortable experience for the operator.

Hinge for Torso Pitch

Figure 48:
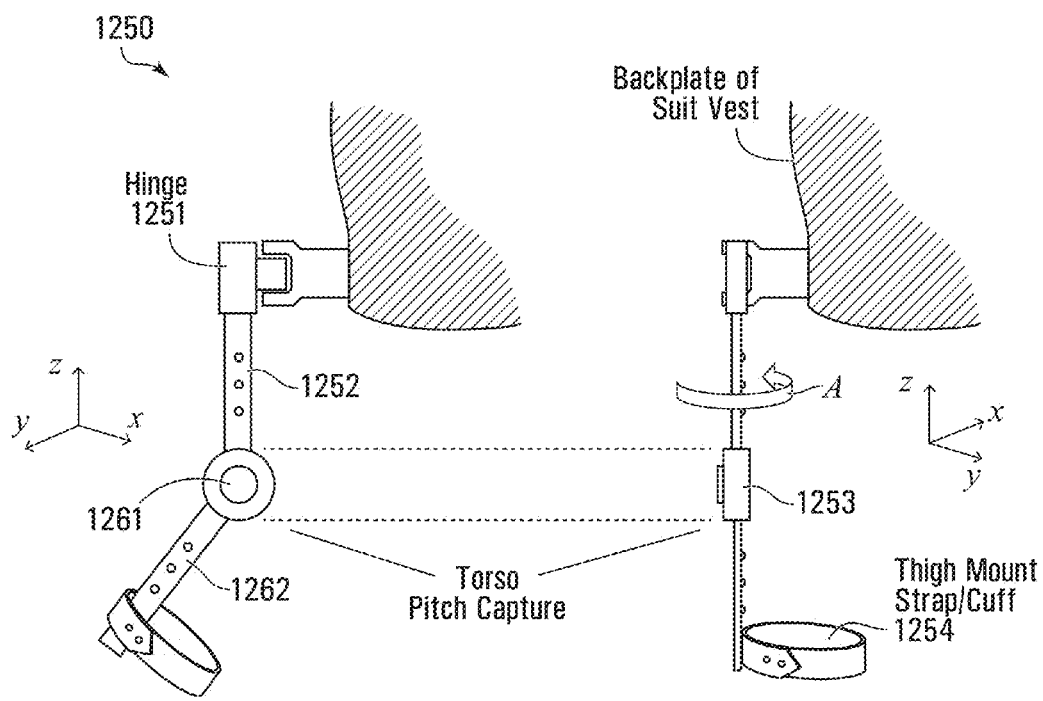
FIG. 48 is two front views of an exo-suit torso pitch hinge device in two positions in accordance with one embodiment.

Referring to FIG. 48, an exo-suit torso pitch hinge device 1250, in accordance with one embodiment is shown. The device 1250, includes first and second rotating hinges 1251 and 1261, support brackets 1252 and 1262, a servo 1253, and a thigh mount 1254. The first hinge 1251 is configured to pivot at an angle perpendicular to the back plate of the exo-suit device 1350 shown in FIG. 47 to which it is attached in the direction shown by the arrow A. Allowing the rotation of the torso pitch hinge device 1250 around A provides more freedom of movement to the operator. The first hinge 1251 is connected to the support bracket 1252, which is connected to the second hinge 1261, on which the servo 1253 is mounted. This second hinge 1261 is connected to another support bracket 1262, which in turn is connected to the thigh mount 1254. The thigh mount 1254 is configured to mount to a leg of an operator between a hip and a knee of the operator. In operation, as an operator bends forward, the second hinge 1261 rotates, turning the servo 1253. The rotation measured by the servo 1253 can be used to calculate the angle made between the legs and torso of the operator.

Servo-Based Shoulder Level Arm Rotation Capture Device

Figure 49:
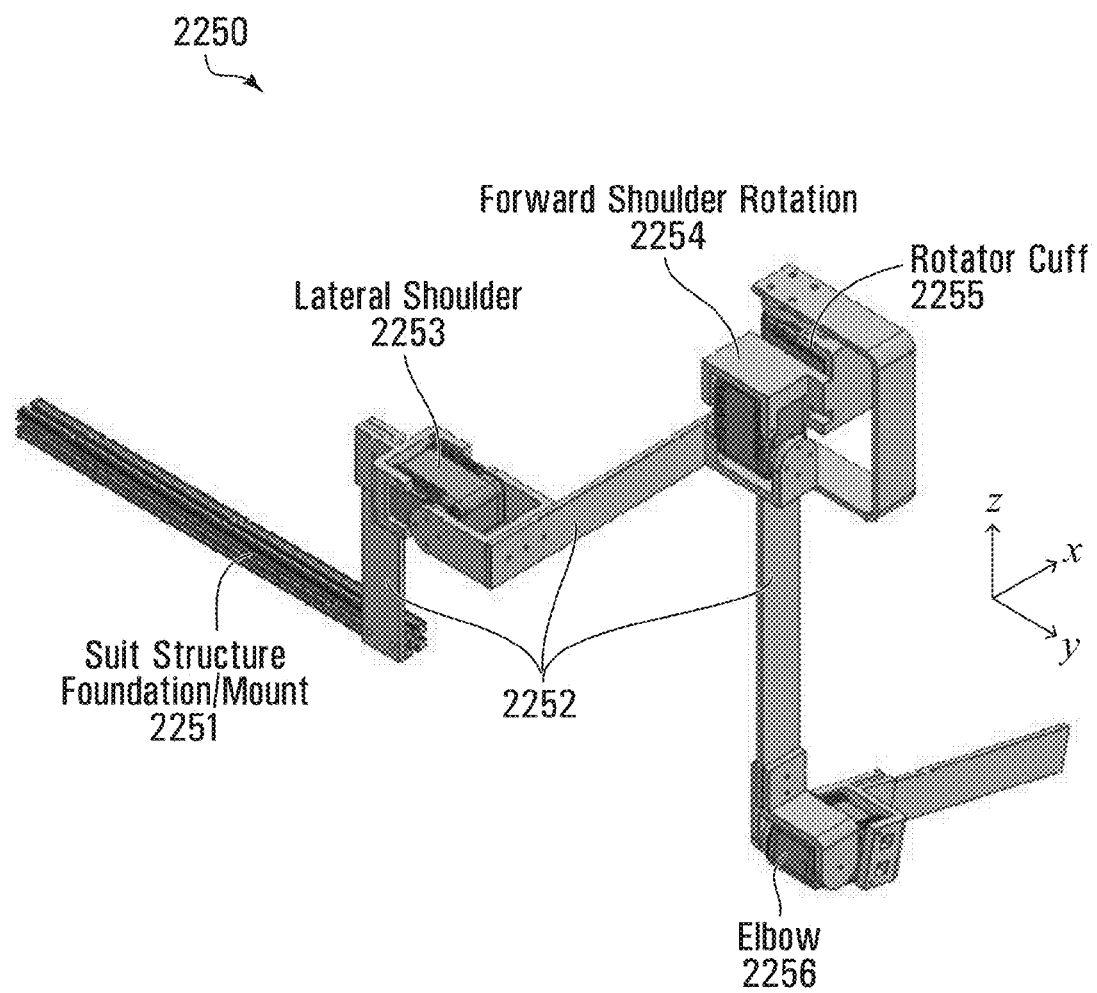
FIG. 49 is a perspective view of a servo-based shoulder level rotation device in accordance with one embodiment.

Referring to FIG. 49, a servo based shoulder level rotation capture device 2250 in accordance with one embodiment is shown. The device 2250 includes a foundation mount 2251, support brackets 2252, a lateral shoulder rotation servo 2253, a forward shoulder rotation servo 2254, a rotator cuff servo 2255, and an elbow servo 2256. The device 2250 is configured to be disposed along and connected to an arm of an operator. In various embodiments, the foundation mount 2251 may be configured to connect to the exo-suit device 1350 and run between the shoulders along the upper back of the operator shown in FIG. 47. The support brackets are connected to respective servo motors (2253, 2254, 2255, and 2256) that capture rotation of an arm of an operator. In operation, an arm of the operator moves freely, and the movement of the arm is captured by the rotation of the servos. In the orientation shown in FIG. 49, as an arm of the operator rotates about the x axis, the motion may be captured by the lateral shoulder rotation servo 2253, as the upper arm of an operator rotates about the y axis, the rotation may be captured by the forward shoulder rotation servo 2254, and as an arm of the operator rotates in about the z axis, the rotation may be captured by the rotator cuff servo 2255. In the orientation shown in FIG. 49, as a lower arm of the operator rotates about the y axis, the rotation may be captured by the elbow servo 2256.

Five Digit Operator Controllable Device Hand

Figure 70:
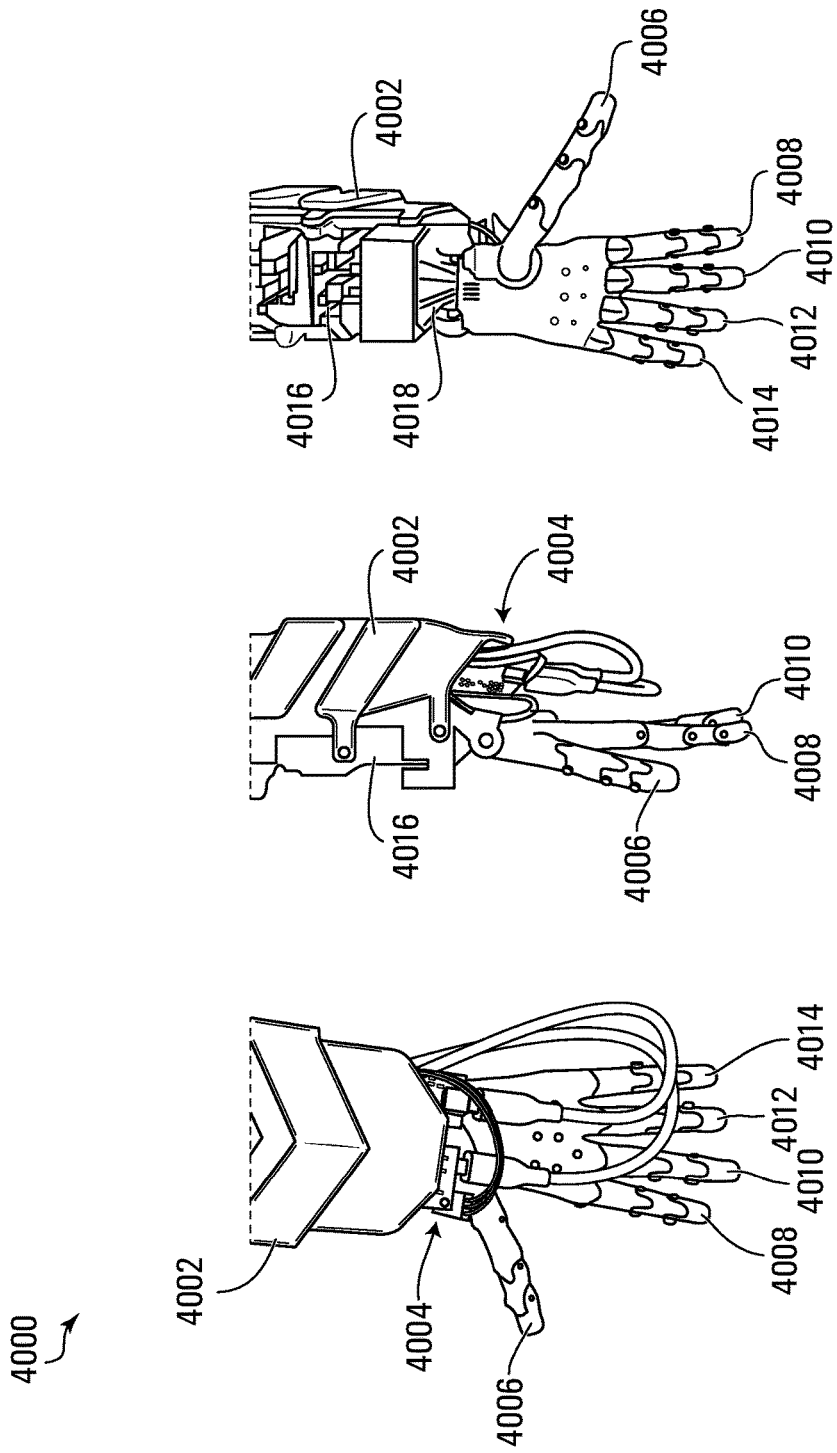
FIG. 70 is a front view, a side view, and a back view of an end manipulator in accordance with one embodiment.

Referring to FIG. 70, a front, side and back view of a left five-fingered operator controllable device end manipulator or hand in accordance with one embodiment is shown at 4000. In some embodiments, the end manipulator 4000 may be used generally as described above regarding the haptic hand 811 of the operator controllable device 800 shown in FIG. 13. The end manipulator 4000 includes a hand control board cover 4002, a hand control board 4004, a left first finger 4006, a left second finger 4008, a left third finger 4010, a left fourth finger 4012, a left fifth finger 4014, a servo bank 4016 and five servo-finger actuation attachments 4018. An embodiment of the operator controllable device 800 may have the end manipulator 4000 and may also have a right five-fingered operator controllable device hand generally similar and symmetrical to the left five-finger operator controllable device end manipulator 4000. In various embodiments, the servo control board 4004 may receive device control instructions from the operator interface 900 shown in FIG. 16, and may translate the device control instructions into actuation signals for the servo bank 4016. The servo bank 4016 may be a set of five Tower Pro SG92R hobby servos. In operation, as the servo bank 4016 is actuated, the five servo finger actuation attachments are either loosened or tensioned resulting in a relaxation of contraction of the five fingers 4006, 4008, 4010, 4012, and 4014.

Omni Wheel Operator Controllable Device Base

Figure 71:
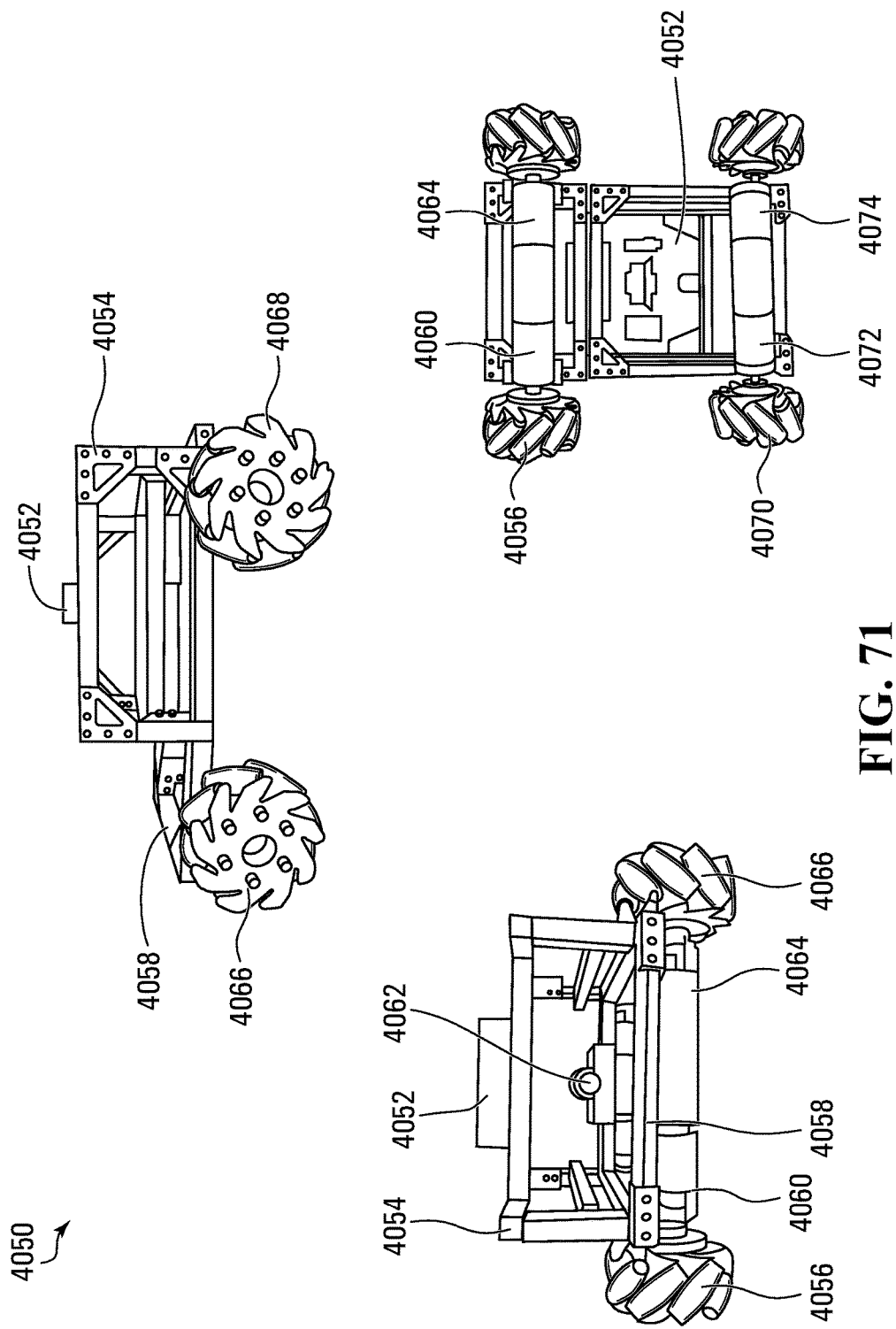
FIG. 71 is a front view, a side view and a bottom view of an operator controllable device base in accordance with one embodiment.

Referring to FIG. 71, a front, side and bottom view of an omni wheel operator controllable device base in accordance with one embodiment is shown at 4050. In some embodiments, the base 4050 may be used generally as described above regarding the motility treads 812 and 850, DC motors 818 and strut supports 814, which act as a base of the operator controllable device 800 shown in FIG. 13. The base 4050 includes a rear base frame 4054, a left front omni wheel 4056, a front base frame 4058, a left front motor 4060, a front base frame to rear base frame joint 4062, a right front motor 4064, a right front omni wheel 4066, a left back wheel 4068 and a back right wheel 4070. In various embodiments an operator controllable device 4052 similar to the operator controllable device 800 shown in FIG. 13 but without the base shown in FIG. 13 may be affixed to the rear base frame 4054. In various embodiments, the front base frame to rear base frame joint 4062 may allow for roll of the front omni wheels 4056, 4066 relative to the back omni wheels 4068, 4070 which may allow for a greater ability of the omni wheel operator controllable device base to move across uneven surfaces. In various embodiments, the front and rear base frames 4058, 4054 may be constructed of a strong and light material, such as, in some embodiments, aluminum. In various embodiments, the motors 4060, 4064, 4072, and 4074 may be a Phidgets 3263 12V gear motor from Phidgets Inc. of Calgary, AB, CA.

Figure 72:
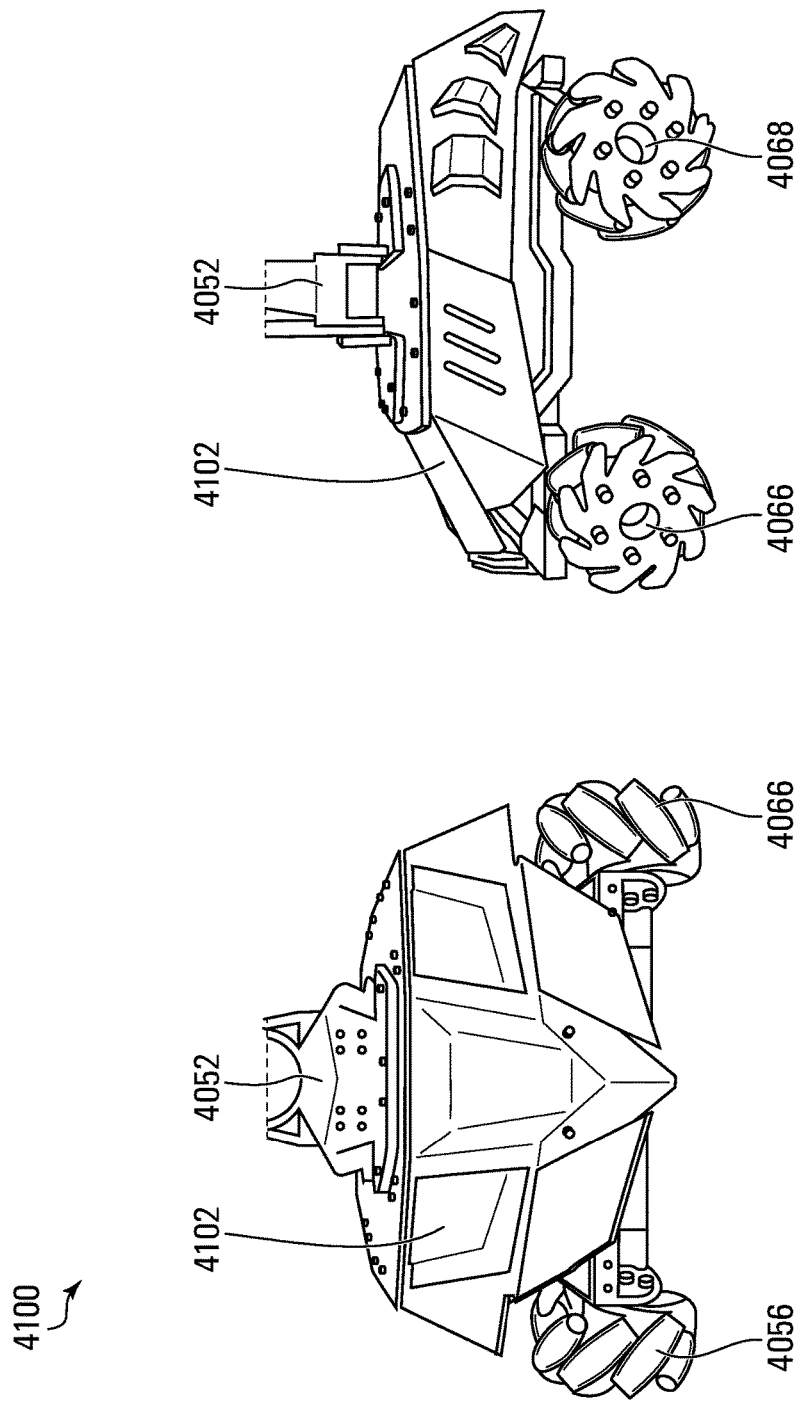
FIG. 72 is a front view and a side view of an operator controllable device base having a cover in accordance with one embodiment.

Referring now to FIG. 72, a front and side view of an omni wheel operator controllable device base with a cover in accordance with one embodiment is shown at 4100. The base 4100 may be generally similar to the base 4050 shown in FIG. 71 but including a base cover 4102. In various embodiments, the base cover may act to prevent objects from entering front and rear base frames similar to the front and rear base frames 4058, 4054 shown in FIG. 71 and to provide aesthetics to the base 4100.

Operator Controllable Device

Figure 50:
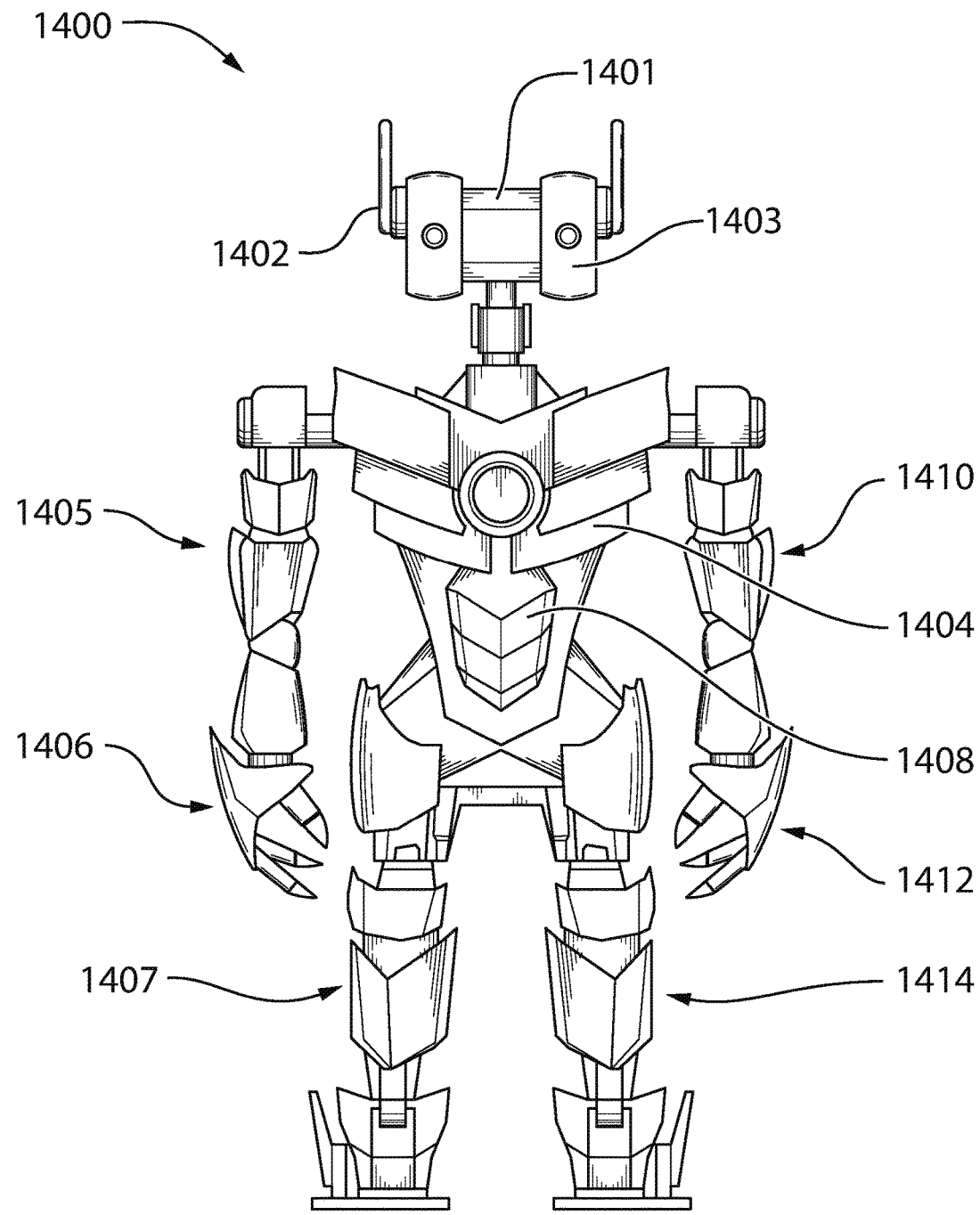
FIG. 50 is a front view of an operator controllable device in accordance with one embodiment.

Referring to FIG. 50, an operator controllable device 1400, in accordance with one embodiment is shown. In this embodiment, the device includes a head 1401, audio sensors 1402, video sensors 1403, a torso 1404, arms 1405 and 1410, hands 1406 and 1412, legs 1407 and 1414, and an onboard computer 1408. In one embodiment the device 1400 may be approximately 1.2 m tall. The device 1400 may include a plurality of sensors, for example, infrared and ultraviolet image sensors, ultrasonic sound sensors, touch sensors, strain sensors, chemical detectors, radiation detectors and inertial sensors. The device 1400 may have a synthetic skin covering every external part of its body that may have pressure and temperature sensors embedded in it over a grid of varying resolution. In some embodiments, the skin may allow the device 1400 to detect self-collision, for example, if the inside of its arm were to bump against its head. The head 1401 may be able to rotate with three degrees of freedom, namely pitch, yaw and roll. The head 1401 may also contain actuators or displays that may allow the head 1401 to manipulate facial features such as lips, eyes, and eyebrows in order to convey emotion. The device 1400 may also contain lights located on its torso 1404, arms 1405 and 1410 or legs 1407 and 1414, for example, in order to convey emotions, for example by emitting light of different colours. The torso 1404 may rotate with three degrees of freedom, namely pitch, roll and yaw. The device may contain a plurality of appendages including the arms 1405 and 1410, legs 1407 and 1414 and, in some embodiments, other appendages based on biological or non-biological analogs. If the device 1400 includes the arms 1405, they may include more joints and degrees of freedom than are included in the arms of an analogous human operator. If the device 1400 includes the legs 1407 and 1414, the legs may have seven degrees of freedom each, namely, hip roll, hip pitch, hip yaw, knee bend, ankle roll, ankle pitch and ankle yaw. The legs 1407 and 1414 may also include a foot with an additional degree of freedom for foot bend, mimicking the action of toes. The legs 1407 and 1414 may also include a kinetic energy recovery system, such as, for example springs. In some embodiments, the device 1400 may include a variety of hands or environmental manipulators in a multitude of configurations. The hands 1406, in one embodiment, attached to the arms may be configured to have with fifteen degrees of freedom in total, with three degrees of freedom for each finger, namely the metacarpophalangeal joint bend, proximal inter-phalangeal joint bend and the distal inter-phalangeal joint bend. In operation, the onboard computer 1408 may be responsible for communications between the device's sensors and actuators and a remote autonomous agent or human operator, or combination thereof or one or many entities. The head 1401, torso 1404, arms 1405 and 1410, hands 1406 and 1412 and legs 1407 and 1414 may each include a three axis inertial measurement unit and a three axis gyroscope in order to gather proprioceptive information about the location, position and acceleration of each appendage of the device 1400. The onboard computer 1408 may connect to a network using a combination of network connectivity options including but not limited to Bluetooth, WiFi, 2G, 3G, and 4G GPRS or CDMA cellular connections. The onboard computer 1408 may also include a battery monitor and power management system.

Operators

Generally, in various embodiments an operator may include an entity that is capable of reacting to its environment or a representation of an environment for an operator controllable device. For example, an operator may include a biological entity, such as a human, or group of biological entities or a machine, such as a robotic system (either autonomous or operator controllable) or group of machines, or any combination thereof.

In various embodiments, an operator may include a non-human animal such as a monkey, and the operator interface may be generally similar to the operator interface shown in FIG. 16 but re-sized to account for the differences between a human operator and a monkey operator.

In some embodiments, an operator may include an industrial manufacturing robot (either autonomous or operator controllable), and the operator controllable device may include analogous but not necessarily identical sensor and actuation and/or output systems to that of the manufacturing robot. As described above, environment sensor information and device control instructions may be generated based on environment sensor information over multiple runs. Sets of associated environment sensor information and device control instructions may be received and in some embodiments semantic labels may be applied to frame records to identify sets of associated environment sensor information and device control instructions. Autonomous control information may then be derived from the sets of associated environment sensor information and device control instructions and the autonomous control information may be used to facilitate autonomous behaviour in an autonomous device that may mimic the actions of the industrial manufacturing robot.

In some embodiments, the use of a robot as an operator may allow many task re-trials without the operator becoming fatigued. Device control instructions and environment sensor information generated over these multiple runs may then be used to derive autonomous control information which may be used to facilitate autonomous behavior in an autonomous device. In some embodiments, most of the iterations of an operator controlling an operator controllable device using an operator interface required to reach a point where deriving autonomous device control may be completed by a robot operator. A human operator may then provide a subset of iterations as the operator using the operator interface to perform tasks using the operator controllable device.

System

Referring to FIG. 51, a system 991 includes the operator controllable device 800, the operator interface 900 and an analyzer 992 all in communication through the network 1080. The analyzer 992 may be configured to function generally similar to as described above regarding the analyzer 16, but receiving environment sensor information from the operator controllable device and receiving operator interface sensor information or device control instructions from the operator interface 900.

Figure 52:
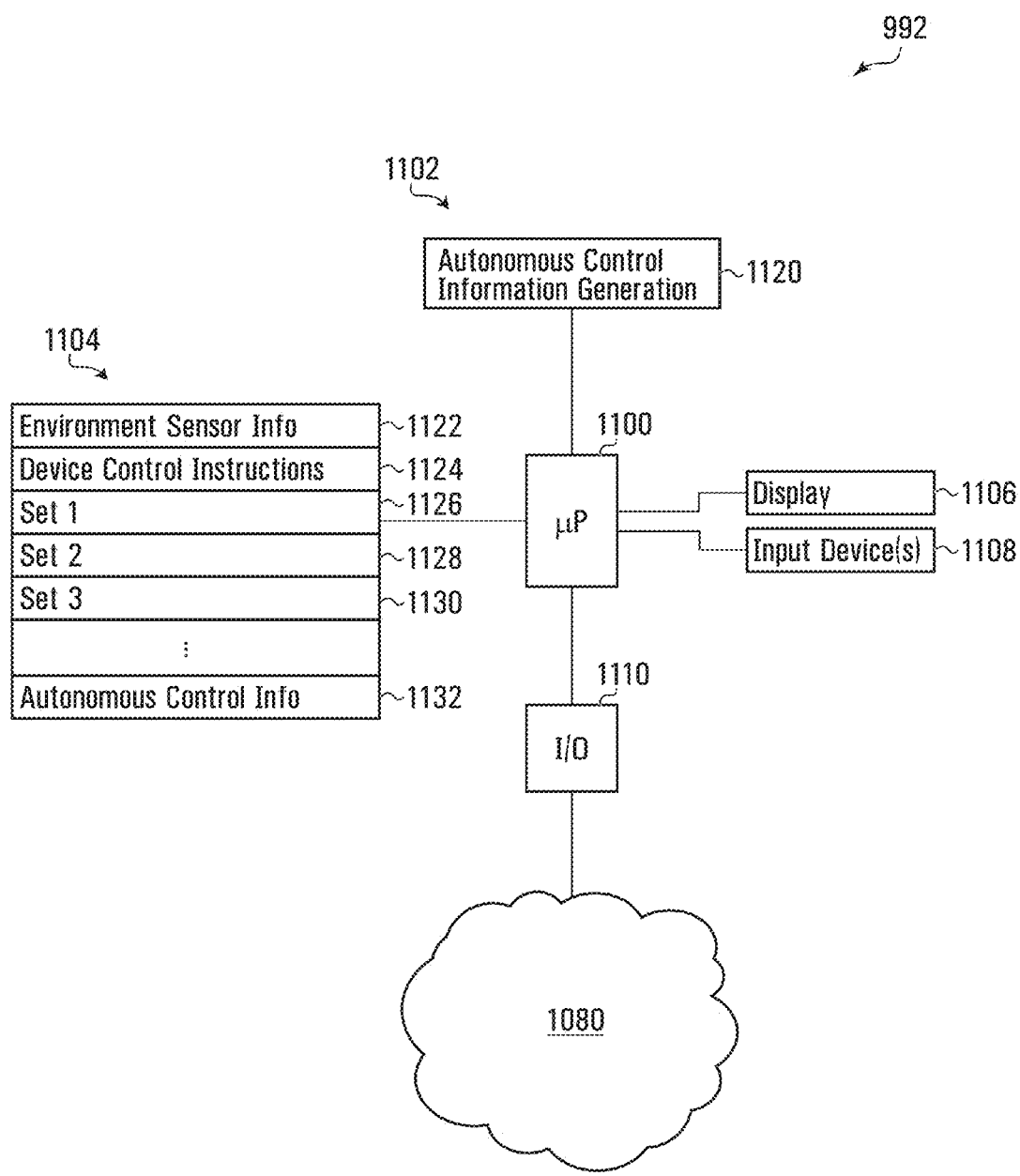
FIG. 52 is a schematic view of a processor circuit for implementing an analyzer of the system shown in FIG. 13.

Referring to FIG. 52, a schematic view of a processor circuit for implementing the analyzer 992 in accordance with one embodiment is shown. The analyzer 992 includes an analyzer processor 1100, a program memory 1102, a variable memory 1104, a display 1106, one or more input devices 1108, and an input/output ("I/O") interface 1110, all of which are in communication with the analyzer processor 1100

In some embodiments, a flowchart generally similar to the flowchart 550 shown in FIG. 10 may be encoded in the block of codes 1120 of the program memory 1102 shown in FIG. 52. A block generally similar to block 552 of the flowchart shown in FIG. 10 may direct the analyzer processor 1100 to receive device environment frame records, representing device environment information, from the operator controllable device 800 and/or to receive device control instructions from the operator interface 900 via the I/O interface 1110 and the network 1080. The block may direct the analyzer processor 1100 to store the information in the locations 1122 and 1124 of the variable memory 1104.

For example, the block of codes 1120 may direct the analyzer processor 1100 to store in the location 1122 information based on one or more of the left image field 2551 of one or more operator controllable device left video stream frame records, such as the frame record 2550 shown in FIG. 21, the right image field 2601 of one or more operator controllable device right video stream frame records, such as the frame record 2600 shown in FIG. 22, the left audio field 2651 and the right audio field 2652 of one or more operator controllable device audio stream frame records, such as the frame record 2650 shown in FIG. 23, the left wrist motor position field 2701, the right wrist motor position field 2702, the left elbow motor position field 2703, the right elbow motor position field 2704, the left shoulder pitch motor position field 2705, the right shoulder pitch motor position field 2706, the left shoulder roll motor position field 2707, the right shoulder roll motor position field 2708, the left shoulder yaw motor position field 2709, the right shoulder yaw motor position field 2710, the torso pitch motor position field 2711, the head yaw motor position field 2712, and the head pitch motor position field 2713 of one or more operator controllable device arm and torso stream frame records, such as the operator controllable device arm frame record 2700 shown in FIG. 24, the left first finger motor position field 2751, the right first finger motor position field 2752, the left second finger motor position field 2753, the right second finger motor position field 2754, the left third finger motor position field 2755, and the right third finger motor position field 2756 of one or more operator controllable device hand stream frame records, such as the operator controllable device hand stream frame record 2750 shown in FIG. 25, the right first finger haptic feedback signal field 2801, the right second finger haptic feedback signal field 2802, the right third finger haptic feedback signal field 2803, the left first finger haptic feedback signal field 2804, and left second finger haptic feedback signal field 2805, and the left third finger haptic feedback signal field 2806 of one or more operator controllable device pressure sensor stream frame records, such as the operator controllable device pressure sensor stream frame record 2800 shown in FIG. 26, and/or the left tread motor position field 3201 field and the right tread motor position field 3203 field of one or more operator controllable device tread stream frame records, such as the operator controllable device tread stream frame record 3200 shown in FIG. 69.

In some embodiments, the information stored in the locations 1122 and/or 1124 of the variable memory 1104 may act as a raw unprocessed data stream, which may be used to generate autonomous information in the form of a learning model or artificial intelligence model.

Figure 53:
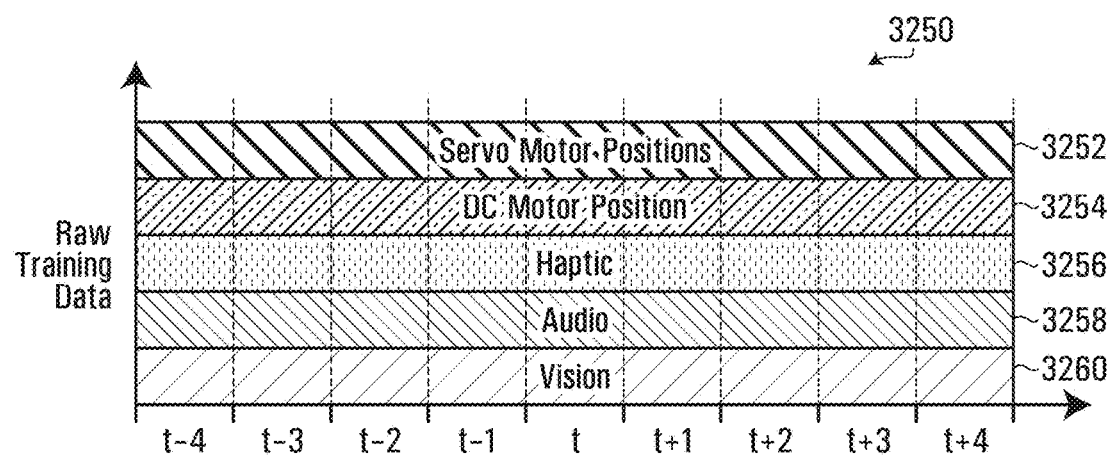
FIG. 53 is a schematic representation of a raw unprocessed data stream in accordance with one embodiment.

FIG. 53 shows a representation of a raw unprocessed data stream 3250 which may be stored in the location 1122 of the variable memory 1104, for example. The stream 3250 includes a vision modality 3252, an audio modality 3254, a haptic modality 3256, a DC motor modality 3258, and a servomotor modality 3260. In FIG. 53, the representations of modalities shown represent information which, for example, may be included in frame records, such as the fields described in the preceding paragraph of the frame records 2550, 2600, 2650, 2700, 2750, 2800, and 3200 of FIGS. 21, 22, 23, 24, 25, 26, and 69, for example. While five modalities are shown in this embodiment, those skilled in the art will recognize that fewer or more data modalities may be alternately used.

Each of the modalities 3252-3260 represents data at a plurality of times, the data being a function of time over a duration of time. For example, the modalities 3252-3260 may represent data over between approximately 1 second and 24 hours. For example, the modalities 3252-3260 may represent data over 1 hour. In some embodiments, the data over its entire duration may be segmented into sections of shorter duration. In some embodiments, these shorter duration segments may be referred to as frames. FIG. 53 shows a plurality of frames, each corresponding to a respective time. Each frame may include one or more frame records, for example, that are associated with a time within a time period associated with the frame.

In some embodiments, duration of a frame may be set to be approximately as long as the shortest meaningful events in the environment of the operator controllable device 800 shown in FIG. 13. In various embodiments, the duration of a frame may be between one millisecond and one second and the shortest meaningful event may be decided empirically based on the frequency of the environment events that the operator controllable device should capture. In some embodiments, the frame duration may be $\frac{1}{30}$ of a second, corresponding to 30 frames per second. In an exemplary embodiment, 1 hour of total data with frame duration 30 frames per second includes 108,000 frames of data.

Figure 54:
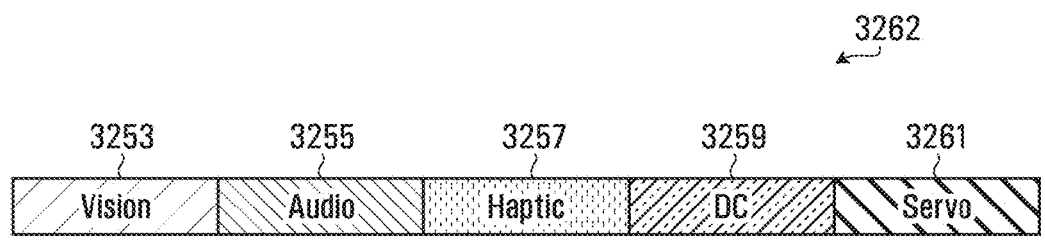
FIG. 54 is a schematic representation of a frame or raw unprocessed data in accordance with one embodiment.

Referring to FIG. 54 in various embodiments, the raw unprocessed data in each frame may be stored in the location 1122 and/or 1124 as a raw data frame vector comprising a concatenation of one or more frame records from some or all of the data modalities. Referring to FIG. 54, a representation of a frame vector associated with time t is shown at 3262. The frame vector includes vision information or data 3253, audio information or data 3255, haptic information or data 3257, DC motor information or data 3259, and servomotor information or data 3261 concatenated to create a one dimensional vector which may be indexed by a label, which may be a date-time stamp, representing which frame the data originated from. Those skilled in the art will note that the order in which the data modalities are concatenated may be chosen arbitrarily, and that other choices for representing the data in each frame, such as tensor products over the different modalities, may be preferred in certain embodiments.

In some embodiments, a pre-processing block encoded in the block of codes 1120 of the program memory 1102 shown in FIG. 52 may direct the analyzer processor 1100 to pre-process the raw data stored in the locations 1122 and/or 1124 and to store the pre-processed information as respective representations of sets of associated environment sensor information and/or device control instructions in the locations 1126, 1128, 1130 etc. of the variable memory 1104, for example.

Figure 55:
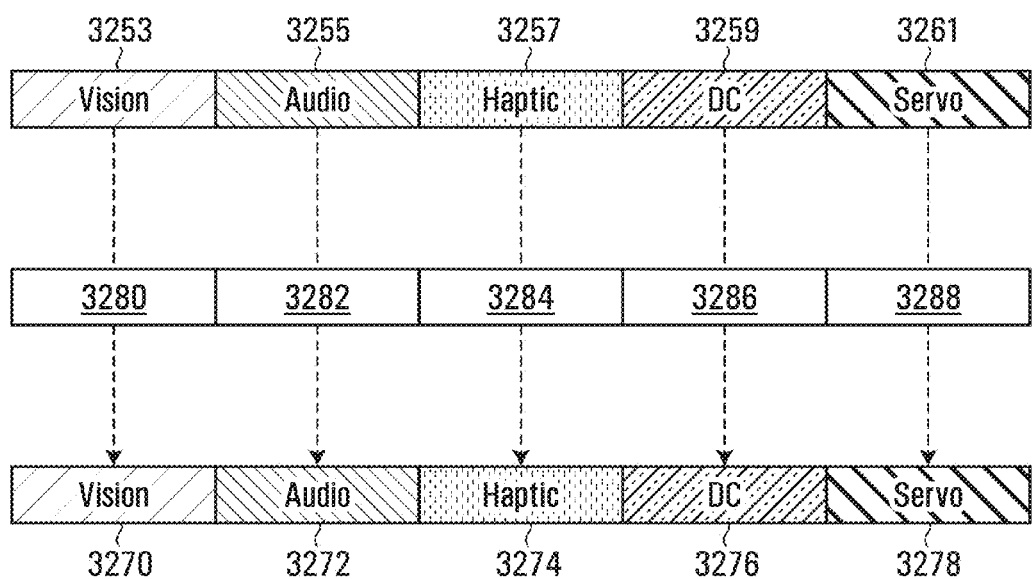
FIG. 55 is a schematic representation of raw unprocessed data being processed in accordance with one embodiment.

Referring to FIG. 55 the pre-processing block directs the analyzer processor 1100 to transform raw unprocessed vision data, 3253 using a transformation 3280 into preprocessed vision data 3270; to transform raw unprocessed audio data 3255 using a transformation 3282 into preprocessed audio data 3272; to transform raw unprocessed haptic data 3257 using a transformation 3284 into preprocessed haptic data 3274; to transform raw unprocessed DC motor data 3259 using a transformation 3286 into preprocessed DC motor data 3276; and to transform raw unprocessed servomotor data 3261 using a transformation 3288 into preprocessed servomotor data 3278.

In various embodiments, the transformations 3280-3288 from raw unprocessed to preprocessed data modalities 3270-3278, for some or all of the data modalities, may involve an identity transform, that is, no change between raw unprocessed and preprocessed data. In various embodiments, the transformations 3280-3288 from raw unprocessed to preprocessed data modalities 3270-3278 may include learning a representation of one or more of the data modalities using a representation learning system including, for example, deep hierarchical learning systems such as variational autoencoders, as described in Kingma D., Welling M. (2014). Auto-Encoding Variational Bayes (http://arxiv.org/pdf/1312.6114v10.pdf). Hereafter referred to as Kingma and Welling (2014). In various embodiments, the transformations 3280-3288 from raw unprocessed to preprocessed data modalities 3270-3278, for some or all of the data modalities, may include processing transforms designed or selected by humans. In various embodiments, the transformations 3280-3288 may extract features from raw unprocessed data or the preprocessed data. Further nonlinear and linear transformations may be applied to the output of previous transformations. See, description herein at least in relation to FIG. 74.

Figure 56:
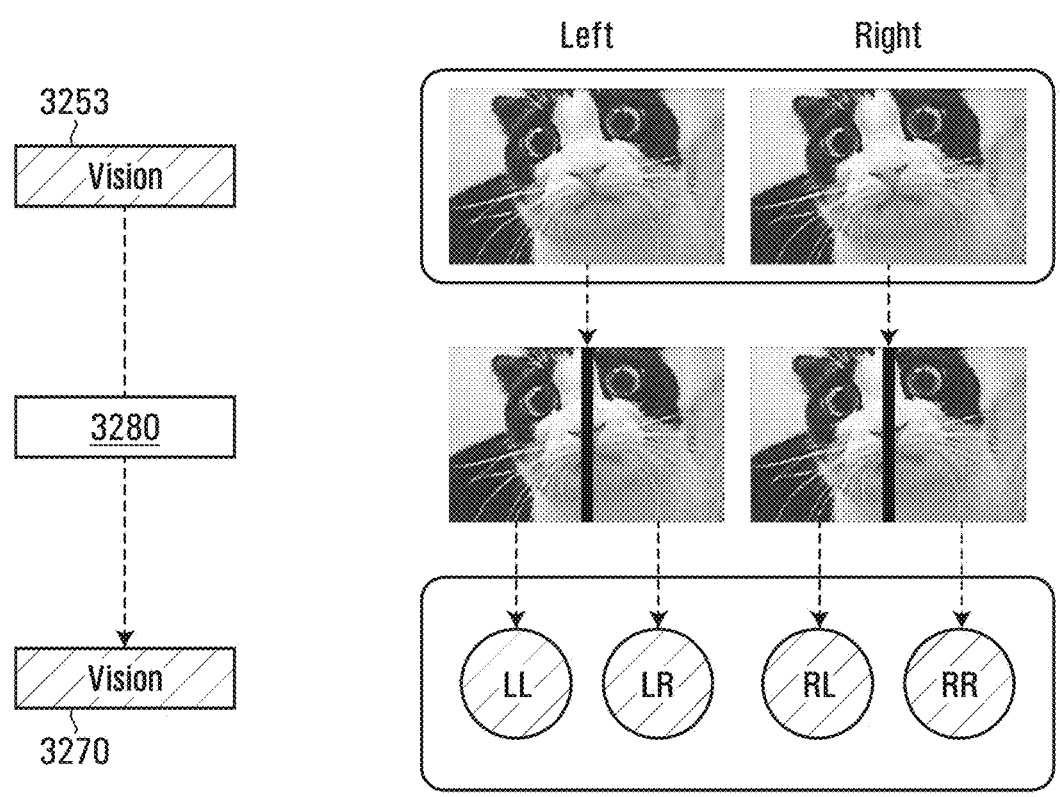
FIG. 56 is a schematic representation of vision data being processed in accordance with one embodiment.

Referring to FIG. 56, in an embodiment, the transformation 3280 for vision data transforms the frame of video data 3253, representing the raw unprocessed vision data captured by the cameras 836, 837 on the operator controllable device 800, into four real numbers, which act as the preprocessed vision data 3270, representing the mean values of the pixel values of the images representing respectively the left half of the left image; the right half of the left image; the left half of the right image; and the right half of the right image; where each of these means is normalized to lie in the range −1 to +1. Those skilled in the art will recognize that the normalization and choice of range may differ in various embodiments, for example the normalization may be chosen to be in the range 0 to +1, and that in certain embodiments the values of the preprocessed data may be normalized by dividing by the standard deviation of the data values.

Figure 57:
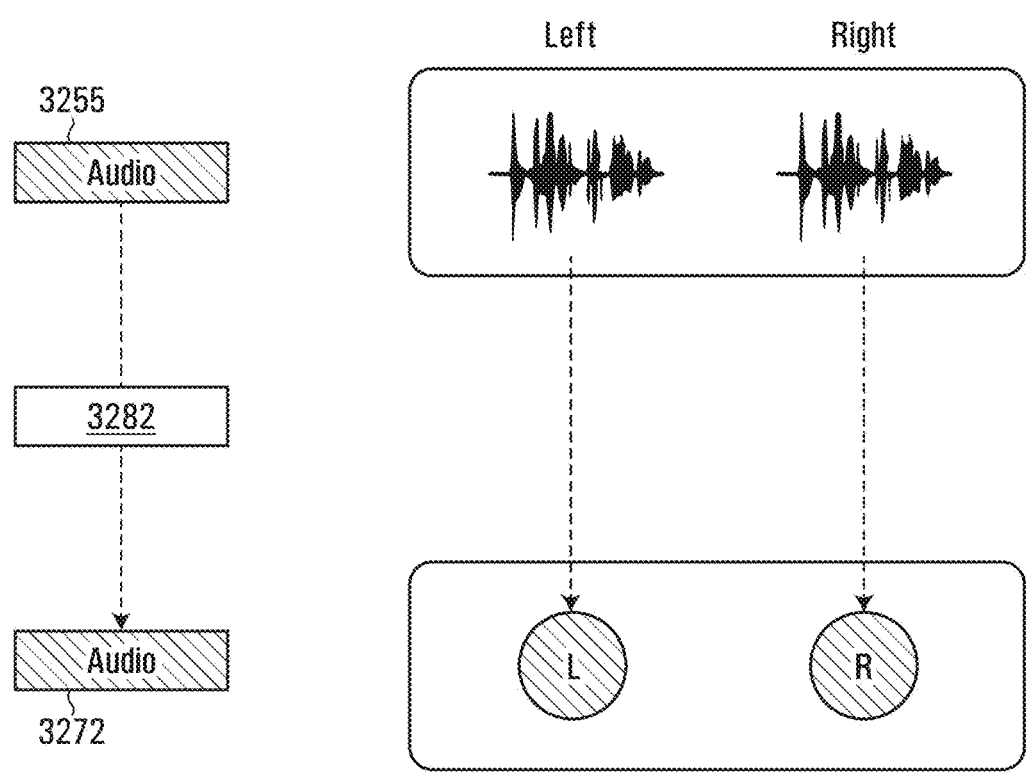
FIG. 57 is a schematic representation of audio data being processed in accordance with one embodiment.

Referring to FIG. 57, in an embodiment, the transformation 3282 for the audio data 3255 transforms audio information captured by the microphones 838, 839 on the operator controllable device 800, representing the raw unprocessed audio data over the duration of a frame, into two real numbers, which act as the preprocessed audio data 3272, representing the mean values of the absolute values of the audio signals representing respectively the audio recorded from the left and right microphones; where each of these means is normalized to lie in the range −1 to +1. Those skilled in the art will recognize that the normalization and choice of range may differ in various embodiments, for example the normalization may be chosen to be in the range 0 to +1, and that in certain embodiments the values of the preprocessed data may be normalized by dividing by the standard deviation of the data values.

Figure 58:
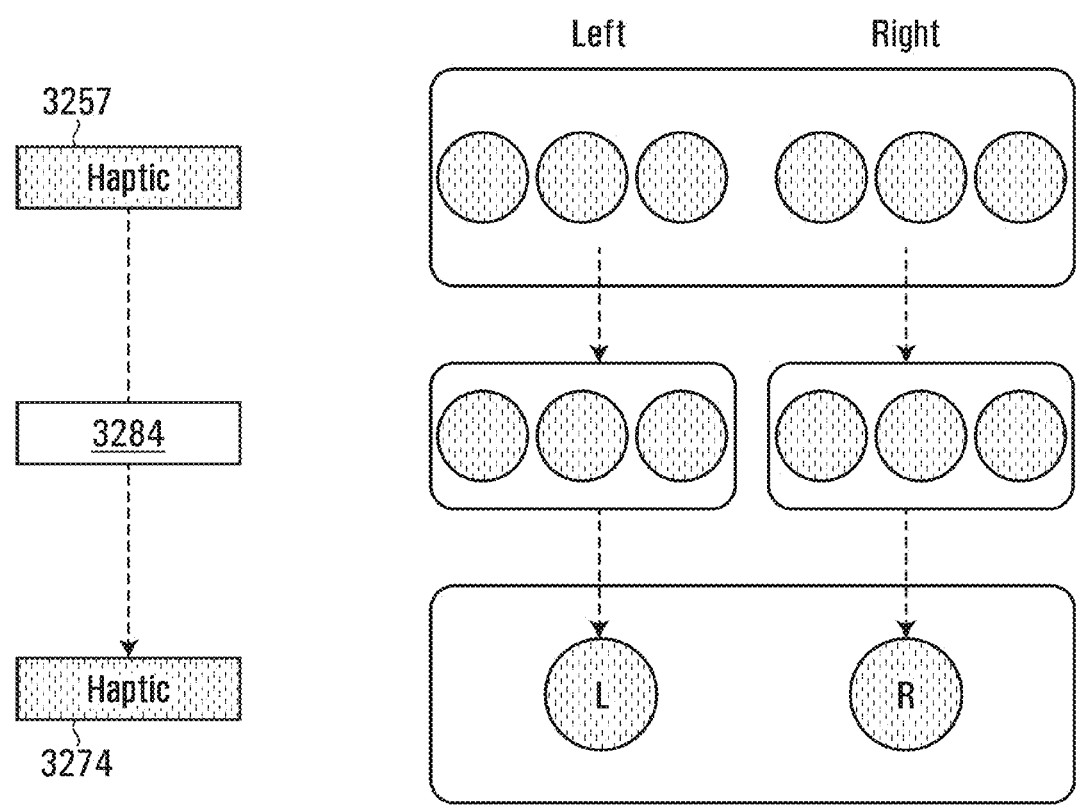
FIG. 58 is a schematic representation of haptic data being processed in accordance with one embodiment.

Referring to FIG. 58, in an embodiment, the transformation 3284 for haptic data transforms haptic data 3257, representing the raw unprocessed haptic data captured by sensors of the left and right hand haptic fingers 817, 819, 821, 856, 858, 860 on the operator controllable device 800 over the duration of a frame, into two real numbers, which act as the preprocessed haptic data 3274, representing the average values of the haptic signals representing respectively the haptic signals recorded from the left and right hands; where each of these averages is normalized to lie in the range −1 to +1. Those skilled in the art will recognize that the normalization and choice of range may differ in various embodiments, for example the normalization may be chosen to be in the range 0 to +1, and that in certain embodiments the values of the preprocessed data may be normalized by dividing by the standard deviation of the data values.

Figure 59:
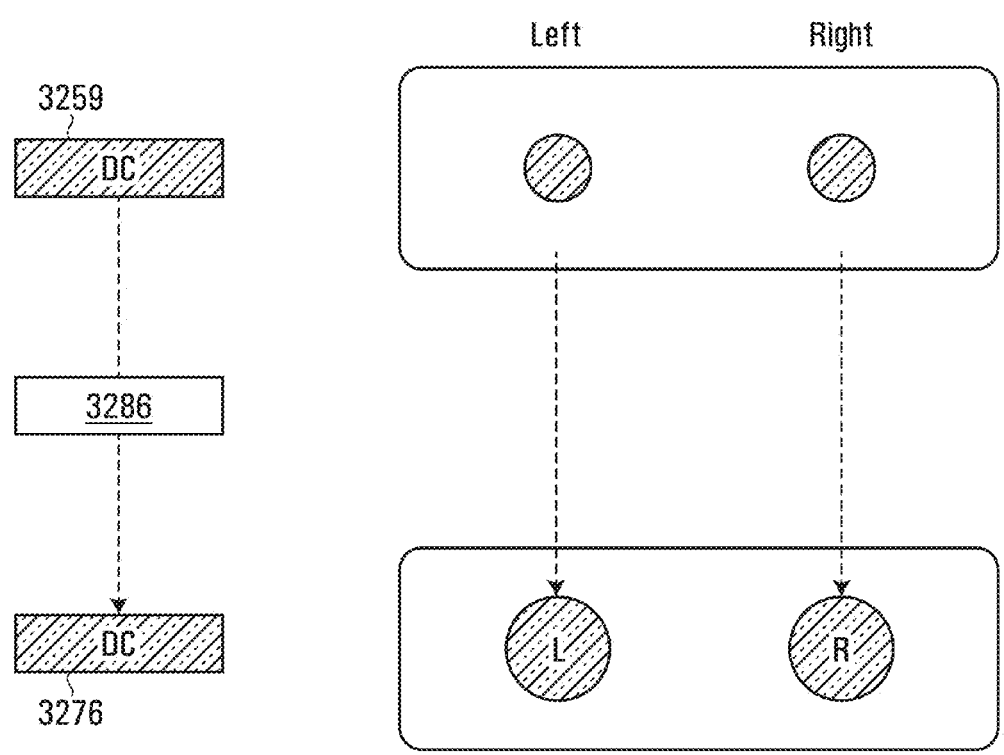
FIG. 59 is a schematic representation of DC motor data being processed in accordance with one embodiment.

Referring to FIG. 59, in an embodiment, the transformation 3286 for DC motor data transforms DC motor data 3259, representing the raw unprocessed DC motor data, of the left and right tread motors 818 on the operator controllable device 800, over the duration of a frame, into two real numbers, which act as the preprocessed DC motor data 3276, normalized to lie in the range −1 to +1, without further transformations. Those skilled in the art will recognize that the normalization and choice of range may differ in various embodiments, for example the normalization may be chosen to be in the range 0 to +1, and that in certain embodiments the values of the preprocessed data may be normalized by dividing by the standard deviation of the data values.

Figure 60:
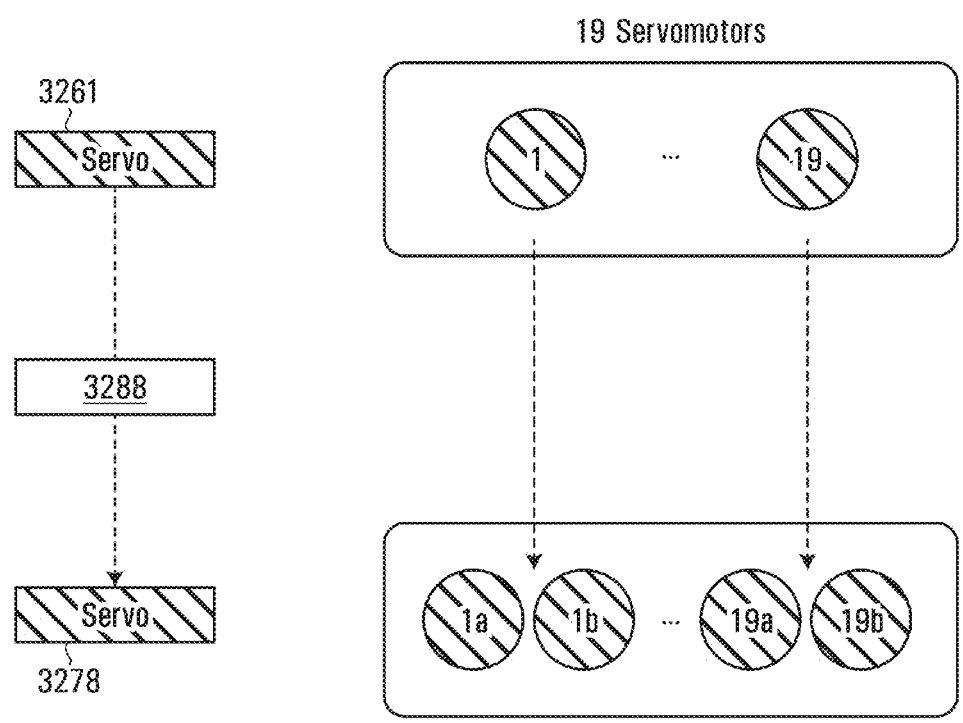
FIG. 60 is a schematic representation of servomotor data being processed in accordance with one embodiment.

Referring to FIG. 60, in an embodiment, the transformation 3288 for servomotor motor data transforms raw unprocessed servomotor data 3261, representing the settings of the left and right shoulder roll motors 802 and 852, left and right shoulder pitch servos 805 and 815, left and right shoulder yaw servos 804 and 813, left and right elbow servos 806 and 807, left and right wrist servos 808 and 809, head pitch servo 830, head yaw servo 831 and left and right haptic hand 810 and 811 comprising three haptic fingers each 817, 819, 821 and 856, 858, 860 respectively on the operator controllable device 800, into real numbers, which act as the preprocessed servomotor data 3278, two per servomotor, normalized to lie in the range −1 to +1. In an exemplary embodiment, the raw unprocessed servomotor data 3261 is represented as an angle $\theta_j$ representing the angle of rotation of servomotor j, and the transformation 3288 normalizes the angle by converting the angle into two real numbers the sine and cosine of the angle, e.g., $\sin \theta_j$ and $\cos \theta_j$. In an exemplary embodiment, there are 19 servomotors, and therefore the transformation 3288 generates preprocessed servomotor data consisting of 38 real numbers each lying in the range −1 to +1. Those skilled in the art will recognize that the normalization and choice of range may differ in various embodiments, for example the normalization may be chosen to be in the range 0 to +1, and that in certain embodiments the values of the preprocessed data may be normalized by dividing by the standard deviation of the data values.

Figure 61:
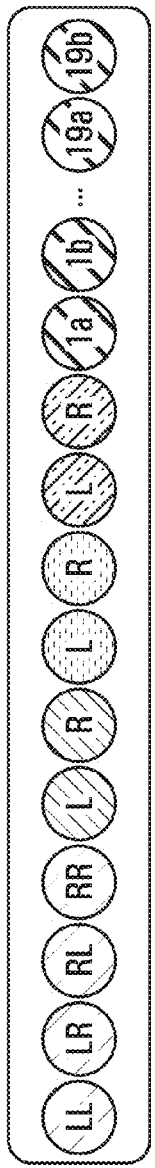
FIG. 61 is a schematic representation of concatenated pre-processed data in one dimensional vector in accordance with one embodiment.

Referring to FIG. 61, in an embodiment, the preprocessing block directs the analyzer processor 1100 to concatenate the preprocessed data per frame into a one dimensional vector. Using the exemplary transformations shown in FIGS. 56-60, the preprocessed data vector per frame for this embodiment consists of a total of 48 real numbers, each in the range −1 to +1. In some embodiments, a block analogous to the block 556 shown in FIG. 10 may be encoded in the block of codes 1120 and direct the analyzer processor 1100 to generate autonomous control information for causing the operator controllable device 800 to be able to mimic the behavior of one or more human operators autonomously. The autonomous control information may represent a model including a CRBM structured as shown at 3450 in FIG. 62, for example. In some embodiments, the autonomous control information representing this model may facilitate action prediction based on past data.

Figure 62:
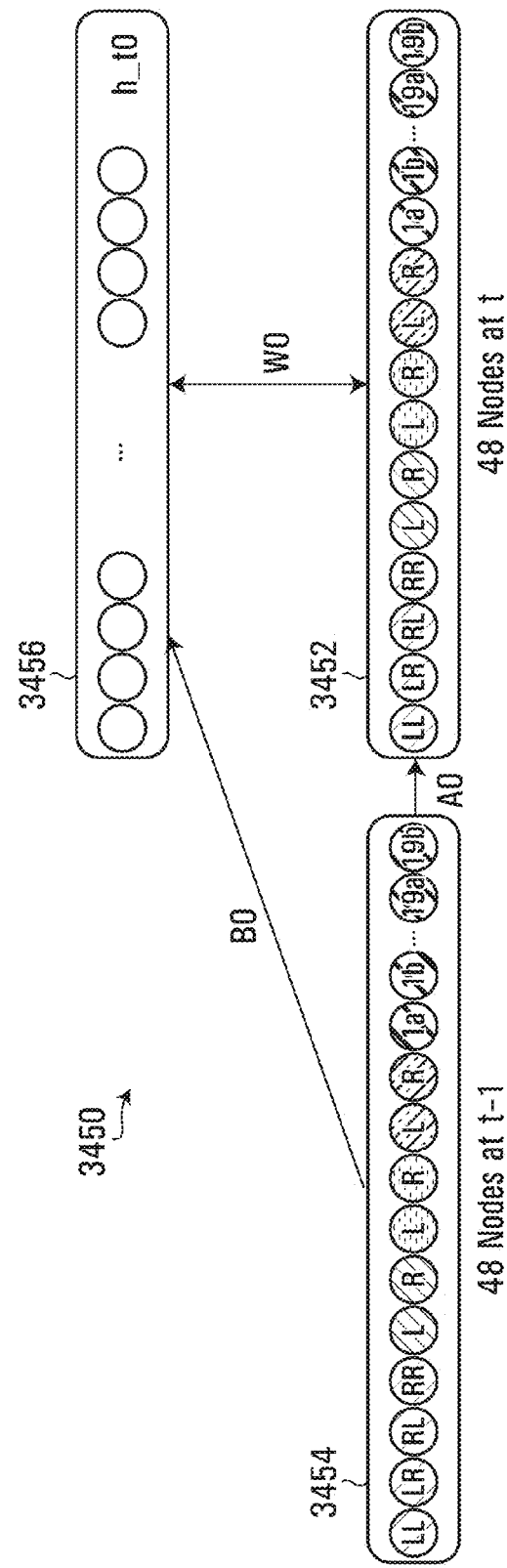
FIG. 62 is a schematic representation of a learning model in accordance with one embodiment.

Referring to FIG. 62, the model 3450 includes two sets of visible units 3452 and 3454, and one set of binary stochastic hidden units 3456. In an exemplary embodiment, the number of binary stochastic hidden units may be about 500 per a rough general rule of thumb for quantifying such numbers. The visible units 3454 represent a data vector frame collected during a time period prior to the time period representing the frame the model is configured to predict. In various embodiments, the visible units 3454 may represent N frames collected during respective time periods immediately prior and extending back N time periods. In some embodiments, the visible units 3454 may be a single history vector concatenating N vectors of size D. The frame that the model is configured to predict is represented by the visible units 3452. In various embodiments, the model described in FIG. 62 may be configured with various network parameters and hyperparameters, including but not limited to: various lowest level representations of the environment sensor information and the operator control instructions, including the parametrization of each unit's type, for example Gaussian, binary, or multivalued; various numbers of hidden units used; various types of hidden units used, for example using real valued or multivalued units; various durations of each frame; various numbers of frames included in the visible layer; or various directions of the connection weights between layers and laterally within a layer.

Referring still to FIG. 62, in various embodiments, a block analogous to block 556 shown in FIG. 10 may direct the analyzer processor 1100 to derive the autonomous control information by deriving the weights for the model, represented by the matrices A0, B0, and W0. The matrix A0 may be considered to include autoregression parameters of the learning model. If N frames from N previous time periods are included in the model then A0 is an (N·D)×D matrix, where D is the size of the visible units, e.g. units 3452. The autoregression parameters relate the state of the prior visible units, e.g., the history vector, to the present state of the visible units, e.g. units 3452. The matrix B0 may be called the past-to-hidden parameters of the learning model. If M previous time periods are included then B0 is a (M·D)×H matrix where H is the size of the hidden units, e.g. units 3456. In some embodiments M=N. The matrix W0 may be called the present-to-hidden parameters of the learning model. The matrix W0 is of size D×H. The model 3450 is an example of a CRBM.

In some embodiments, the block analogous to the block 556 shown in FIG. 10 may direct the analyzer processor 1100 to derive the parameters of the learning model, e.g., the weights in matrices A0, B0, and W0. The weights may be derived by back propagation from the environmental sensor information and the device control instructions. For example, the visible units include data from environmental sensors, e.g., units 3452 and units 3454. The ultimate output which may be determined using the parameters of the learning model is device control instructions. Values like M and N are hyperparameters for deriving the parameters. The weights may be derived by an appropriate technique from machine learning, such as, contrastive divergence. Further processes for deriving these weights is described explicitly in Chapter 4 of Taylor (2009). In some embodiments, the block analogous to the block 556 shown in FIG. 10 may direct the analyzer processor 1100 to store the autonomous control information including representations of the matrices A0, B0, and W0 in the location 1132 of the variable memory 1104 shown in FIG. 52.

Figure 63:
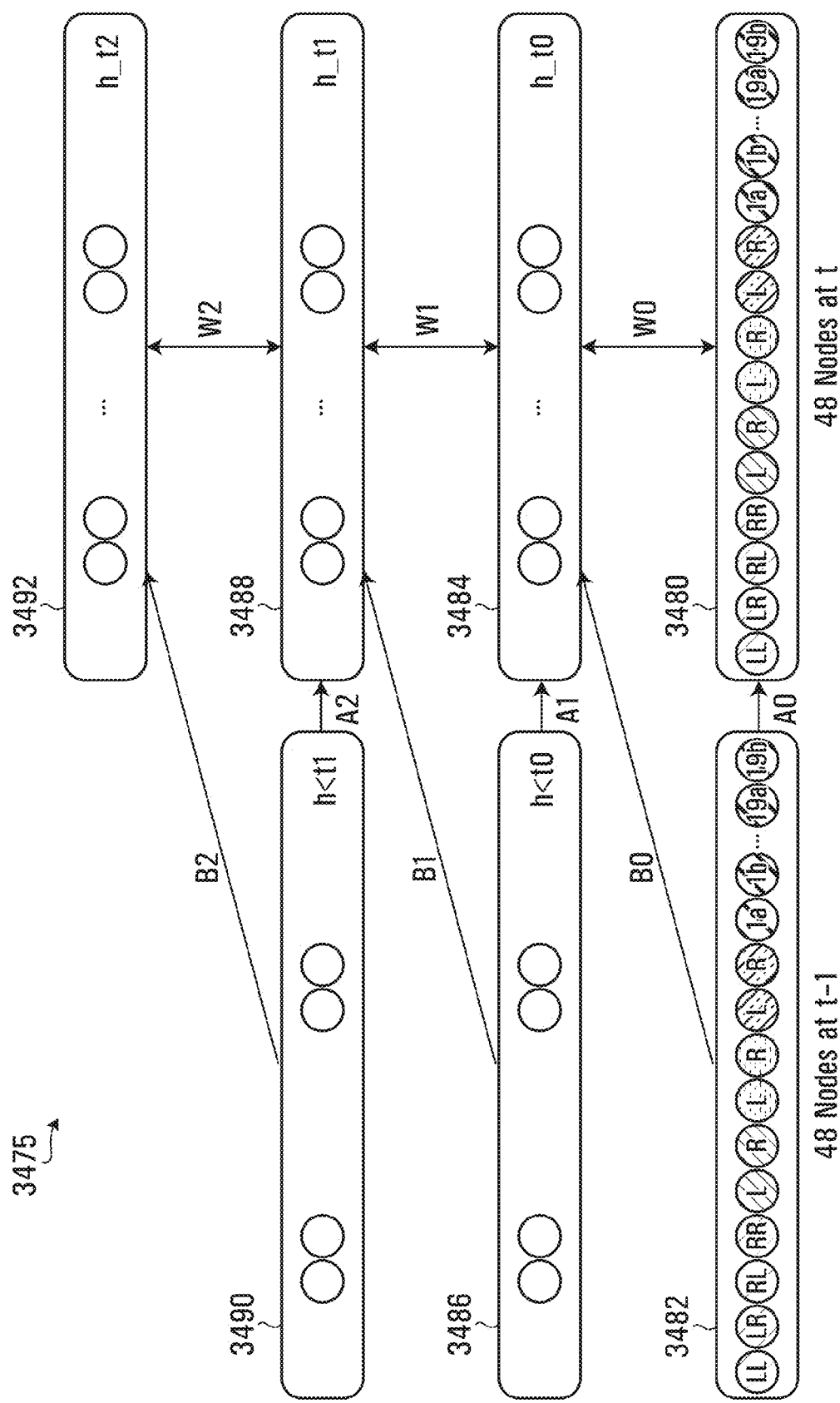
FIG. 63 is a schematic representation of a learning model in accordance with one embodiment.

In another embodiment, the autonomous information may represent a model 3475 including a CDBN structured as shown in FIG. 63. Referring to FIG. 63, the model 3475 includes two sets of visible units 3480 and 3482, and five sets of hidden units 3484, 3486, 3488, 3490, and 3492. The visible units 3482 represent a data vector frame collected during one or more (N) time periods prior to the time period representing the frame the model is configured to predict. The frame that the model is configured to predict is represented by the visible units 3480. In various embodiments, the model 3475 shown in FIG. 63 may be configured with various network parameters and hyperparameters, including but not limited to: the number of layers of units (L), various lowest level representations of the environment sensor information and the operator control instructions, including the parametrization of each unit's type, for example Gaussian, binary, or multivalued; various numbers of hidden units used in each hidden layer; various types of hidden units used in each hidden layer, for example using real valued or multivalued units; various durations of each frame; various numbers of frames included in the visible layer; various depths of the network; various directions of the connection weights between layers and laterally within a layer. Each layer in a learning model can represent a parameterized set of nonlinear transformations of the layer below.

The weights for the model 3475, represented by the matrices A0, A1, A2, B0, B1, B2, W0, W1 and W2, are generally for the purposes described having regard to the model 3450. There are autoregressive parameters (A0), past-to-hidden parameters (B0), and present-to-hidden parameters (W0). These are the parameters for layer 0 in model 3475. Layers, 1 and 2 have autoregressive parameters, past-hidden-to-present-hidden parameters (e.g., B1), and present-to-hidden parameters. That is, the hidden units are cascaded up such that previous hidden units may act as visible inputs for subsequent hidden units.

Referring still to FIG. 63, in various embodiments, a block analogous to the block 556 shown in FIG. 10 may direct the analyzer processor 1100 to derive the autonomous control information by deriving the weights for the model 3475, represented by the matrices A0, A1, A2, B0, B1, B2, W0, W1 and W2. For example, the analyzer processor 1100, may train or derive the weights for each layer of the model in succession from the bottom up. For example, the analyzer processor 1100, may train or derive the weights using contrastive divergence. Additional processes for deriving these weights are described explicitly in and around Section 3 of Chapter 4 of Taylor (2009).

Autonomous Control

After the autonomous control information has been generated, this information may be used to facilitate autonomous control of an autonomous device. As discussed above, in various embodiments, the operator controllable device 800 at training time, may act as an autonomous device, at run-time.

In some embodiments, a flowchart generally similar to the flowchart 600 shown in FIG. 11 may be encoded in the block of codes 1008 of the processor circuit 1001 shown in FIG. 15. The block of codes 1008 may direct the device processor 1024 shown in FIG. 15 to facilitate autonomous control functions.

The flowchart encoded in the block of codes 1008 begins with a block which directs the device processor 1024 shown in FIG. 15 to receive autonomous control information. In various embodiments, the block may direct the device processor 1024 to store the autonomous control information in the location 1032 of the variable memory 1002. The autonomous control information may include, for example, representations of the matrices A0, A1, A2, B0, B1, B2, W0, W1 and W2 derived by the analyzer 992 shown in FIG. 51.

A block of the flowchart encoded in the block of codes 1008 then directs the device processor 1024 shown in FIG. 15 to receive environment sensor information. The block may be generally similar to block 302 of the flowchart 300 shown in FIG. 5.

A block of the flowchart encoded in the block of codes 1008 then directs the device processor 1024 shown in FIG. 15 to derive device control instructions from the environment sensor information using the autonomous control information. The derived device control instructions may act as autonomous device control instructions.

In various embodiments, the block of codes 1008 may direct the device processor 1024 shown in FIG. 15 to retrieve representations of the matrices A0, A1, A2, B0, B1, B2, W0, W1 and W2 from the location 1032 of the variable memory 1002 and to use these to define or generate a model which is configured to take, as inputs, the environment sensor information and to produce, as outputs, device control instructions. The block of codes 1008 may direct the device processor 1024 to pre-process the environment sensor information and input the pre-processed environment sensor information as the set of visible units 3482 into the model 3475 shown in FIG. 63, for example, to generate or derive the set of visible units 3480. The block of codes 1008 may then direct the device processor 1024 to derive device control instructions from the determined set of visible units 3480. In various embodiments, the block of codes 1008 may direct the device processor 1024 to store the generated or derived device control instructions in the location 1030 of the variable memory 1002 as autonomous device control instructions.

The block of codes 1008 then directs the device processor 1024 shown in FIG. 15 to produce signals for causing the device 800 shown in FIG. 13 to take action based on the device control instructions. In various embodiments, the block of codes 1008 may direct the device processor 1024 to produce device control signals representing the autonomous device control instructions for causing the operator controllable device 800 to take at least one autonomous action. For example, the block of codes 1008 may direct the device processor 1024 to produce signals for causing the speaker 820 and/or one or more of the motors 1012 to take action. In various embodiments, the block of codes 1008 may include a block generally similar to the block 308 of the flowchart 300 shown in FIG. 5.

Accordingly, in various embodiments, the operator controllable device 800 shown in FIG. 13 may react to environment sensor information and take action and the manner in which the device reacts and takes action may be learned or predicted from previously received environment sensor information and device control instructions generated during analogous control of the device.

In some embodiments blocks encoded in the block of codes 1008 that are similar to the blocks 604 and 606 of the flowchart 600 in FIG. 11 may be stored in the program memory 1102 of the analyzer 992 and executed by the analyzer processor 1100. In such embodiments, derived autonomous device control instructions may be sent from the analyzer 992 to the device processor 1024 shown in FIG. 15.

In some embodiments, a flowchart generally similar to the flowchart 600 shown in FIG. 11 may be encoded in the block of codes 1008 of the processor circuit 1001 shown in FIG. 15, such that the block of codes 1008 may direct the device processor 1024 shown in FIG. 15 to facilitate autonomous control functions of a robotic device.

The device processor 1024, or another device processor such as device processor 40, for example, may derive autonomous control instructions and/or autonomous control signals for a robotic device. The device processor 1024 receives autonomous control information which may have been derived based on at least one action previously performed by at least one operator. For example, the device processor 1024 may receive a representation of an artificial intelligence model. The artificial intelligence model, or learning model, may include a plurality of weights associating the environment sensor information with a plurality of autonomous actions. In some embodiments the artificial intelligence model includes weights from a deep learning model such as matrices A0, A1, A2, B0, B1, B2, W0, W1 and W2, as shown in FIG. 63, for example. The artificial intelligence model may be used to determine a plurality of probabilities which may be included in the model. The probabilities may be associated with a plurality of autonomous actions. The probability values may vary with the environment sensor information at present and over a selected number of time periods. That is, the probabilities may be conditioned on the environment sensor information.

The block of codes 1008 may direct the device processor 1024 shown in FIG. 15 to facilitate autonomous control functions of a robotic device. The device processor 1024 may derive autonomous control instructions and/or autonomous control signals for the robotic device from one or more sets of environment sensor information. The device processor 1024 may derive a first set of instructions for the autonomous device control instructions, e.g., to cause a first set of autonomous actions, given a first set of environment sensor information. The device processor 1024 may derive a second set of instructions, e.g., to cause a second set of autonomous actions, for the autonomous device control instructions given a second set of environment sensor information.

The device processor 1024, or another device processor such as device processor 40, for example, may be directed to produce autonomous control signals when executing block 608 in flowchart 600 of FIG. 11 or a block analogous thereto. The autonomous control signals may direct the robotic device to perform the at least one autonomous action. The device processor 1024 may store at least one of the environment sensor information, autonomous control information, autonomous device control instructions, and a representation of autonomous control signals in the variable memory 1002, for example.

Figure 73:
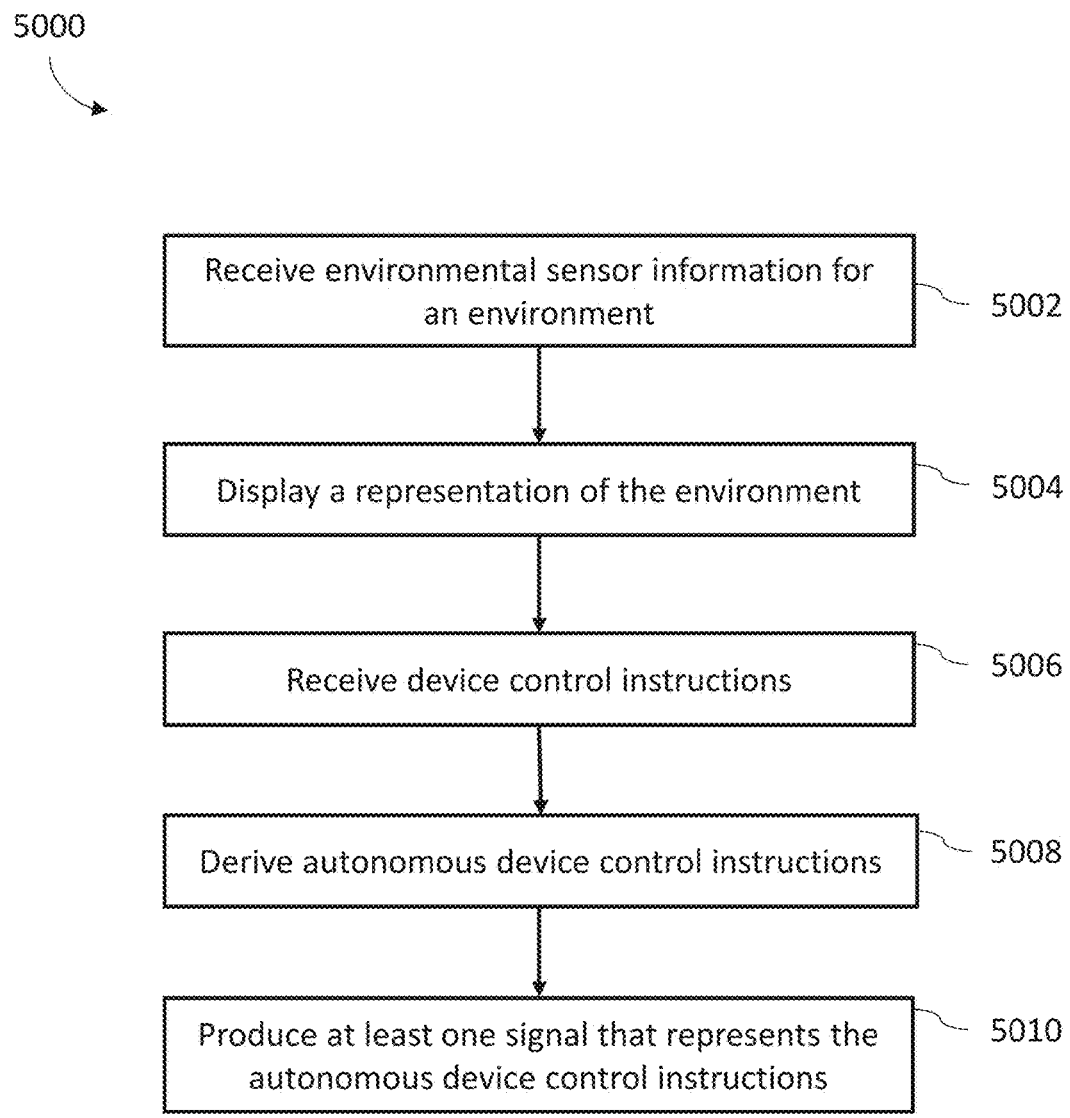
FIG. 73 is a flowchart depicting blocks of code which when executed direct a processor based device to receive environmental sensor information and derive autonomous control instructions in accordance with one embodiment.
Figure 74:
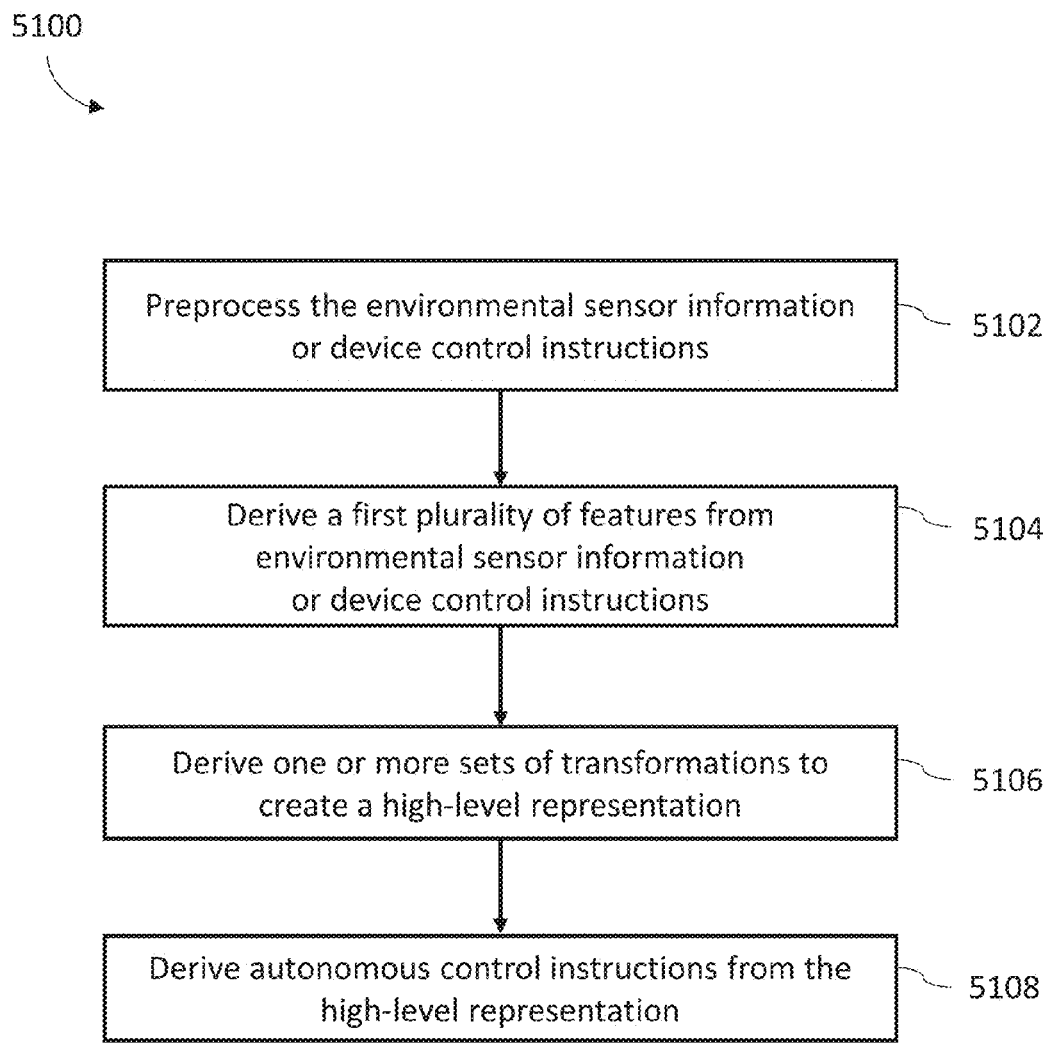
FIG. 74 is a flowchart depicting blocks of code which when executed direct a processor based device to derive a representation of an artificial intelligence model in accordance with one embodiment.

FIGS. 73 and 74 illustrate one or more flowcharts or methods that may be performed by a processor based device, which may include a computer, a plurality of networked computers, a robot, an operator controllable device, an operator interface, and/or the like. A processor based device may include one or more of the devices shown herein, such as, the operator interface 14 including operator interface processor 100, operator controllable device 12 including device processor 40, analyzer 16 including analyzer processor 200, operator interface 900 including operator interface processor 1076, operator controllable device 800 including device processor 1024, and/or analyzer 992 including analyzer processor 1100. A processor based device may include one or more of: at least one network interface, at least one tangible processor readable storage media, at least one internal bus, at least one input sub-system, and at least one output subsystem. The processor based device may execute blocks of code, such as, block of code 60, shown in FIG. 2, for example, containing processor readable data and processor executable instructions. The blocks of code or processor readable instructions may be stored on or within at least one tangible processor readable storage media.

FIG. 73 includes a flowchart 5000 depicting blocks of code for directing one or more processors to receive environmental sensor information, receive device control instructions, and derive autonomous control instructions. The flowchart 5000 includes blocks which include aspects generally similar to those of blocks from different flowcharts described herein including flowcharts 300, 550, 600, 3100, and 3105 of FIGS. 5, 10, 11, 32, and 33. FIG. 74 includes a flowchart 5100 depicting blocks of code for directing a processor to derive autonomous control instructions and/or derive a representation of an artificial intelligence model. The flowchart 5100 may be included in block 5008 of the flowchart 5000 shown in FIG. 73, or block 556 of flowchart 500 in FIG. 10, for example.

Referring to FIG. 73, a flowchart 5000 is generally shown depicting blocks of code which when executed by a processor causes the processor to derive autonomous control instructions. The flowchart 5000 may be encoded in a block of codes or processor executable instructions which may be executed by one or more processors, such as, by one or more of the device processor 40 of operator controllable device 12, operator interface processor 100 of the operator interface 14, or analyzer processor 200 of the analyzer 16, for example.

Flowchart 5000 includes five blocks 5000-5010, though those of skill in the art will appreciate that in alternative implementations certain blocks may be omitted and/or additional blocks may be added. Those of skill in the art will appreciate that the illustrated order of the blocks is shown for exemplary purposes only and may change in alternative implementations.

Referring to FIG. 73 the flowchart 5000 begins with block 5002, which directs a processor based device to receive from one or more environmental sensors environment sensor information. The processor based device may include the operator controllable device 12. In various embodiments, block 5002 may direct the device processor 40 to store a representation of the received environment sensor information in the location 80 of the variable memory 44 shown in FIG. 2.

The environmental sensor information represents information about an environment associated with an operator controllable device. Exemplary information includes visual information, such as in the frame record 2550 shown in FIG. 21. The visual information may be received from a camera, or other imager, such as camera 836 or camera 837 shown in FIG. 13. The environmental sensor information may include audio information, such as included in the frame record 2600 shown in FIG. 22. The audio information may be received by one or more microphones such as microphone 838 or microphone 839 shown in FIG. 13, or microphones 50 shown in FIG. 2.

The environmental sensor information may represent information sensed by other examples of sensors that may be included in an operator controllable device. These sensors may include a touch or force feedback sensor, a location sensor, such as a global positioning system ("GPS"), a range finder detecting proximity to a feature of the environment, a proximity sensor for detecting feature proximity, a chemical sensor, a temperature sensor, inertial measurement sensor, and/or an orientation sensor such as a gyroscope. These sensors may be included in an operator controllable device or in the environment with the operator controllable device. An example of an orientation sensor may be described in relation to elements in FIG. 50, such as, head 1401, or torso 1404. Each appendage or body, such as head 1401, or torso 1404, may include a gyroscope in order to gather information about the position, velocity, and acceleration of each appendage or body of the device 1400 and each gyroscope may act as an orientation sensor.

The environmental sensor information may include location information, feature proximity information, force feedback information, chemical information, temperature information, kinematic information, and orientation information. An inertial measurement sensor may produce kinematic information about the position, velocity, or acceleration of an operator controllable device or one of its appendages.

In various implementations, block 5002 of FIG. 73 may direct the processor based device to receive internal sensor information that represents at least one internal state of the operator controllable device. For example, the internal sensor information may include information representing the energy level of one or more batteries found in the operator controllable device 800 shown in FIG. 13. An internal sensor may be part of a servomotor or actuator in an operator controllable device, such as the operator controllable device 14, or the servo/actuator systems of operator controllable device 800. In various embodiments, block 5002 may direct the device processor 40 to receive a value for each of the servomotors included in the motors 48. In various embodiments, block 5002 may direct the processor based device to receive unprocessed servomotor data, such as, servomotor data 3261 or preprocessed servomotor data.

In various embodiments, block 5002 may direct the processor based device to receive information at a sampling rate or a frame rate. The sensor information may be stored as samples at the frame rate as discussed herein at least in relation to FIG. 5.

Block 5004, when executed by a processor based device, causes the processor based device to cause a representation of the environmental sensor information to be displayed to a human operator. For example, block 5004 may direct the operator interface processor 100 to produce operator interface control signals derived from the environment sensor information. For example, if environment sensor information includes visual information block 5004 may direct the operator interface processor 100 to produce an image in a display of an operator interface, for example displays 106 in operator interface 14. The operator interface may receive the information according to block 3103 of FIG. 33.

Block 5004, when executed by a processor based device, may direct a device processor, such as device processor 40 or 1024, for example, to send the received or captured environment sensor information to an operator interface such as operator interface 14 or 900, for example. Block 5004, when executed by a processor based device, may direct a device processor, such as device processor 40 or 1024, for example, to send the received internal sensor information to an operator interface, such as, operator interface 14 or 900, for example.

In some embodiments, block 5004, when executed by a processor based device, may cause a representation of the internal sensor information to be displayed to a human operator. For example, block 5004 may direct operator interface processor 100 to produce an operator interface control signal, such as, an audio signal, derived from the internal sensor information. For example, an alarm associated with a low battery. Block 5004 may, in various embodiments, cause the display of a representation of the at least one internal state of the operator controllable device, or a representation of the environment for an operator controllable device, at the operator interface.

Block 5006 directs a processor based device to receive device control instructions. In various embodiments, block 5006 may direct a processor in an operator controllable device, for example device processor 40 or 1024, to receive a signal containing, a representation of, or information characterizing device control instructions. For example, block 5006 may direct a processor to receive device control instructions across a network, such as network 18 or network 730. The information representing device control instructions may have been sent by the operator interface, such as operator interface 14.

In various embodiments, block 5006 may direct the processor based device to store the representation of the device control instructions, as processor readable information, in at least one tangible computer readable storage medium. In various embodiments, the device control instructions, when executed by a processor, such as device processor 40 or 1024, for example, may cause an operator controllable device, such as the operator controllable device 12 or 800, to simulate or replicate at least one action taken by a human operator. For example, block 5006 may direct the device processor 40 to cause the operator controllable device 12 to simulate or replicate an action taken by the human at operator interface 14 in response to the display of representation of the environment. In some embodiments, for example, block 5006 may direct an operator interface processor to send operator interface sensor information, which may act as device control instructions, to an operator controllable device. Examples of actions that may be taken by the human operator are described herein including in relation to autonomous control instructions.

Block 5008, when executed by a processor based device, causes a processor of the processor based device to derive autonomous device control instructions from the device control instructions and the environmental sensor information. For example, block 5008 may direct the analyzer processor 200 of the analyzer 16 to derive autonomous device control instructions for controlling a user operable device. In various embodiments, block 5008 may direct a processor based device to derive autonomous control instructions from one or more data frames including for example, one or more of the data frames shown in FIGS. 8, 9, and 21-31, and the like.

Block 5008, in various embodiments, directs a processor to derive autonomous device control instructions from the device control instructions, internal sensor information, and the environmental sensor information. The autonomous device control instructions when executed by a device processor of an operator controllable device, may cause the operator controllable device to take at least one autonomous action. For example, block 5008 may direct the analyzer processor 200 to derive autonomous device control instructions for causing the operator controllable device 12 to perform at least one of the following actions: gripping, pushing, or moving a feature of the environment; propelling or moving the operator controllable device; or emitting communication signals.

Block 5010 of FIG. 73, when executed, directs a processor based device to generate, produce, or cause the generation of at least one signal representing autonomous control instructions. In various embodiments, block 5010 may direct the processor based device to produce at least one signal representing the autonomous control instructions, which when executed, cause an operator controllable device to take at least one autonomous action. For example, block 5010 may direct the processor based device to produce signals for causing an operator controllable device to move. In various embodiments, block 5010 may direct the processor based device to send or store autonomous control instructions. For example, block 5010 may direct the processor based device to send least one signal that represents the autonomous control instructions across a network. In some embodiments, block 5010 may direct the processor based device to store autonomous control instructions on at least one tangible computer readable storage media. For example, the at least one signal that represents the autonomous control instructions may propagate down an internal bus to a storage device. The autonomous control instructions may be stored in a processor readable and executable format.

Referring to FIG. 74, a flowchart 5100 is generally shown depicting blocks of code which when executed by a processor causes the processor to derive a representation of an artificial intelligence model from environment sensor information, internal sensor information, and/or device control instructions. The flowchart 5100 may be encoded in a block of codes or processor executable instructions which may be executed by one or more processors, such as, for example, analyzer processor 200 of analyzer 16. In various embodiments, flowchart 5100 may be included in the blocks 556 and 5008 described above. Flowchart 5100 includes four blocks 5100-5108, though those of skill in the art will appreciate that in alternative implementations certain blocks may be omitted and/or additional blocks may be added. Those of skill in the art will appreciate that the illustrated order of the blocks is shown for exemplary purposes only and may change in alternative implementations.

In various embodiment, a processor, such as the analyzer processor 200 of the analyzer 16, receives or has the environment sensor information, internal sensor information, and/or the device control instructions. For example, this data may be stored in a shared memory space that the analyzer processor 200 has access to. This data may be received before flowchart 5100 begins.

Referring to FIG. 74 the flowchart 5100 begins with block 5102, which directs a processor based device to preprocess data including for example, the environment sensor information, internal sensor information, and/or the device control instructions. The processor based device may include the analyzer 16. In various embodiments, block 5102 may direct the processor based device to mean center data, normalize variance, remove backgrounds, denoise, subsample, and the like. Block 5102 may direct the processor based device to pre-process by applying one or more transformations such as the transformations 3280, 3282, 3284, 3286, and 3288 show in FIG. 55. For example, block 5102 may direct the processor based device to, us a transformation 3280, transform raw vision data into preprocessed vision data 3270. Examples of transformations are included herein.

Block 5104 may direct the analyzer processor 200 of analyzer 16, for example, to extract low level features from the environment sensor information, internal sensor information, and/or the device control instructions. In some embodiments, block 5104 may direct the analyzer processor 200 to extract the lowest level representations of the environment sensor information, internal sensor information, and/or the operator control instructions. Block 5104 may direct the analyzer processor 200 to use variational autoencoders as described herein above at least in relation to the transformations 3280-3288 show in FIG. 55. For example, analyzer processor 200 of analyzer 16 may apply a temporal variational autoencoder to extract low level features from sensor information, device control instructions, or the like.

Block 5106 may direct the analyzer processor 200, for example, to apply one or more sets of non-linear and/or linear transformations to the low level features of the environment sensor information, internal sensor information, and/or device control instructions. The result of applying the one or more sets of non-linear and/or linear transformations may act as a high-level representation of the low level features of the environment sensor information, internal sensor information, and/or device control instructions. For example, block 5106 may direct the analyzer processor 200 to derive parameters for transformations such as those found in a CRBM, such as, model 3450 shown in FIG. 62. For example, processor 200 could derive parameters for transformations such as those found in a CDBN, such as, model 3475 shown in FIG. 63. Examples of the parameters may include weights in a learning model, such as, a deep temporal model. Examples of deep temporal models include CRBMs, such as, model 3450 shown in FIG. 62, and CDBNs, such as model 3475 shown in FIG. 63. Examples of the parameters may include thresholds and gains for non-linear functions, e.g. activation functions, in a learning model.

Block 5108, may direct the analyzer processor 200, for example, to derive autonomous control information from information characterizing a high-level representation of the first plurality of features. Examples of autonomous control information include an artificial intelligence model, or learning model. The artificial intelligence model may include a plurality of weights associating the environment sensor information with a plurality of autonomous actions. The artificial intelligence model may be used to determine a plurality of probabilities which may be included in the model. The probabilities may be associated with a plurality of autonomous actions. The probability values may vary with the environment sensor information. That is, the probabilities may be conditioned on the environment sensor information. In some embodiments the artificial intelligence model includes weights from a deep learning model. Examples of artificial intelligence models include deep hierarchical learning systems, or deep temporal models, such as CRBMs such as model 3450 shown in FIG. 62 and CDBNs such as model 3475 shown in FIG. 63. Further examples of artificial intelligence models are shown in and described in relation to FIG. 75.

Figure 75:
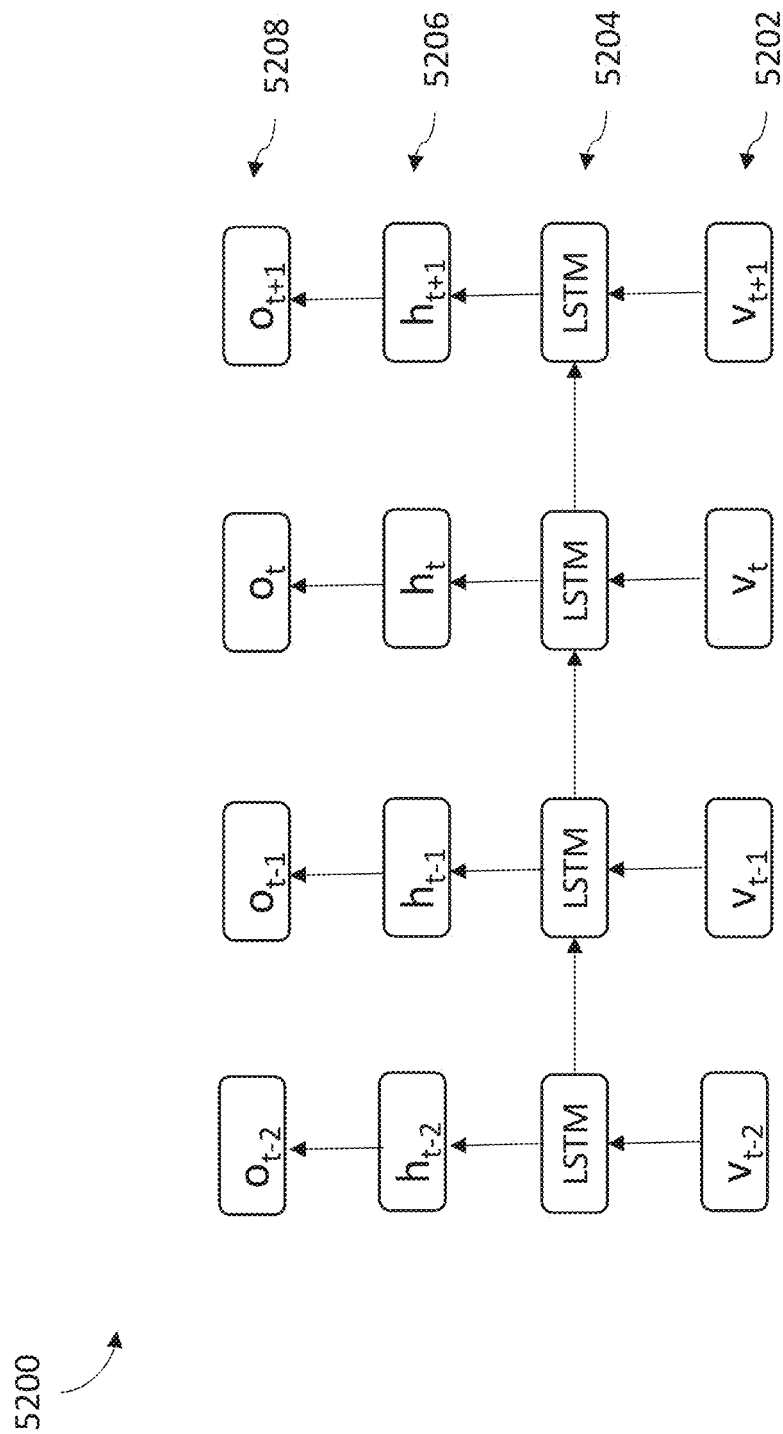
FIG. 75 is a schematic representation of a learning model in accordance with one embodiment.

Referring to FIG. 75, an artificial intelligence model in accordance with various embodiments is shown at 5200. A block analogous to the block 556 shown in FIG. 10 may direct the analyzer processor 1100 to derive autonomous control information by finding the parameters for the model 5200. In various embodiments, a block analogous to the block 556 shown in FIG. 10 may direct the analyzer processor 1100 to derive the autonomous control information by deriving the weights for the model 5200. Model 5200 is a Long Short-Term Memory (LSTM) a special case of a Recurrent Neural Network. Model 5200 contains LSTM blocks instead of, or in addition to, regular network units, such as, visible, hidden, input, and output units. An LSTM block may store a value for an arbitrary length of time and can be erased. Deriving parameters for an LSTM model may involve training over environmental sensor information and user controllable device action. In some embodiments, the analyzer processor 1100 may be directed to reduce or minimize the error between a predicted action based on environmental sensor data and an action performed by an operator. For example, iterative gradient descent methods such as backpropagation may be used. As well, the analyzer processor 1100 may be directed to derive the autonomous control information by reducing or minimizing error through more global methods, such as, simulated annealing, genetic algorithms, and tabu search.

Referring to FIG. 75, the model 5200 includes a plurality of layers and a plurality of time steps. Time is indexed via the subscript. The layers include an input layer 5202. Exemplary input data may include device control instructions, internal sensor information, and the environmental sensor information. The layers include an LSTM layer 5204. The LSTM layer 5204 may include a plurality of input units and lateral directed intra-layer edges. Thus context of earlier times is shared from LSTM unit to LSTM unit. The model 5200 shown in FIG. 75 includes a hidden layer 5206 as an example of one or more layers of hidden units that may be included in an LSTM model. The layer 5208 includes a plurality of output units. The output units could correspond to actions.

The cited and listed documents are incorporated by reference as if each was individually indicated as incorporated by reference. All publications, for example, articles, books, theses, webpages, cited in this specification; and all patent documents, for example, patent applications, publications, and patents, cited in this specification; and all patent applications, publications, and patents listed on any associated formal document, such as, an application Data Sheet or Petition for Grant of Patent, or to which a priority claim is made, are hereby incorporated by reference in their entirety.

While specific embodiments of the invention have been described and illustrated, such embodiments should be considered illustrative of the invention only and not as limiting the invention as construed in accordance with the accompanying claims.

The embodiments of the invention in which an exclusive property or privilege is claimed are defined as follows:

1. A method of deriving autonomous control information, the method comprising:
   receiving one or more sets of associated environment sensor information and device control instructions, wherein each set of associated environment sensor information and device control instructions comprises:
   environment sensor information representing an environment associated with an operator controllable device; and
   associated device control instructions configured to cause the operator controllable device to simulate at least one action taken by at least one operator experiencing a representation of the environment generated from the environment sensor information;
   deriving autonomous control information from the one or more sets of associated environment sensor information and device control instructions, said autonomous control information configured to facilitate generating autonomous device control signals from autonomous environment sensor information representing an environment associated with an autonomous device, said autonomous device control signals configured to cause the autonomous device to take at least one autonomous action, said autonomous control information comprising a representation of an artificial intelligence model derived from the one or more sets of associated environment sensor information and device control instructions.

2. The method of claim 1 further comprising:
   receiving first autonomous environment sensor information representing an environment associated with a first autonomous device;
   deriving first autonomous device control instructions from the first autonomous environment sensor information using the autonomous control information;
   producing first autonomous device control signals representing the first autonomous device control instructions for causing the first autonomous device to take at least one autonomous action.

3. The method of claim 1 wherein receiving the one or more sets of associated environment sensor information and device control instructions comprises:
   receiving first environment sensor information representing a first environment of a first operator controllable device;
   producing first operator interface control signals derived from the first environment sensor information for causing a first operator interface to simulate the first environment for a first operator interacting with the first operator interface;
   receiving first operator interface sensor information representing at least one action taken by the first operator in response to the first operator interface simulating the first environment;
   deriving first device control instructions from the first operator interface sensor information, said first device control instructions configured to cause the first operator controllable device to simulate the at least one action taken by the first operator;
   wherein one of the one or more sets of associated environment sensor information and device control instructions comprises the first environment sensor information and the first device control instructions.

4. The method of claim 1 wherein the environment sensor information for each of the one or more sets of associated environment sensor information and device control instructions comprises at least one of the following:
   visual information;
   audio information;
   location information;
   feature proximity information;
   force feedback information;
   chemical information;
   temperature information;
   kinematic information; and
   orientation information.

5. The method of claim 1 wherein the device control instructions for each of the one or more sets of associated environment sensor information and device control instructions represents signals for causing the operator controllable device to take at least one of the following actions:
   gripping a feature;
   pushing a feature;
   pulling a feature;
   propelling the operator controllable device;
   moving the operator controllable device;
   moving a feature; and
   emitting communication signals.

6. The method of claim 1, further comprising:
   deriving, by the processor, the representation of the artificial intelligence model from a model comprising at least one of:
   a conditional deep belief network;
   a conditional restricted Boltzmann machine;
   a long short-term memory neural network;
   a recurrent neural network;
   a deep hierarchical learning system; and
   a variational auto-encoder.

7. A non-transitory computer-readable storage medium having stored thereon codes which, when executed by at least one processor, cause the at least one processor to:
   receive one or more sets of associated environment sensor information and device control instructions, wherein each set of associated environment sensor information and device control instructions comprises:
   environment sensor information representing an environment associated with an operator controllable device; and
   associated device control instructions configured to cause the operator controllable device to simulate at least one action taken by at least one operator experiencing a representation of the environment generated from the environment sensor information;
   derive autonomous control information from the one or more sets of associated environment sensor information and device control instructions, said autonomous control information configured to facilitate generating autonomous device control signals from autonomous environment sensor information representing an environment associated with an autonomous device, said autonomous device control signals configured to cause the autonomous device to take at least one autonomous action, said autonomous control information comprising a representation of an artificial intelligence model derived from the one or more sets of associated environment sensor information and device control instructions.

8. The non-transitory computer-readable storage medium of claim 7, wherein the stored codes cause the at least one processor to:

derive the autonomous control instructions from a representation of an artificial intelligence model comprising at least one of:
a conditional deep belief network;
a conditional restricted Boltzmann machine;
a long short-term memory neural network;
a recurrent neural network;
a deep hierarchical learning system; and
a variational auto-encoder.

9. The non-transitory computer-readable storage medium of claim 7, wherein the environment sensor information for each of the one or more sets of associated environment sensor information and device control instructions comprises at least visual information.

10. A system for deriving autonomous control information, the system comprising:
means for receiving one or more sets of associated environment sensor information and device control instructions, wherein each set of associated environment sensor information and device control instructions comprises:
environment sensor information representing an environment associated with an operator controllable device; and
associated device control instructions configured to cause the operator controllable device to simulate at least one action taken by at least one operator experiencing a representation of the environment generated from the environment sensor information;
means for deriving autonomous control information from the one or more sets of associated environment sensor information and device control instructions, said autonomous control information configured to facilitate generating autonomous device control signals from autonomous environment sensor information representing an environment associated with an autonomous device, said autonomous device control signals configured to cause the autonomous device to take at least one autonomous action, said autonomous control information comprising a representation of an artificial intelligence model derived from the one or more sets of associated environment sensor information and device control instructions.

11. The system of claim 10, wherein the means for deriving the autonomous control information comprises:
means for deriving the representation of the artificial intelligence model from a model comprising at least one of:
a conditional deep belief network;
a conditional restricted Boltzmann machine;
a long short-term memory neural network;
a recurrent neural network;
a deep hierarchical learning system; and
a variational auto-encoder.

12. A system for deriving autonomous control information, the system comprising at least one processor configured to:
receive one or more sets of associated environment sensor information and device control instructions, wherein each set of associated environment sensor information and device control instructions comprises:
environment sensor information representing an environment associated with an operator controllable device; and
associated device control instructions configured to cause the operator controllable device to simulate at least one action taken by at least one operator experiencing a representation of the environment generated from the environment sensor information;
derive autonomous control information from the one or more sets of associated environment sensor information and device control instructions, said autonomous control information configured to facilitate generating autonomous device control signals from autonomous environment sensor information representing an environment associated with an autonomous device, said autonomous device control signals configured to cause the autonomous device to take at least one autonomous action, said autonomous control information comprising a representation of an artificial intelligence model derived from the one or more sets of associated environment sensor information and device control instructions.

13. The system of claim 12, wherein the at least one processor is configured to:
derive the representation of the artificial intelligence model from a model comprising at least one of:
a conditional deep belief network;
a conditional restricted Boltzmann machine;
a long short-term memory neural network;
a recurrent neural network;
a deep hierarchical learning system; and
a variational auto-encoder.

14. A method of operation in a robotic system including an operator controllable device and a processor in communication with the operator controllable device, the method comprising:
receiving, by the processor, environment sensor information that represents an environment associated with the operator controllable device;
causing, by the processor, the display of a representation of the environment to a human operator;
receiving, by the processor, device control instructions which when executed by the operator controllable device, cause the operator controllable device to simulate at least one action taken by the human operator in response to the representation of the environment;
receiving, by the processor, internal sensor information that represents at least one internal state of the operator controllable device;
deriving, by the processor from (i) the environment sensor information, (ii) the device control instructions, and (iii) the internal sensor information, autonomous control instructions, which, when executed by the operator controllable device, cause the operator controllable device to take at least one autonomous action; and
producing, by the processor, at least one signal that represents the autonomous control instructions.

15. The method of claim 14, wherein the robotic system further includes an operator interface in communication with the operator controllable device and the processor, the method further comprising:
causing, by the processor, the display of a representation of the at least one internal state of the operator controllable device at the operator interface.

16. The method of claim 14, wherein the robotic system further includes an operator interface in communication with the operator controllable device and the processor and wherein causing, by the processor, the display of the representation of the environment comprises:
causing, by the at least one processor, the display of the representation of the environment at the operator interface.

17. The method of claim 14, wherein the robotic system further includes an operator interface in communication with the operator controllable device and the processor, the method further comprising:
receiving, by the processor, the device control instructions from the operator interface.

18. The method of claim 14, wherein deriving the autonomous control instructions comprises:
deriving, by the processor, a representation of an artificial intelligence model from the environment sensor information and the device control instructions.

19. The method of claim 18, wherein deriving the representation of the artificial intelligence model comprises:
deriving, by the processor, a plurality of probabilities and a plurality of autonomous actions, wherein a representative probability from the plurality of probabilities is associated with a representative action from the plurality of autonomous actions and wherein the representative probability varies with the environment sensor information.

20. The method of claim 18, wherein deriving the representation of the artificial intelligence model comprises:
deriving, by the processor, a first plurality of features from the environment sensor information and the device control instructions;
applying, by the processor, one or more non-linear transformations to the first plurality of features to derive information characterizing a high-level representation of the first plurality of features; and
deriving, by the processor, the autonomous control instructions from information that includes the information characterizing a high-level representation of the first plurality of features.

21. The method of claim 18, wherein deriving the representation of the artificial intelligence model comprises:
deriving, by the processor, the artificial intelligence model from a model that comprises at least one of the following:
a conditional deep belief network;
a conditional restricted Boltzmann machine;
a long short-term memory neural network;
a recurrent neural network;
a deep hierarchical learning system; and
a variational auto-encoder.

22. The method of claim 14 further comprising:
receiving, by the processor, information comprising at least one of the following:
visual information;
audio information;
location information;
proximity information;
force feedback information;
chemical information;
temperature information;
kinematic information; and
orientation information.

23. The method of claim 14, wherein the device control instructions represent instructions which when executed cause the operator controllable device to take at least one of the following actions:
gripping a feature of the environment;
pushing a feature of the environment;
pulling a feature of the environment;
propelling the operator controllable device;
moving the operator controllable device;
moving a feature of the environment; and
emitting communication signals.

24. The method of claim 23, wherein the autonomous control instructions represent instructions which when executed cause the operator controllable device to autonomously take at least one of the following actions:
gripping a feature of the environment;
pushing a feature of the environment;
pulling a feature of the environment;
propelling the operator controllable device;
moving the operator controllable device;
moving a feature of the environment; and
emitting communication signals.

25. The method of claim 14 further comprising:
in response to execution of the autonomous control instructions by the operator controllable device, causing the production of a plurality of autonomous device control signals that cause the operator controllable device to take at least one autonomous action.

26. The method of claim 14 further comprising:
sending, by the processor, the at least one signal that represents the autonomous control instructions across a network.

27. The method of claim 14 further comprising:
storing, by the processor, the autonomous control instructions on at least one tangible computer readable storage media.

28. A system for deriving autonomous control information, the system comprising at least one processor configured to:
receive one or more sets of associated environment sensor information and device control instructions, wherein each set of associated environment sensor information and device control instructions comprises:
environment sensor information representing an environment associated with an operator controllable device; and
associated device control instructions configured to cause the operator controllable device to simulate at least one action taken by at least one operator experiencing a representation of the environment generated from the environment sensor information; and
derive autonomous control information from the one or more sets of associated environment sensor information and device control instructions, said autonomous control information configured to facilitate generating autonomous device control signals from autonomous environment sensor information representing an environment associated with an autonomous device, said autonomous device control signals configured to cause the autonomous device to take at least one autonomous action, said autonomous control information comprising a representation of an artificial intelligence model derived from the one or more sets of associated environment sensor information and device control instructions;
wherein the environment sensor information for each of the one or more sets of associated environment sensor information and device control instructions comprises at least visual information.

* * * * *